United States Patent [19]
Isono et al.

[11] Patent Number: 5,929,827
[45] Date of Patent: *Jul. 27, 1999

[54] ELECTRON SOURCE, IMAGE FORMING APPARATUS USING THE SAME, METHOD OF MANUFACTURING THE SAME, AND METHOD OF DRIVING THE SAME

[75] Inventors: Aoji Isono; Yoshiyuki Osada, both of Atsugi; Hidetoshi Suzuki, Fujisawa; Eiji Yamaguchi, Zama; Toshihiko Takeda, Atsugi; Hiroaki Toshima, Tokyo; Noritake Suzuki, Atsugi; Yasuyuki Todokoro, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/330,669

[22] Filed: Oct. 28, 1994

[30] Foreign Application Priority Data

| Oct. 28, 1993 | [JP] | Japan | 5-270343 |
| Jun. 8, 1994 | [JP] | Japan | 6-126387 |
| Oct. 25, 1994 | [JP] | Japan | 6-260054 |
| Oct. 25, 1994 | [JP] | Japan | 6-260055 |

[51] Int. Cl.$^6$ ........................... G09G 3/22
[52] U.S. Cl. ................. 345/74; 345/90; 315/368.19; 315/364
[58] Field of Search ........................ 345/74, 90, 75, 345/100, 205, 206; 315/366, 364, 368.18, 368.19; 313/306; 445/24, 66

[56] References Cited

U.S. PATENT DOCUMENTS

| 4,994,708 | 2/1991 | Shimizu | 313/306 |
| 4,994,796 | 2/1991 | Kuijk | 345/205 |
| 5,155,416 | 10/1992 | Suzuki | 315/366 |
| 5,428,370 | 6/1995 | Knapp | 345/205 |

*Primary Examiner*—Richard A. Hjerpe
*Assistant Examiner*—Kent Chang
*Attorney, Agent, or Firm*—Fitzpatrick, Cella, Harper & Scinto

[57] ABSTRACT

This invention relates to an electron source and an image forming apparatus each of which particularly comprises a surface conduction type electron emitting element as an electron emitting element, a method of manufacturing an electron source and an image forming apparatus, in which the energization forming treatment step of the surface conduction type electron emitting element is performed by applying a voltage to an electron emitting portion formation thin film via a nonlinear element connected in series with the thin film and having nonlinear voltage/current characteristics, an electron source and an image forming apparatus in each of which the nonlinear element is connected in series with the surface conduction type electron emitting element, and a method of driving the same.

17 Claims, 50 Drawing Sheets

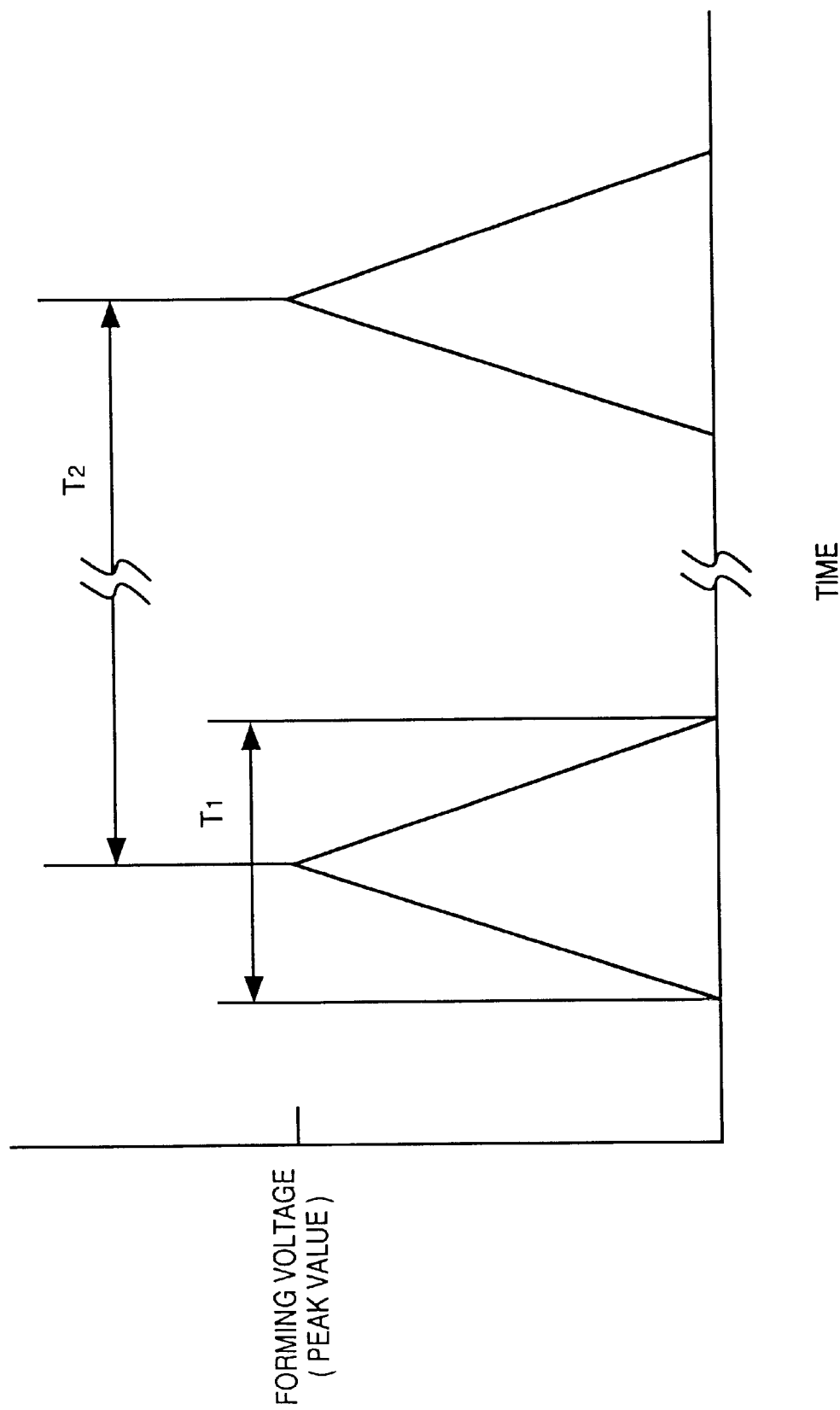

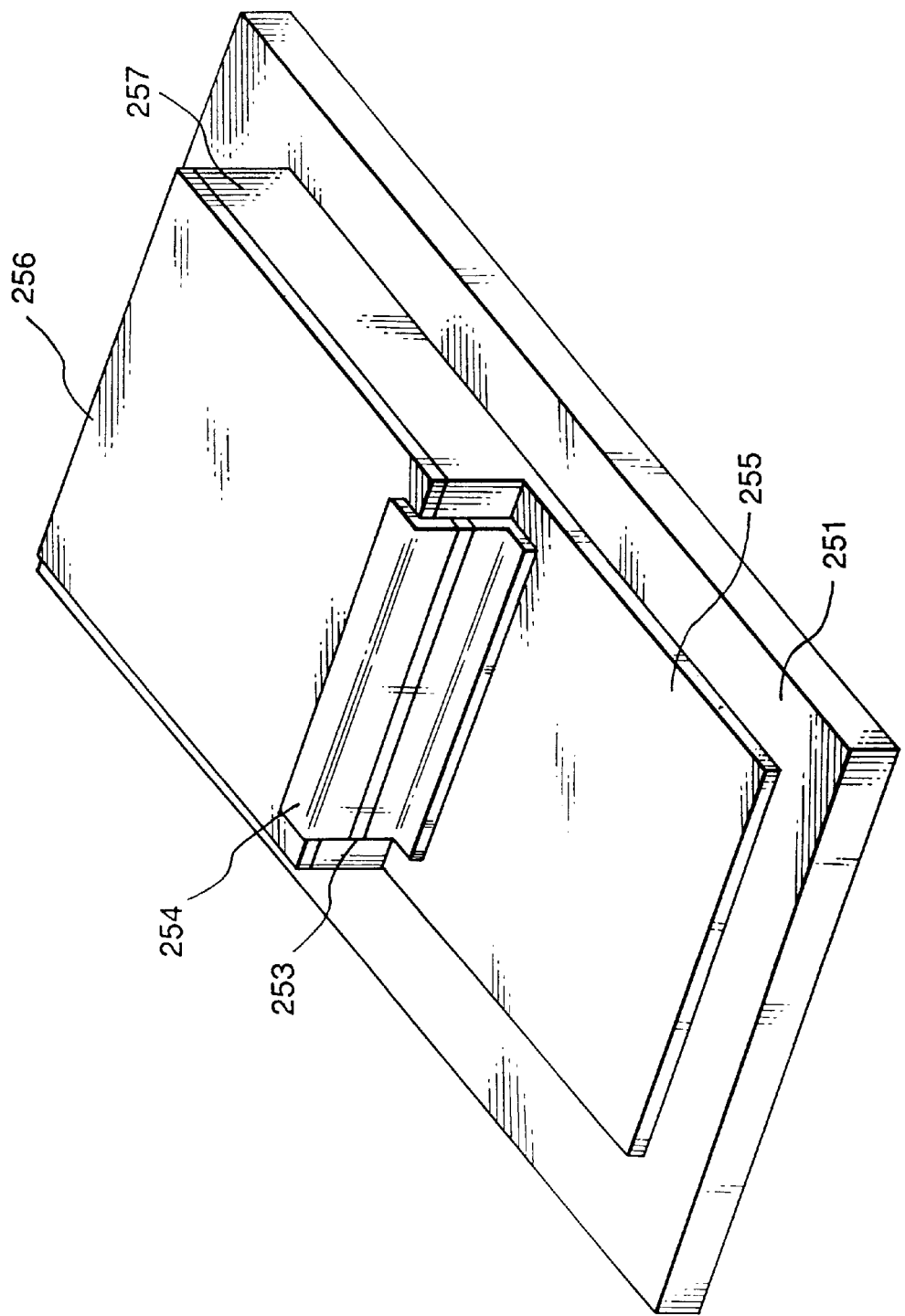

F I G. 10(7)
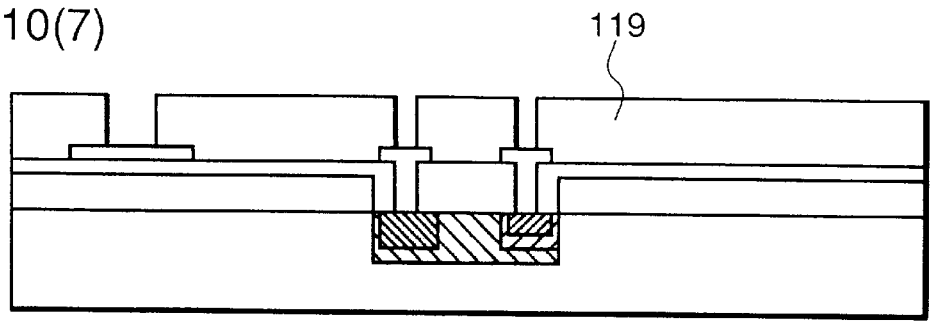
F I G. 10(8)
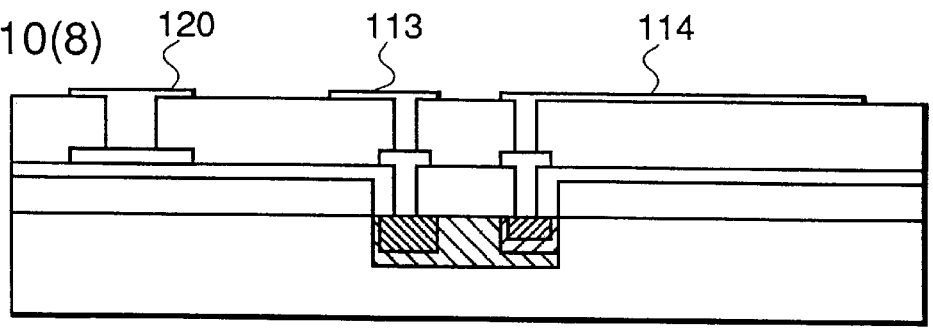
F I G. 10(9)
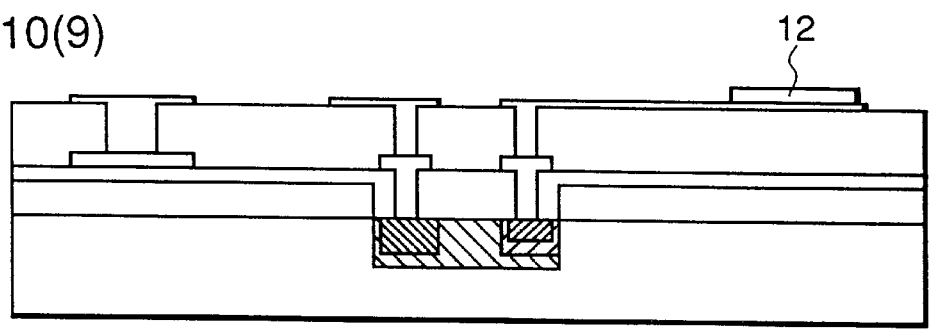
F I G. 10(10)
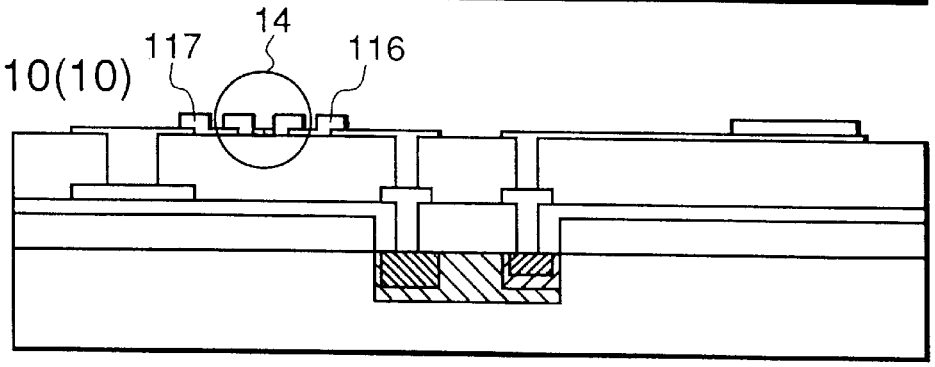

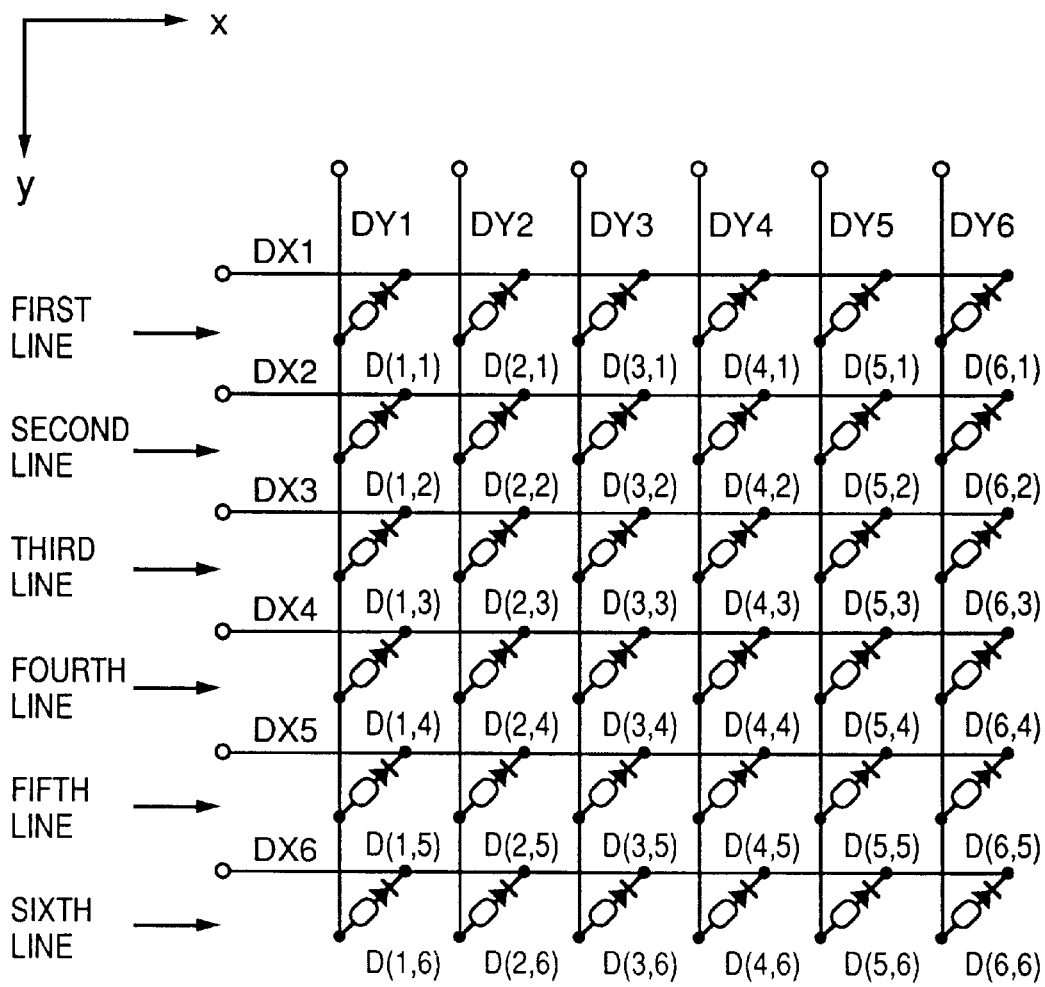
FIG. 28
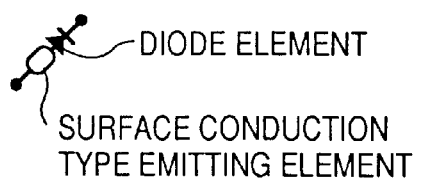

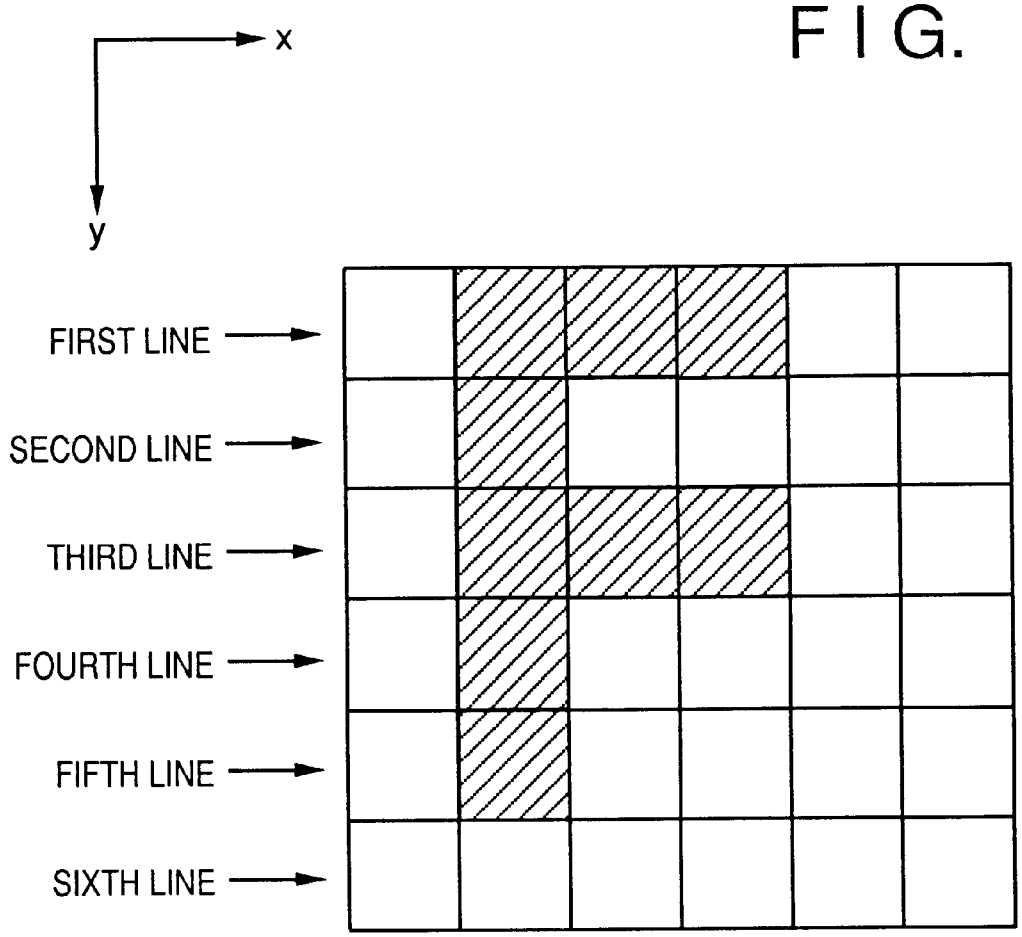
FIG. 29
 : EMISSION
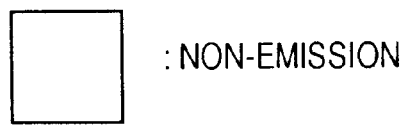 : NON-EMISSION

- ⬛ : ELEMENT TO WHICH POTENTIAL DIFFERENCE OF 14V IS APPLIED BETWEEN TWO TERMINALS
- ⬜ : ELEMENT TO WHICH POTENTIAL DIFFERENCE OF 7V IS APPLIED BETWEEN TWO TERMINALS
- ○ : ELEMENT TO WHICH POTENTIAL DIFFERENCE OF 0V IS APPLIED BETWEEN TWO TERMINALS

DATA: SERIAL LUMINANCE DATA

TSFT: SHIFT CLOCK

TMRY: MEMORY LOAD TIMING

I'D1 ~ I'DN: OUTPUT FROM LINE MEMORY 905

TSCAN: CONTENTS OF SCANNING CIRCUIT CONTROL SIGNAL

OUTPUT SIGNAL FROM MODULATION SIGNAL GENERATOR 907

FIG. 45
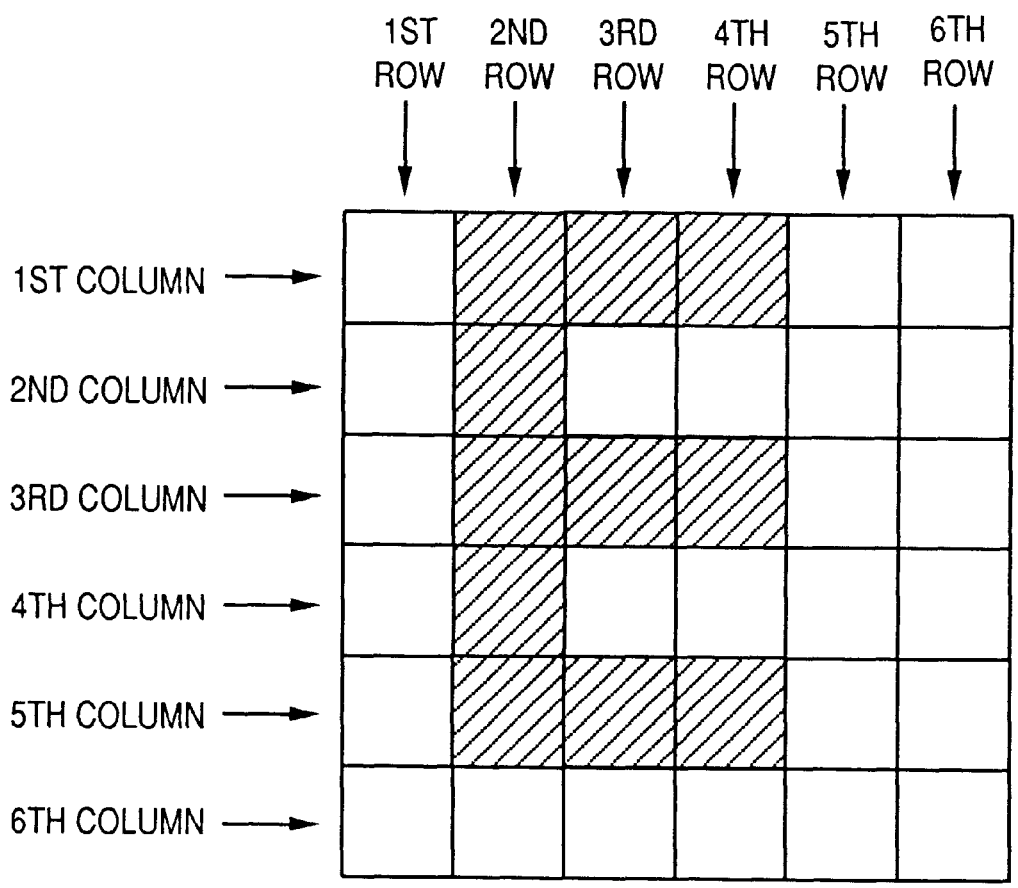
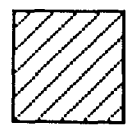 : EMIT ELECTRON
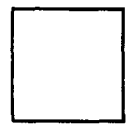 : NOT EMIT ELECTRON

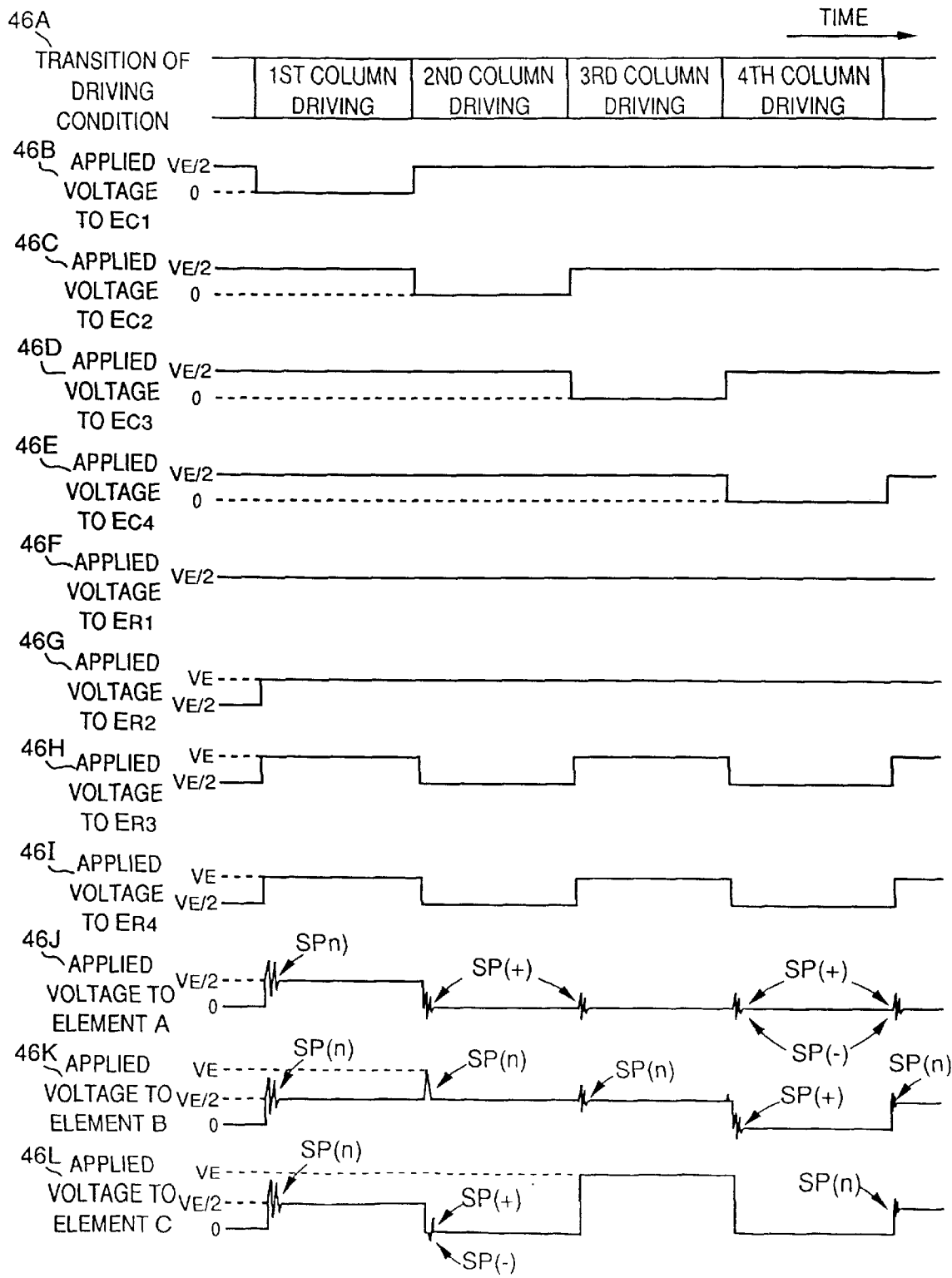

ELECTRON SOURCE, IMAGE FORMING APPARATUS USING THE SAME, METHOD OF MANUFACTURING THE SAME, AND METHOD OF DRIVING THE SAME

BACKGROUND OF THE INVENTION

1. Field of the Invention

This present invention relates to an electron source comprising a surface conduction typed electron emitting element and an image forming apparatus such as a display apparatus as an application of the electron source and, more particularly, to a method of manufacturing the same and a method of driving the same.

As conventional emitting elements, two types of elements, i.e., a thermonic cathode element and a cold cathode element are known. Of these elements, as a cold cathode element, a field emission type element (to be abbreviated as an FE type hereinafter), a metal-insulating layer-metal type emitting element (to be abbreviated as an MIM type hereinafter), a surface conduction type emitting element, and the like are known.

As an example of the FE type, for example, W. P. Dyke & W. W. Dolan, "Field emission", Advance in Electron Physics, 8, 89, (1956), C. A. Spindt, "Physical properties of thin-film field emission cathodes with molybdenum cones", J. Appl. Phys., 47, 52488 (1976), or the like is known.

As an example of the MIM type, for example, C. A. Mead, "Operation of tunnel-emission Devices", J. Appl. Phys., 32, 646 (1981), or the like is known.

As the surface condition type emitting element, for example, M. I. Elinson, Radio Eng. Electron Phys., 10, 1290(1965), or another example to be described below is known.

The surface conduction type emitting element utilizes a phenomenon in which electron emission takes place upon supplying a current to a small-area thin film formed on a substrate in a direction parallel to the film surface. As the surface conduction type emitting element, other than the above-mentioned element using an $SnO_2$ thin film of Elinson, an element using an Au thin film [G. Dittmer: "Thin Solid Films", 9, 317 (1972)], an element using an $In_2O_3/SnO_2$ thin film [M. Hartwell and C. G. Fonstad: "IEEE Trans. ED Conf.", 519 (1975)], an element using a carbon thin film [Hisashi Araki, et al.: Vacuum, Vol. 26, No. 1, 22 (1983)], and the like have been reported.

FIG. 39 is a plan view showing the above-mentioned element of M. Hartwell et al. as an example of the typical element structure of these surface conduction type emitting element. Referring to FIG. 39, reference numeral 3001 denotes a substrate; and 3004, a conductive thin film consisting of a metal oxide formed by sputtering. The conductive thin film 3004 has an H-character planar shape, as shown in FIG. 39. When the conductive thin film 3004 is subjected to an energization treatment called energization forming (to be described later), an electron emitting portion 3005 is formed. An interval L in FIG. 39 is set to be 0.5 to 1 [mm], and W is set to be 0.1 [mm]. Note that the electron emitting portion 3005 is illustrated in a rectangular pattern at the center of the conductive thin film 3004 for the sake of illustrative convenience, but it is merely an exemplary illustration one and does not faithfully express the position and shape of an actual electron emitting portion.

In the above-mentioned surface conduction type emitting elements such as the element of H. Hartwell et al., it is a common practice to perform an energization treatment called energization forming on the conductive thin film 3004 prior to electron emission, thereby forming the electron emitting portion 3005. More specifically, in the energization forming, the conductive thin film 3004 is energized by applying a constant DC voltage or a DC voltage which increases at a very slow rate (e.g., about 1 V/min) across the two terminals of the conductive thin film 3004 so as to locally destroy, deform, or denature the conductive thin film 3004, thereby forming the electron emitting portion 3005 in an electrically high-resistance state. Note that a fissure is formed in a portion of the locally destroyed, deformed, or denatured conductive thin film 3004. When a proper voltage is applied to the conductive thin film 3004 after the energization forming, electron emission occurs near the fissure.

The above-mentioned surface conduction type emitting element has an advantage of forming a large number of elements over a large area since its structure is simple and the manufacture is easy. For example, as disclosed in Japanese Patent Application Laid-Open (KOKAI) No. 64-31332 by the present applicant, a method of driving an array of a large number of elements has been studied.

As for an application of the surface conduction type emitting element, image forming apparatuses such as an image display apparatus, an image recording apparatus, and the like, a charged beam source, and the like have been studied.

In particular, as an application to the image display apparatus, as disclosed in, e.g., U.S. Pat. No. 5,066,883 to or Japanese Patent Application Laid-Open (KOKAI) No. 2-257551 by the present applicant, an image display apparatus which uses a combination of a surface conduction type emitting element and a phosphor and the like which emit light upon irradiation of an electron beam has been studied. The image display apparatus which uses a combination of a surface conduction type emitting element and a phosphor and the like are expected to have better characteristics than those of conventional image display apparatuses adopting other systems. For example, as compared to a liquid crystal display apparatus which has become popular in recent years, this apparatus does not require any backlight since it is of self emission type, and has a wider viewing angle.

SUMMARY OF THE INVENTION

The present inventors have manufactured, on an experimental basis, surface conduction type emitting elements which have various materials, manufacturing methods, and structures in addition to those described in the above-mentioned prior arts. Furthermore, the present inventors have studied a multi electron beam source including an array of a large number of surface conduction type emitting elements, and an image display apparatus which adopts the multi electron beam source.

The present inventors have experimentally manufactured a multi electron beam source based on an electrical wiring method, as shown in, e.g., FIG. 40. More specifically, the multi electron beam source includes a large number of surface conduction type emitting elements, which are two-dimensionally arranged, and are connected via wiring lines in a matrix pattern, as shown in FIG. 40.

Referring to FIG. 40, reference numeral 4001 denotes a surface conduction type emitting element, which is illustrated schematically; 4002, row-direction wiring lines; and 4003, column-direction wiring lines. The row- and column-direction wiring lines 4002 and 4003 have finite electrical resistances in practice, and FIG. 40 illustrate these resistances as wiring resistors 4004 and 4005. The above-mentioned wiring method is called a simple matrix wiring method.

For the sake of simplicity, FIG. 40 illustrates a 6×6 matrix. However, the matrix size is not limited to this, as a matter of course. For example, in the case of a multi electron beam source for an image display apparatus, elements as many as those for a desired image display are arranged and connected via wiring lines.

In the multi electron beam source which is constituted by connecting the surface conduction type emitting elements by the simple matrix wiring method, proper electrical signals are applied to the row and column-direction wiring lines 4002 and 4003 to output a desired electron beam. For example, in order to drive surface conduction type emitting elements in an arbitrary row in the matrix, a selection voltage $V_s$ is applied to the row-direction wiring line 4002 of a row to be selected, and at the same time, a non-selection voltage $V_{ns}$ is applied to the row-direction wiring lines 4002 of rows not to be selected. In synchronism with these voltages, a driving voltage $V_e$ for outputting an electron beam is applied to the column-direction wiring lines 4003. with this method, if a voltage drop across the wiring resistors 4004 and 4005 is ignored, a voltage $V_e$-$V_s$ is applied to each surface conduction type emitting element in the row to be selected, and a voltage $V_e$- $V_{ns}$ is applied to each surface conduction type emitting element in the rows not to be selected. When the voltages $V_e$, $V_s$, and $V_{ns}$ are set to be ones having appropriate magnitudes, an electron beam having a desired intensity can be output from only surface conduction type emitting elements in the row to be selected. Also, when different driving voltages $V_e$ are applied to the column-direction wiring lines, the elements in the row to be selected can output electron beams having different intensities. Since the surface conduction type emitting elements have a high response speed, if the duration of the application time of the driving voltage $V_e$ is changed, the duration of the output time of the electron beam can be changed.

Therefore, the multi electron beam source which is constituted by connecting the surface conduction type emitting elements by the simple matrix wiring method has various application possibilities. For example, when electrical signals corresponding to image information are appropriately applied, the multi electron beam source can be suitably used as an electron source for an image display apparatus.

However, the multi electron beam source which is constituted by connecting the surface conduction type emitting elements by the simple matrix wiring method suffers two problems to be described below in practice.

More specifically, as the first problem, the energization forming treatment results vary in units of elements in the energization forming treatment process, which is conducted in the middle of the manufacturing process of the surface conduction type emitting elements.

As the second problem, upon execution of electron emission by driving surface conduction type emitting elements after the manufacture, noise components superposed on driving signals to be applied to the elements deteriorate the characteristics of the elements and shorten their service lives.

The first and second problems will be described in more detail below.
(First Problem)

In various image forming panels, which adopt the surface conduction type emitting elements, such as the above-mentioned flat-panel CRT, high-quality, high-definition images are required, as a matter of course. In order to realize this, for example, a large number of surface conduction type electron emitting elements which are connected by the simple matrix wiring method are used. For this reason, a very large number of element arrays which constitute several hundred to several thousand rows and columns are required, and the surface conduction electron emitting elements are required to have uniform element characteristics.

However, the electron emitting characteristics of the surface conduction type electron emitting elements may change depending on energization forming conditions. Furthermore, in the case of the simple matrix wiring method, when energization forming treatment is performed for only a specific one element, a current undesirably leaks to another surface conduction type electron emitting element. Therefore, it is very difficult to perform energization forming by concentrating a current on each element without influencing other surface conduction type electron emitting elements which are not subjected to energization forming yet. In this case, all the surface conduction type electron emitting elements cannot be subjected to energization forming under the same condition, and a problem of a variation in element characteristics of the surface conduction type electron emitting elements is undesirably posed.
(Second Problem)

Referring to FIG. 41, reference symbol ES denote surface conduction type emitting elements; $E_{C1}$ to $E_{CM}$, column-direction wiring electrodes; and $E_{R1}$ to $E_{RN}$, row-direction wiring electrodes. In this multi electron beam source, M×N electron emitting elements are arranged in a matrix pattern, and are electrically connected using the column and row-direction wiring electrodes, thus constituting matrix wiring. In FIG. 41, each element group aligned in a direction parallel to the X direction will be referred to as an element column hereinafter, and each element group aligned in a direction parallel to the Y direction will be referred to as an element row hereinafter. Therefore, the matrix includes the first to M-th element columns and the first to N-th element rows.

When the multi electron beam source with the above-mentioned arrangement is to be driven, it is a general method to drive the elements by sequentially selecting element columns one by one. In the case of the multi electron beam source shown in FIG. 41, it is possible to cause a desired surface conduction type emitting element in the selected element column to emit an electron beam. This will be described below with reference to FIGS. 42 to 45.

FIG. 42 is a graph showing the general characteristics of a surface conduction type emitting element used as ES. In FIG. 42, the abscissa represents the voltage to be applied to the element, and the ordinate represents the electron beam current emitted from the element. In general, before a voltage to be applied to the surface conduction type emitting element exceeds a given threshold value voltage $V_{th}$, no electron beam is emitted from the element, and when the voltage exceeds the threshold value voltage $V_{th}$, the emitted electron beam increases in its intensity as the applied voltage increases. For this reason, it is easy to set a voltage $V_E$, so that an electron beam is not emitted at $V_E/2$ but is emitted at $V_E$. A driving method using the voltage $V_E$, which is set in this manner, will be described below.

For example, a case will be exemplified below wherein the first element column in the multi electron beam source is selected, and electron beams are to be emitted from only the surface conduction type emitting elements in the second to fifth rows. FIG. 43 is view showing voltages to be applied to the wiring electrodes to achieve the above-mentioned purpose. As shown in FIG. 43, of the column-direction wiring electrodes $E_{C1}$ to $E_{C6}$, a voltage of 0 [V] is applied to the wiring electrode $E_{C1}$ of the first column, and a voltage $V_E/2$ [V] is applied to other electrodes $E_{C2}$ to $E_{C6}$. Of the row-direction wiring electrodes $E_{R1}$ to $E_{R6}$, a voltage $V_E$ [V] is applied to the wiring electrodes $E_{R2}$ to $E_{R5}$ of the second to fifth rows, and a voltage $V_E/2$ [V] is applied to the electrodes $E_{R1}$ and $E_{R6}$. Since each surface conduction type emitting element is applied with a difference voltage between voltages applied to the row and column-direction wiring electrodes connected thereto, the voltage $V_E$ [V] is applied to the surface conduction type emitting elements painted in black in FIG. 43, the voltage $V_E/2$ [V] is applied to the electron emitting elements indicated by oblique and horizontal stripe patterns, and the voltage of 0 [V] is applied to the surface conduction type emitting elements indicated by dots. More specifically, the voltage $V_E$ [V] which exceeds an electron emitting threshold value is applied to the desired electron emitting elements, and these elements output electron beams. However, other surface conduction type emitting elements do not output any electron beams.

As has been exemplified above, a voltage of 0 [V] is applied to the column-direction wiring electrode of an element column to be driven, and a voltage $V_E/2$ [V] is applied to the column-direction wiring electrodes of other element columns, thereby selecting the element column to be driven. Furthermore, of the electron emitting elements in the selected element column, a voltage $V_E$ [V] is applied to the row-direction wiring electrodes of rows from which electron beams are to be output, and a voltage $V_E/2$ [V] is applied to the row-direction wiring electrodes of rows from which electron beams are not to be output, thus achieving the intended purpose. In the above-mentioned method, since a voltage applied to the row-direction wiring electrodes of a row from which electron beams are to be output is uniquely determined to be $V_E$ [V], the intensity of an electron beam to be output is also uniquely determined to be $I_1$. However, when a voltage to be applied having an appropriate magnitude is selected from a range from $V_{th}$ to $V_E$ in correspondence with the electron emitting characteristics shown in FIG. 42, the intensity of an electron beam to be output can be controlled within a range from 0 to $I_1$.

The multi electron beam source itself constitutes an X-Y matrix type electron beam source, and is expected to be applied to a display apparatus such as a flat-panel CRT.

However, when the multi electron beam source shown in FIG. 41 is actually driven by an electrical circuit, a problem of application of a spike voltage to non-selected surface conduction type emitting elements is posed. FIGS. 44 to 46 are views for explaining such a problem.

FIG. 44 shows a typical electrical circuit used for driving the multi electron beam source shown in FIG. 41. As shown in FIG. 41, switching elements such as field effect transistors (FETs) are connected in a totem-pole pattern to each wiring electrode. A circuit connected to the column-direction wiring electrodes $E_{C1}$ to $E_{CM}$ is a circuit for selectively applying a voltage $V_E/2$ [V] or 0 [V] to these wiring electrodes, and a circuit connected to the row-direction wiring electrodes $E_{R1}$ to $E_{RN}$ is a circuit for selectively applying a voltage $V_E$ [V] or $V_E/2$ [V] to these wiring electrodes. By appropriately controlling gate signals $GP_{C1}$ to $GP_{CM}$, $GN_{C1}$ to $GN_{CM}$, $GP_{R1}$ to $GP_{RN}$, and $GN_{R1}$ to $GN_{RN}$ of the FETs, desired voltages can be selectively applied to the wiring electrodes.

FIG. 45 is a view for explaining an example of an arbitrary driving pattern of the multi electron beam source. The following explanation will be given with reference to a case wherein electron beams are to be emitted from the multi electron beam source in accordance with an E-pattern, as shown in FIG. 45 (indicated by hatching in FIG. 45). In a general sequence for driving the multi electron beam source, the element columns are driven column by column in the order of the first column, second column, third column, . . . , to complete the E-pattern shown in FIG. 45. 46A of FIG. 46 shows the temporal transitions of this driving sequence.

The method of applying voltages to the wiring electrodes upon driving of the element columns is as has been described above. For example, when the first column is to be driven, the driving voltages can be applied to the wiring electrodes in the same manner as that described above with reference to FIG. 43. 46B to 46I of FIG. 46 show the temporal transitions of voltages applied to the wiring electrodes $E_{C1}$ to $E_{C4}$ and $E_{R1}$ to $E_{R4}$.

When the multi electron beam source is driven by the electrical circuit shown in FIG. 44 in accordance with the above-mentioned sequence, and voltages actually applied to the electron emitting elements are observed using, e.g., an oscilloscope or the like, it is found that a spike voltage which is often undesirably applied. For example, when three elements indicated by A, B, and C in FIG. 44 are taken as examples, voltage waveforms observed for these elements are as shown in 46A to 46L in FIG. 46. In FIG. 46, undesirable spike voltages are indicated by SP(−), SP(+), and SP(n).

Causes of such spike voltages include an instantaneous operation error of the FETs due to electrical noise, electrical induction generated due to mutual inductances with wiring electrodes, deformation of the applied voltage waveform due to the inductances, capacitances, resistances, or the like of the wiring electrodes before it reaches the electron emitting elements, and shifts in the operation timings of the FETs for driving the column-direction wiring electrodes and the operation timings of the FETs for driving the row-direction wiring electrodes from each other.

Of these spike voltages, when a reverse direction voltage SP(−) is applied to a surface conduction type emitting element, the electron emitting characteristics of the element may deteriorate in a considerably early stage, or the element may be instantaneously destroyed. Therefore, a serious problem is posed in an application of the above-mentioned multi electron beam source to, e.g., a display apparatus or the like.

Under these circumstances, the present invention, which solves the above-mentioned problems, provides a method of manufacturing an electron source in which a plurality of surface conduction type electron emitting elements connected to row- and column-direction wiring lines are arranged on a substrate in a matrix, comprising the energization forming treatment step executed by applying voltages to the surface conduction type electron emitting elements via the row- and column-direction wiring lines, the forming treatment step including the step of applying a voltage to each of the surface conduction type electron emitting elements via a nonlinear element which is connected in series with the surface conduction type electron emitting element and has nonlinear voltage/current characteristics.

It is another object of the present invention to provide a method of manufacturing an image forming apparatus having an electron source in which a plurality of surface conduction type electron emitting elements connected to row- and column-direction wiring lines are arranged on a substrate in a matrix, and an image forming member for forming an image upon irradiation by an electron beam emitted from said electron source, wherein said electron source is manufactured by a method comprising the forming treatment step executed by applying voltages to the surface conduction type electron emitting elements via the row- and column-direction wiring lines, the forming treatment step including the step of applying a voltage to each of the surface conduction type electron emitting elements via a nonlinear element which is connected in series with the surface conduction type electron emitting element and has nonlinear voltage/current characteristics.

It is still another object of the present invention is to provide an electron source which has a surface conduction type electron emitting element and emits an electron beam in accordance with an input signal, wherein an element for removing a noise component superposed on the input signal is connected in series with said surface conduction type electron emitting element.

It is still another object of the present invention is to provide an image forming apparatus having an electron source and an image forming member for forming an image upon irradiation by an electron beam emitted from said electron source, wherein said electron source is an electron source which has a surface conduction type electron emitting element and emits an electron beam in accordance with an input signal, wherein an element for removing a noise component superposed on the input signal is connected in series with said surface conduction type electron emitting element.

It is still another object of the present invention is to provide a surface conduction type electron emitting element, comprising the step of applying a signal from which a noise component superposed on the signal is removed to said surface conduction type electron emitting element.

It is still another object of the present invention is to provide a method of driving an image forming apparatus having an electron source and an image forming member for forming an image upon irradiation by an electron beam emitted from said electron source, wherein said electron source is driven by a method comprising the step of applying a signal from which a noise component superposed on the signal is removed to said surface conduction type electron emitting element.

Other features and advantages of the present invention will be apparent from the following description taken in conjunction with the accompanying drawings, in which like reference characters designate the same or similar parts through out the figures thereof.

BRIEF DESCRIPTION OF THE DRAWINGS

FIG. 3 is a graph showing an example of a voltage waveform to be applied to an element in a forming treatment in the manufacture of the flat type surface conduction type emitting element according to the preferred aspect;

FIG. 4 is a perspective view showing a vertical type surface conduction type emitting element according to another preferred aspect of the present invention;

FIGS. 10(7) to 10(10) are sectional views for explaining the processes in the manufacture of a surface conduction type emitting element portion in the multi electron source according to the embodiment of the present invention;

FIG. 28 is a circuit diagram of a multi electron source for the television display apparatus;

FIG. 29 is a view showing an example of a display image pattern;

FIG. 45 is a view showing an example of the driving pattern; and

FIG. 46 is a timing chart showing an example of the driving voltage waveforms.

DESCRIPTION OF THE PREFERRED EMBODIMENTS

The present invention will be described in detail hereinafter with reference to the accompanying drawings.

First, a surface conduction type emitting element upon practice of the present invention will be described below.

The materials and structures of a surface conduction type emitting element, which can be used in the present invention, are not particularly limited, and may be those described in, e.g., the prior art. However, from the viewpoint of the electron emitting characteristics and easy manufacture, a surface conduction type emitting element according to the following aspect is used as a particularly preferred surface conduction type emitting element.
(Preferred Aspect of Surface Conduction Type Emitting Element)

As the basic structure of a preferred surface conduction type electron emitting element, two structures, i.e., flat type and vertical type structures, are known. A flat type surface conduction type electron emitting element will be described below.

Figure 1A:
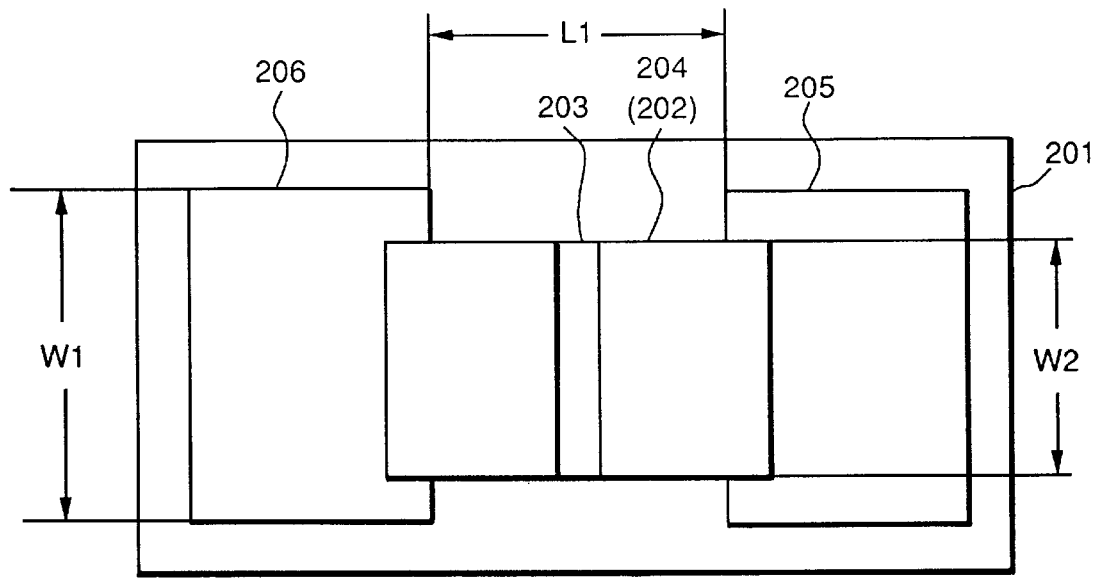
FIGS. 1(a) and 1(b) are respectively a plan view and a sectional view showing a flat type surface conduction type emitting element according to a preferred aspect of the present invention.
Figure 1B:
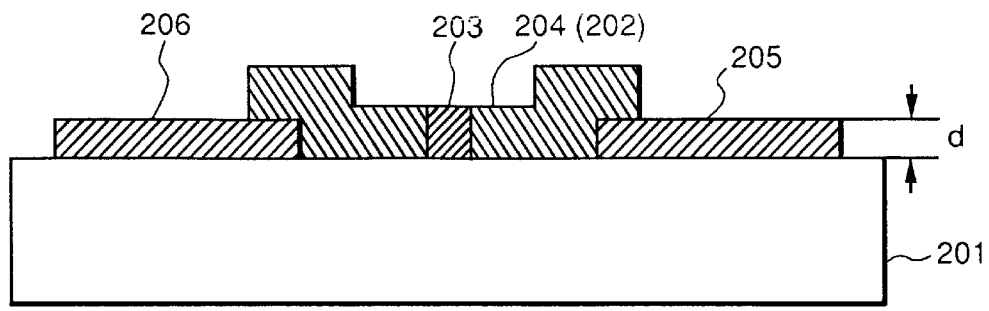

FIGS. 1(a) and 1(b) are respectively a plan view and a sectional view showing the structure of a basic flat type surface conduction type electron emitting element. The basic structure of the element will be described below with reference to FIGS. 1(a) and 1(b). Referring to FIGS. 1(a) and 1(b), reference numeral 201 denotes a substrate; 205 and 206, element electrodes; 204, a thin film including an electron emitting portion; and 203, an electron emitting portion. Note that reference numeral 202 denotes an electron emitting portion formation thin film, which represents a thin film before the electron emitting portion 203 is formed.

The material of the opposing element electrodes 205 and 206 is not particularly limited as long as it has conductivity. For example, the material includes a print conductor consisting of a metal such as Ni, Cr, Au, Mo, W, Pt, Ti, Al, Cu, Pd, or the like, or alloy consisted of a combination of them, or a metal such as Pd, Ag, Au, $RuO_2$, Pd—Ag, or the like, or metal oxide or glass, and the like; a transparent conductor such as $In_2O_3$—$SnO_2$ or the like; a semiconductor material such as polycrystalline silicon, or the like; and the like.

An element electrode interval L1 ranges from several hundreds of Å to several hundreds of $\mu$m, and is set on the basis of a photolithography technique as the basis of the method of manufacturing the element electrodes, i.e., the performance and etching method of an exposure device, the voltage applied between the element electrodes, and the like. The element electrode interval L1 preferably falls within a range from 1 $\mu$m to 10 $\mu$m. An element electrode length W1 and a film thickness d of each of the element electrodes 205 and 206 is appropriately designed on the basis of the resistances of the electrodes, connections of the above-mentioned X and Y wiring lines, and a problem associated with the arrangement of a large number of electron sources. Normally, the element electrode length W1 falls within a range from several $\mu$m to several hundreds of $\mu$m, and the film thickness d of each of the element electrodes 205 and 206 preferably falls within a range from several hundreds of Å to several $\mu$m.

The thin film 204, which is formed on a portion between the opposing element electrodes 205 and 206 formed on the substrate 201, and on the element electrodes 205 and 206, and includes the electron emitting portion, includes the electron emitting portion 203. FIG. 1(b) shows a case the thin film 204 including the electron emitting portion is formed on the element electrodes 205 and 206. However, in some cases, the thin film 204 including the electron emitting portion is not formed on the element electrodes 205 and 206. More specifically, such a structure is formed when films are stacked in the following order. That is, after the electron emitting portion formation thin film 202 is stacked on the insulating substrate 201, the opposing element electrodes 205 and 206 are stacked thereon.

Also, depending on the manufacturing methods, the entire portion between the opposing element electrodes 205 and 206 may serve as the electron emitting portion. The film thickness of the thin film 204 including the electron emitting portion falls within a range from several Å to several thousands of Å, and preferably, falls within a range from 10 Å to 200 Å. The film thickness of the thin film 204 is appropriately set on the basis of the step coverage to the element electrodes 205 and 206, the resistance between the element emitting portion 203 and the element electrodes 205 and 206, the particle sizes of conductive fine particles of the electron emitting portion 203, an energization treatment condition (to be described later), and the like. The resistance exhibits a sheet resistance of $10^3$ to $10^7$ Ω per unit area.

Examples of the materials constituting the thin film 204 including the electron emitting portion include metals such as Pd, Ru, Ag, Au, Ti, In, Cu, Cr, Fe, Zn, Sn, Ta, W, Pb, and the like; oxides such as PdO, $SnO_2$, $In_2O_3$, PbO, $Sb_2O_3$, and the like; borides such as $HfB_2$, $ZrB_2$, $LaB_6$, $CeB_6$, $YB_4$, $GdB_4$, and the like; carbides TiC, ZrC, HfC, TaC, SiC, WC, and the like; nitrides such as TiN, ZrH, HfN, and the like; semiconductors such as Si, Ge, and the like; carbon; AgMg; NiCu; Pb; Sn; and the like, and they consist of fine particle films.

Note that the fine particle film is a film constituted by a collection of a plurality of fine particles, and corresponds to a film which has, as a fine structure, a state wherein fine particles are individually dispersed but also a state wherein fine particles are adjacent to or overlap each other (including an island state).

The electron emitting portion 203 consists of a large number of conductive fine particles each having a particle size falling within a range from severa; Å to several thousands of Å and, preferably, falling within a range from several 10 Å to 200 Å, and the portion 203 depends on the film thickness of the thin film 204 including the electrode emitting portion and a manufacturing method such as an energization forming treatment condition (to be described later), and the like. The film thickness and the above condition are appropriately set. The material of the electron emitting portion 203 is the same as some or all of elements of the material constituting the thin film 204 including the electron emitting portion.

<Basic Manufacturing Method>

Figure 2A:
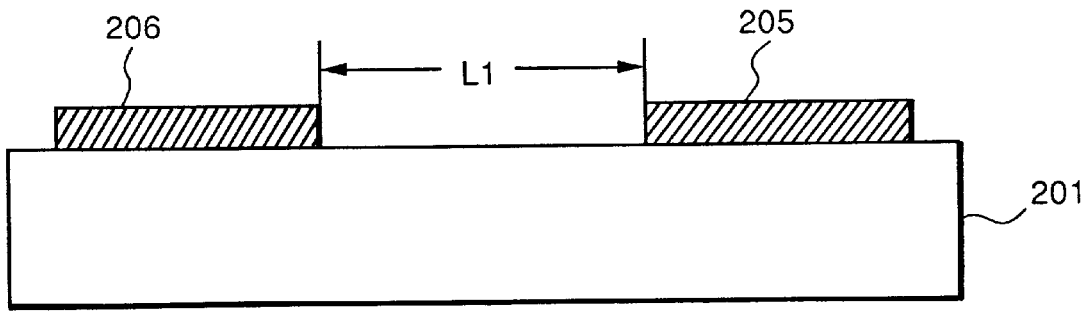
FIGS. 2(a) to 2(c) are sectional views showing the method of manufacturing a flat type surface conduction type emitting element according to the preferred aspect.
Figure 2B:
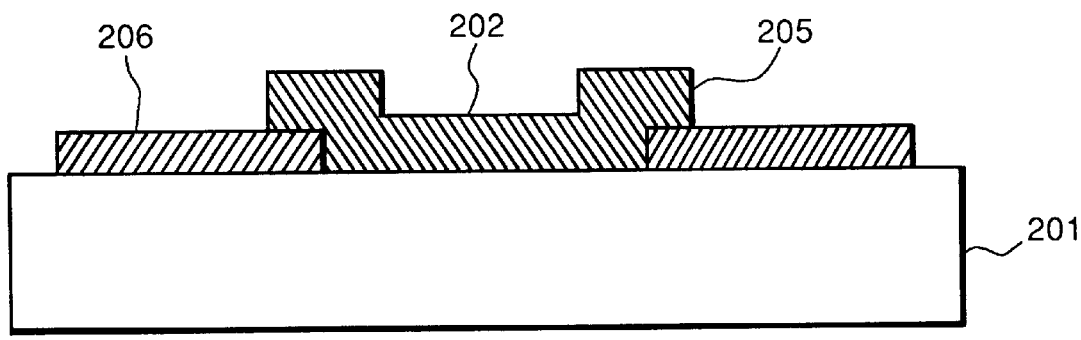
Figure 2C:
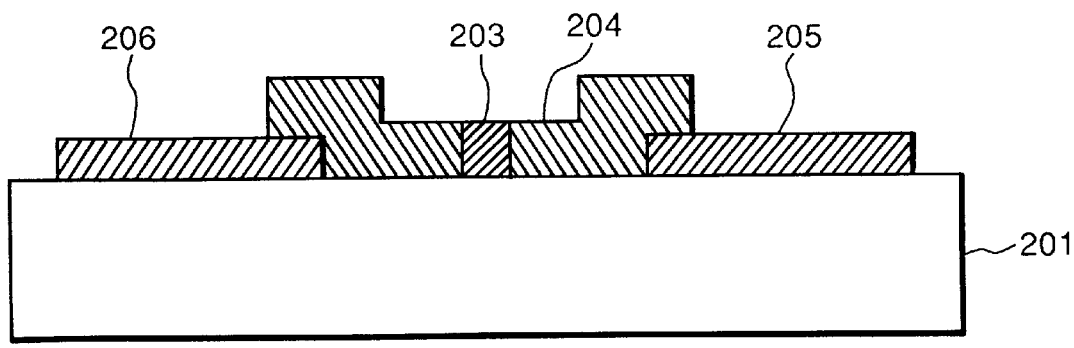

Various methods of manufacturing a surface conduction type electron emitting element having the electron emitting portion 203 are available. FIGS. 2(a) to 2(c) show an example of the manufacturing method. Note that reference numeral 202 denotes an electron emitting portion formation thin film comprising, e.g., a fine particle film.

The manufacturing method will be described in turn with reference to FIGS. 1(a) and 1(b) and FIGS. 2(a) to 2(c).

1) After a substrate 201 is sufficiently washed using a detergent, pure water, and an organic solvent, an element electrode material is deposited by a vacuum deposition technique, a sputtering method, and the like, and thereafter, element electrodes 205 and 206 are formed on the surface of the substrate 201 by a photolithography technique (FIG. 2(a)).

2) An organometallic compound solution is coated and left to stand on a portion between the element electrodes 205 and 206, which are formed on the substrate 201, and on the substrate on which the element electrodes 205 and 206 are formed, thus forming an organometallic compound thin film. Note that the organometallic compound solution is a solution of an organic compound which contains the above-mentioned metal such as Pd, Ru, Ag, Au, Ti, In, Cu, Cr, Fe, Zn, Sn, Ta, W, Pb, or the like as a major element. Thereafter, the organometallic compound thin film is subjected to a heating calcination treatment, and is patterned by lift-off, etching, and the like, thereby forming an electron emitting portion formation thin film 202 (FIG. 2(b)).

Note that a method of coating an organometallic compound solution is used in this case. However, the present invention is not limited to this method. For example, the electron emitting portion formation thin film may be formed by a vacuum deposition method, a sputtering method, a chemical vapor deposition method, a dispersion coating method, a dipping method, a spinner method, or the like.

3) Subsequently, an energization treatment called forming is performed. When an energization forming treatment is performed by applying a pulse voltage from a power supply (not shown) between the element electrodes 205 and 206, an electron emitting portion 203 whose structure is changed from the remaining film portion is formed in a portion of the electron emitting portion formation thin film 202 (FIG. 2(c)).

With this energization forming treatment, the electron emitting portion formation thin film 202 is locally destroyed, deformed, or denatured. In this manner, a portion whose structure is changed by energization forming treatment is called the electron emitting portion 203. As has been described above, the present applicants observed that conductive fine particles were present near the electron emitting portion 203.

FIG. 3 shows a voltage waveform in the energization forming treatment.

Referring to FIG. 3, reference numerals T1 and T2 respectively denote the pulse width and the pulse interval of the voltage waveform. The pulse width T1 is appropriately selected to fall within a range from 1 μsec to 10 μsec, the pulse interval T2 is appropriately selected to fall within a range from 10 μsec to 100 msec, the crest value of a triangular wave (the peak voltage upon forming) is appropriately selected to fall within a range from about 4 V to 10 V, and the energization forming treatment is performed in a vacuum atmosphere within a range of about several tens of seconds.

Upon formation of the above-mentioned electron emitting portion, the energization forming treatment is performed by applying a triangular wave pulse between the electrodes of an element. However, the waveform of a voltage applied between the electrodes of the element is not limited to a triangular wave, but a desired waveform such as a rectangular wave may be used. Furthermore, the crest value, the pulse width, the pulse interval, and the like of the waveform are not limited to the above-mentioned values, and desired values may be selected as long as the electron emitting portion can be satisfactorily formed.

In the surface conduction type electron emitting element which is constituted by dispersing conductive fine particles in advance, the basic element structure and the basic manufacturing method may be partially modified.

A vertical type surface conduction type electron emitting element as another structure of the preferred surface conduction type electron emitting element will be described below.

FIG. 4 is a perspective view showing the basic structure of a vertical type surface conduction type electron emitting element. Referring to FIG. 4, reference numeral 251 denotes a substrate; 255 and 256, element electrodes; 254, a thin film including an electron emitting portion; 253, an electron emitting portion; and 257, a step formation portion. Note that the position of the electron emitting portion 253 changes depending on the thickness and manufacturing method of the step formation portion 257, the thickness and manufacturing method of the thin film 254 including the electron emitting portion, and the like, and is not limited to that illustrated in FIG. 4.

The substrate 251, the element electrodes 255 and 256, the thin film 254 including the electron emitting portion, and the electron emitting portion 253 consist of the same materials as those of the flat type surface conduction type electron emitting element. Therefore, in the following description, the step formation portion 257 and the thin film 254 including the electron emitting portion, as the characteristic features of the vertical type surface conduction type electron emitting element, will be described in detail below.

The step formation portion 257 consists of an insulating material such as $SiO_2$ formed by a vacuum deposition method, a print method, a sputtering method, and the like. The thickness of the step formation portion 257 corresponds to the element electrode interval L1 of the flat type surface conduction type electron emitting element, and falls within a range from several hundreds of Å to several tens of μm. The thickness of the step formation portion 257 is set on the basis of the manufacturing method of the step formation portion 257, and the voltage applied between the element electrodes, and preferably falls within a range from 1,000 Å to 10 μm.

The thin film 254 including the electron emitting portion is stacked on the element electrodes 255 and 256 since it is formed after the element electrodes 255 and 256 and the step formation portion 257 are formed. The film thickness of a step portion of the thin film 254 including the electron emitting portion is often different from the film thickness of portions each stacked on the element electrodes 255 and 256. Normally, the film thickness of the step portion is smaller than that of the portion stacked on the element electrode. As a result, the thin film 254 can be subjected to an energization forming treatment easier than that in the above-mentioned flat type surface conduction type electron emitting element to form the electron emitting portion 253.

The preferred aspects of the surface conduction type emitting elements have been described. The preferred embodiments of the present invention which solve the above-mentioned (First Problem) will be described in the following first to sixth embodiments.

Each of these embodiments relates to a method of manufacturing an electron source in which a plurality of surface conduction type electron emitting elements are arranged in a matrix, and more particularly, to an energization forming treatment method. In each of these embodiments, elements each having a structure in which a nonlinear element having nonlinear voltage-current characteristics is connected in series with an electron emitting portion formation thin film are arranged to be connected to wiring lines in the row and column directions, and by applying a forming voltage to the electron emitting portion formation thin film to be subjected to an energization forming treatment via the wiring lines in the row and column directions and the nonlinear element of the element, the surface conduction type electron emitting element can have uniform electron emitting characteristics. In this case, since the connected nonlinear element serves to cut off the forming voltage, no forming voltage is applied to surface conduction type electron emitting elements of other elements.

[First Embodiment]

Figure 5:
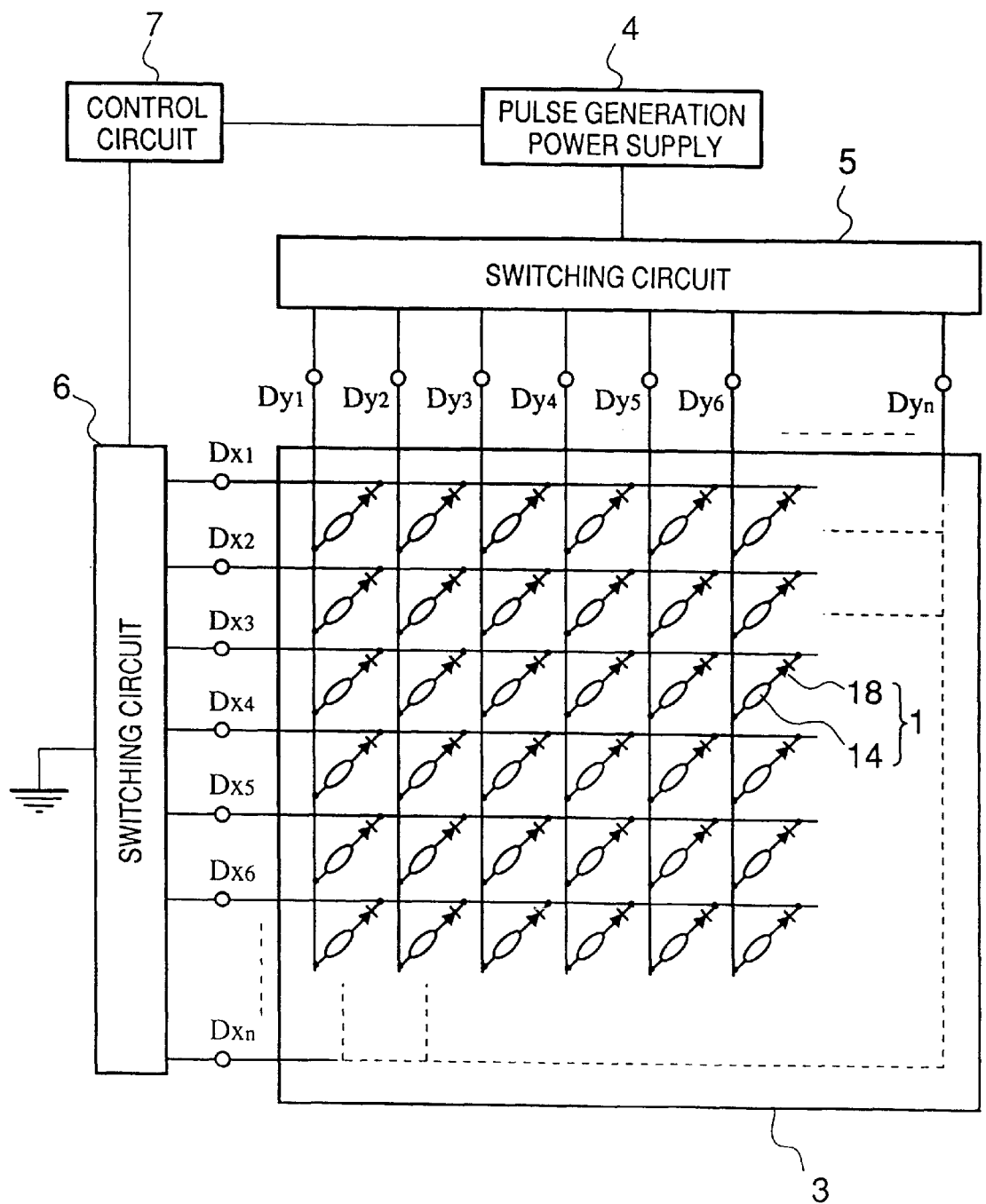
FIG. 5 is a block diagram showing a forming method of a surface conduction type emitting element according to the present invention, and an example of a device used in forming.

FIG. 5 is a schematic block diagram showing the arrangement of an electrical circuit for performing energizatioh forming treatment in this embodiment.

Referring to FIG. 5, reference numeral 14 denotes a surface conduction type electron emitting element, on which an electron emitting portion is formed by executing an energization forming treatment for an electron emitting portion formation thin film (inside the element 14). The surface conduction type electron emitting elements 14 are arranged in an M×N matrix. Reference numeral 18 denotes a diode element, which is connected in series with the surface conduction type electron emitting element 14. The surface conduction type electron emitting element 14 and the diode element 18 constitute an electron source element 1. The electron source elements 1 are arranged in an M×N matrix to constitute an electron source 3 having a large number of surface conduction type electron emitting elements 14 (to be referred to as an electron source 3 hereinafter). Reference numeral 4 denotes a pulse generation power supply, which generates forming pulses.

Reference numerals 5 and 6 denote switching circuits; and 7, a control circuit. The switching circuit 5 comprises switch elements for switching whether forming pulses from the pulse generation power supply 4 are applied to row-direction terminals DY1 to DYn or the terminals are set in a floating state. The switching circuit 6 comprises switch elements for switching whether column-direction terminals DX1 to DXn are connected to ground or the terminals are set in a floating state. The switching circuits 5 and 6 can simultaneously select a plurality of terminals. The control circuit 7 controls the switching operations of the switching circuits 5 and 6, and the pulse generation timings of the pulse generation power supply 4.

A method of selecting the surface conduction type electron emitting element 14 to be subjected to energization forming treatment will be described below with reference to FIGS. 5 and 6.

Figure 6:
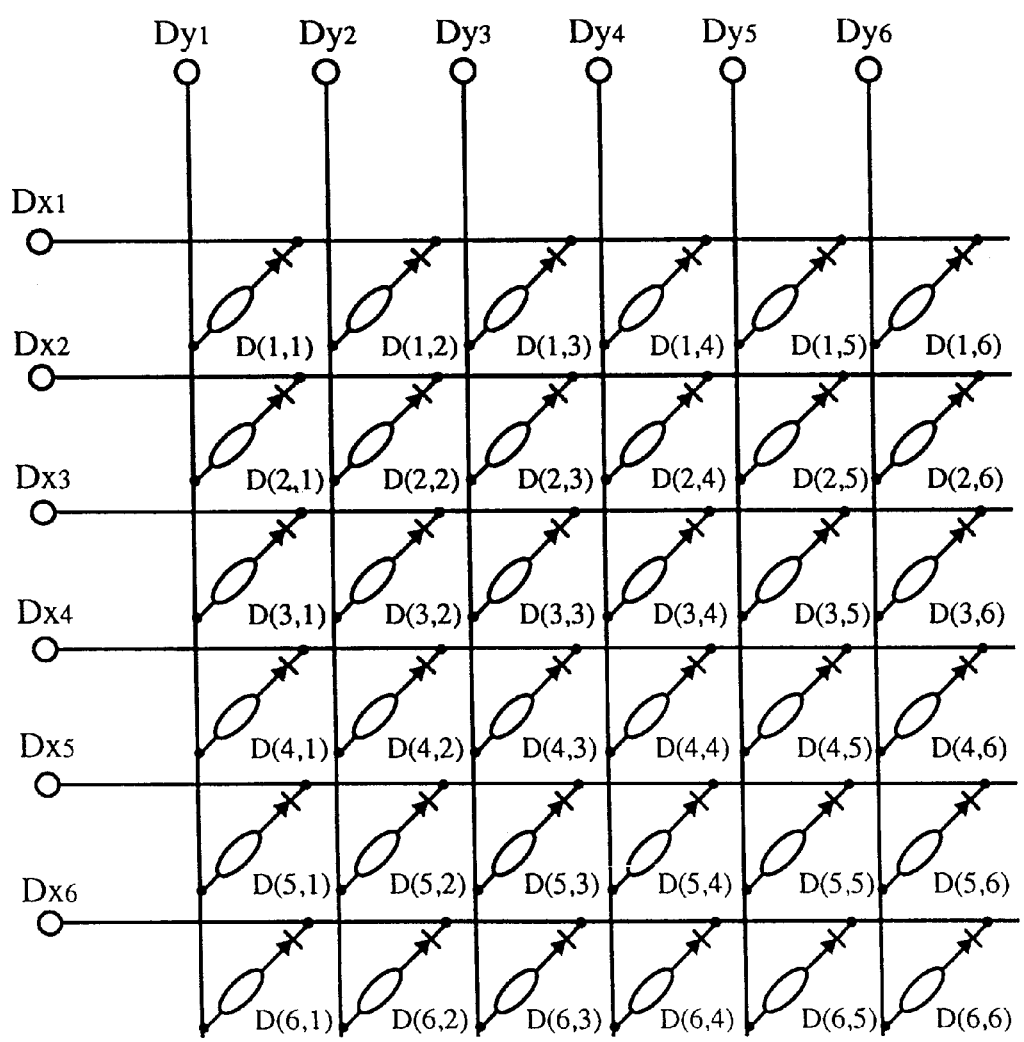
FIG. 6 is a circuit diagram of a multi electron source according to an embodiment of the present invention.

FIG. 6 shows a 6×6 matrix extracted from the entire matrix of the electron source 3.

For the sake of simplicity, the surface conduction type electron emitting elements are indicated by D(X, Y) coordinates like D(1, 1), D(1, 2), . . . , D(6, 6) to be discriminated from each other.

For example, when energization forming treatment is performed for the surface conduction type electron emitting element D(3, 2) in FIG. 6, the switching circuit 6 connects the terminal DX3 to ground and sets other terminals in a floating state under the control of the control circuit 7. Furthermore, the switching circuit 5 connects the terminal DY2 to the pulse generation power supply 4. In this manner, the forming pulse is applied between the terminals DY2 and DX3. At this time, no current leaks to other elements since it is reverse-biased by the diode elements 18 connected in series with the surface conduction type electron emitting elements 1 or is supplied to the terminals in the floating state. Therefore, since the forming pulse can be individually applied to each electron emitting portion formation thin film (in the element 14), uniform energization forming treatment can be performed for each element.

Furthermore, the energization forming range can be changed freely to some extent to allow, e.g., forming in units of elements in one line or in units of elements in several lines within a current capacity allowable range, and forming within a certain range. For this reason, elements with different forming conditions in units of positions or elements can also be formed.

The electron source 3 of this embodiment will be described in more detail below.

Figure 7:
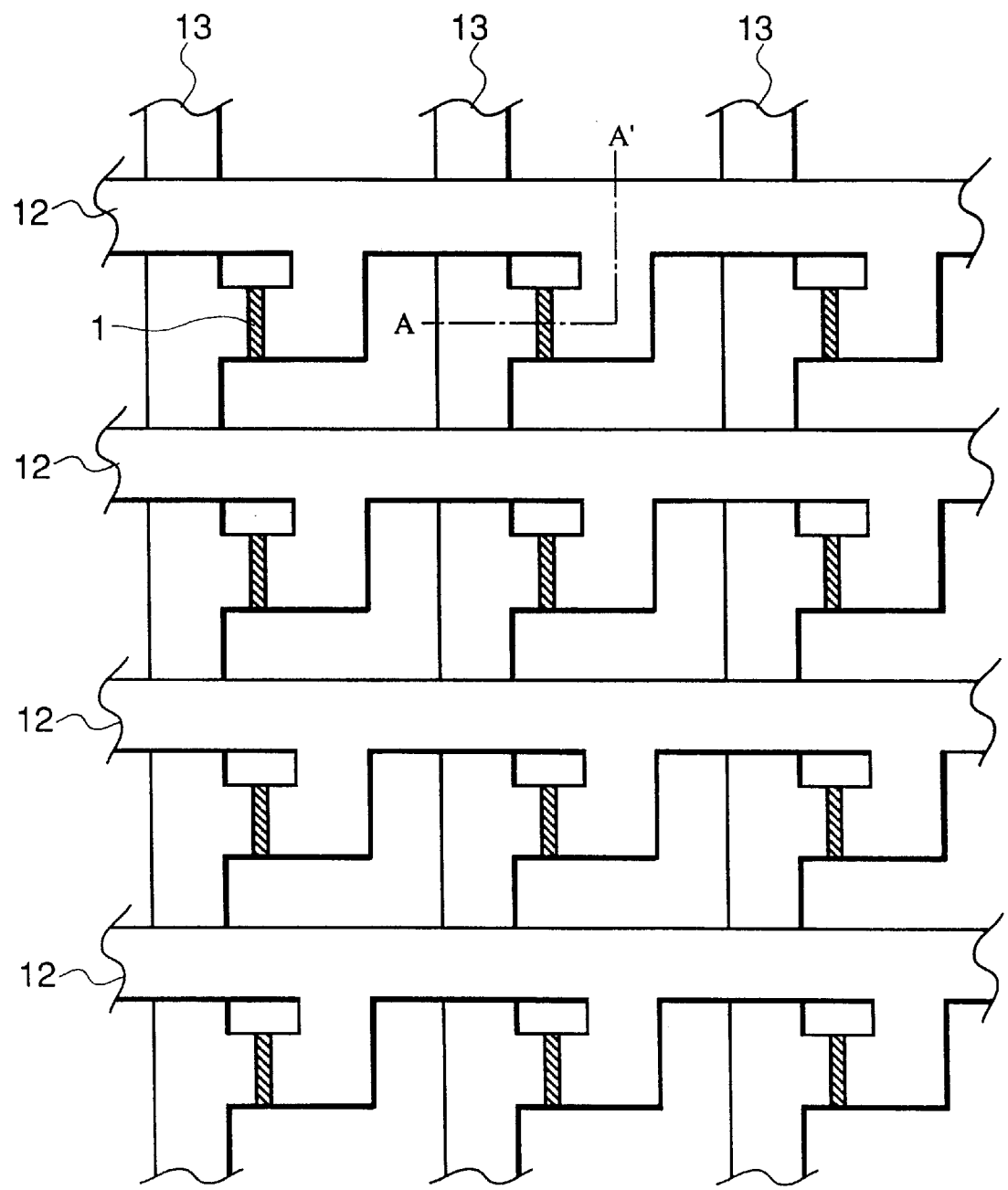
FIG. 7 is a plan view of the multi electron source according to the embodiment of the present invention.
Figure 8:
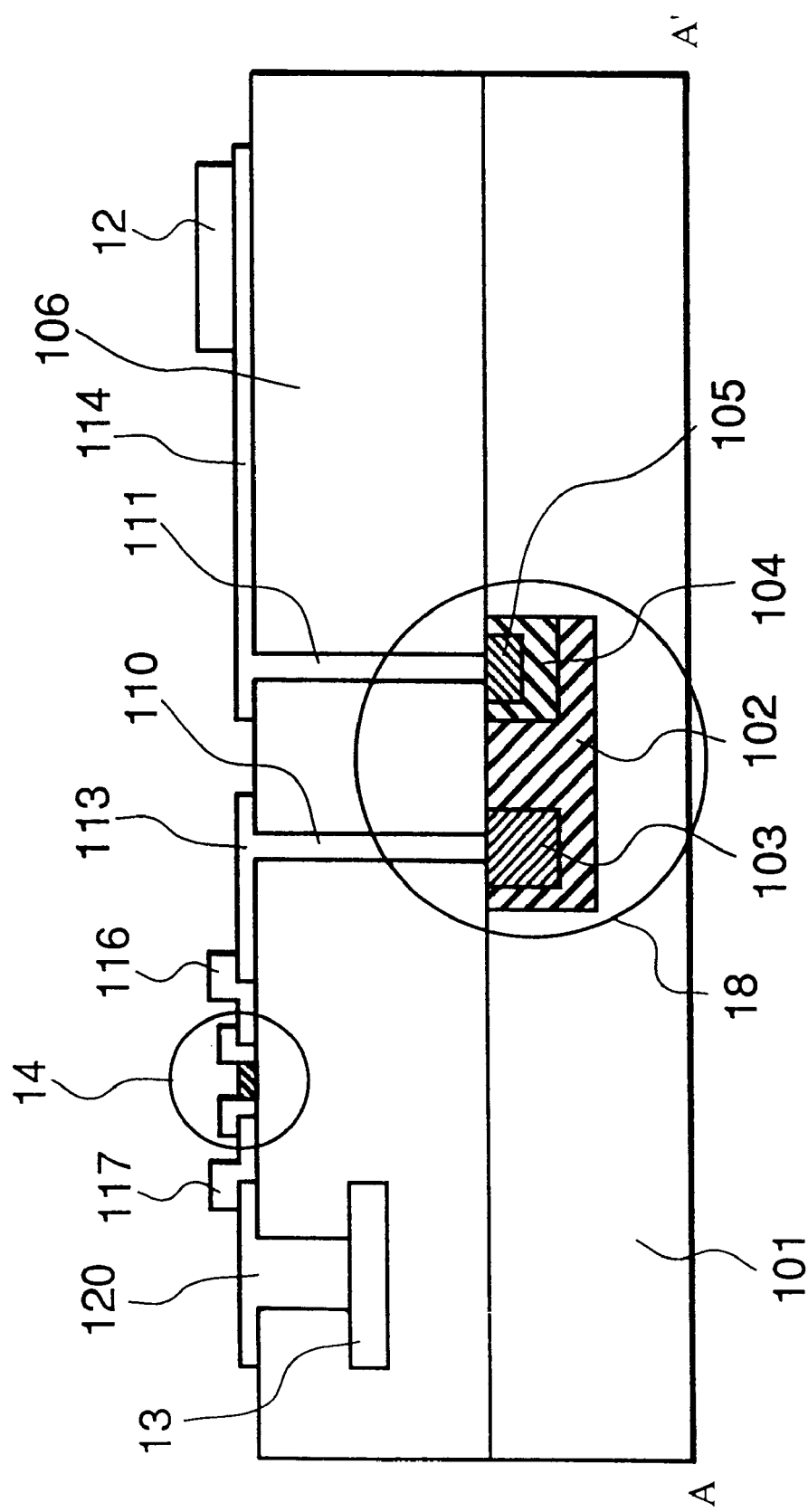
FIG. 8 is a sectional view of the multi electron source according to the embodiment of the present invention.

FIG. 7 is a partial plan view of the electron source 3. FIG. 8 is a sectional view taken along a line A-A' in FIG. 7. Furthermore, FIGS. 9(1) to 9(6) and FIGS. 10(7) to 10(10) show processes in the manufacture of the electron source 3 of this embodiment.

Referring to FIG. 7, reference numeral 12 denotes column-direction wiring lines including n wiring lines DX1 to DXn. Reference numeral 13 denotes row-direction wiring lines including m wiring lines DY1 to DYm.

FIG. 8 is a schematic sectional view showing an example of an electron source substrate, in which a surface conduction type electron emitting element as an electron emitting element is formed on an n-type silicon substrate formed with a diode.

Referring to FIG. 8, reference numeral 101 denotes an n-type silicon substrate; 12, an column-direction wiring line; and 13, a row-direction wiring line. In the surface conduction type electron emitting element 14, the electron emitting portion is formed by performing an energization forming treatment of the electron emitting portion formation thin film.

A p-type well diffusion layer 102 is formed in a portion of the n-type silicon substrate 101. A $p^+$-type layer 103 electrically connected to an anode electrode 110 of the diode is formed around the p-type well layer 102. Also, $n^+$- and n-type layers electrically connected to a cathode electrode 111 of the diode are formed.

The upper portions of these diode structure portions are covered by an insulating layer 106 consisting of $SiO_2$, and the anode and cathode electrodes 110 and 111 are respectively connected to aluminum wiring lines 113 and 114.

The diode is formed between the anode and cathode electrodes 110 and 111. The anode electrode 110 is electrically connected to an electrode 116 of the surface conduction type electron emitting element 14 via the aluminum wiring line 113. The other electrode 117 of the surface conduction type electron emitting element 14 is electrically connected to the row-direction wiring line 13 via an aluminum wiring line 120. The cathode electrode 111 of the diode is electrically connected to the column-direction wiring line 12 via an aluminum wiring line 114.

Figure 9:
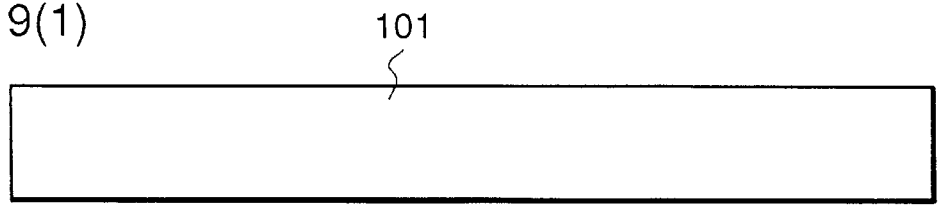
FIGS. 9(1) to 9(6) are sectional views for explaining the processes in the manufacture of a nonlinear element portion in the multi electron source according to the embodiment of the present invention.
Figure 9:
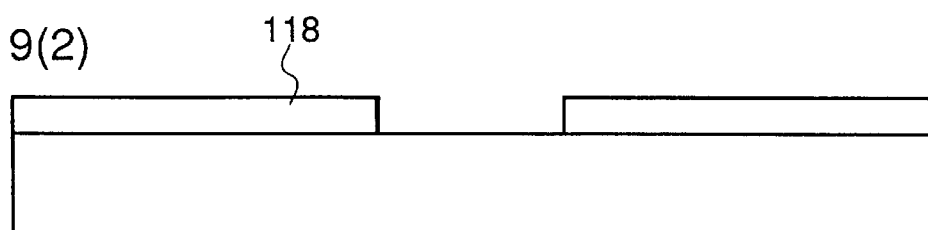
Figure 9:
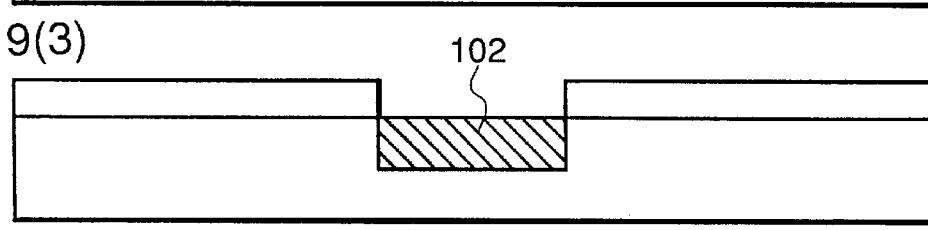
Figure 9:
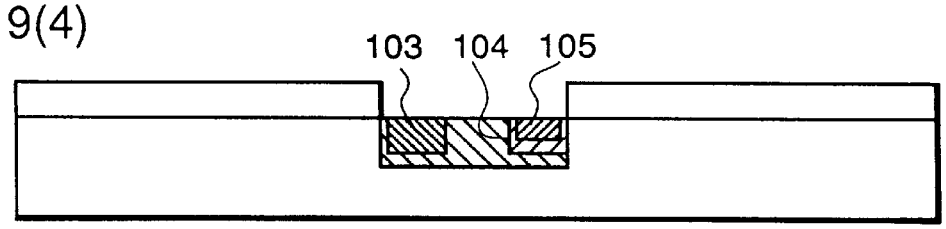
Figure 9:
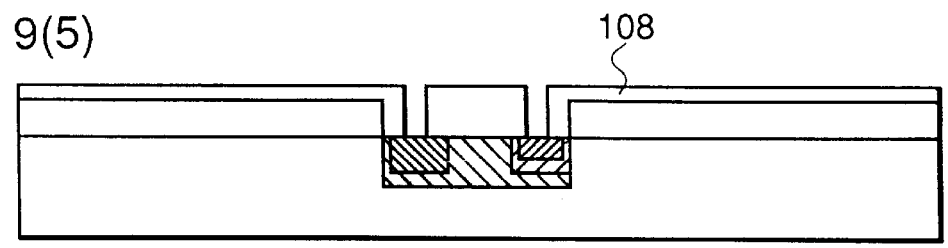
Figure 9:
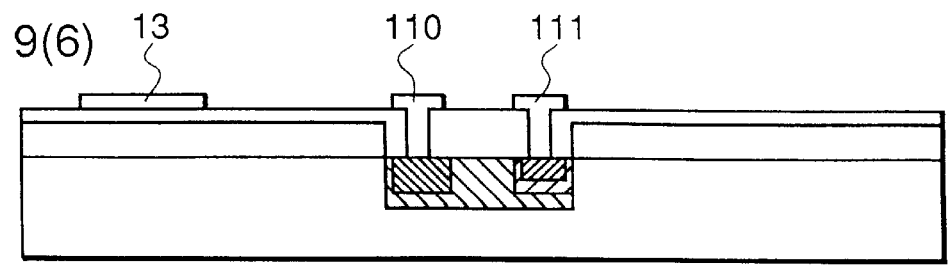

An example of the manufacturing steps of the function element with the structure shown in FIG. 8 will be explained below with reference to FIGS. 9(1) to 9(6). FIGS. 9(1) to 9(6) are sectional views for explaining an example of the manufacturing processes.

In the first process (see FIG. 9(1)), an n-type silicon substrate 101 is prepared.

In the second process (see FIG. 9(2)), an $SiO_2$ insulating layer 118 is coated on the n-type silicon substrate 101, and is patterned by utilizing a photoresist.

In the third process (see FIG. 9(3)), a p-type impurity (conductivity type control material) is doped in a desired region of the silicon substrate 101 to form a p-type well layer 102.

In the fourth process (see FIG. 9(4)), a $p^+$-type layer, an n-type layer, and an $n^+$-type layer are formed in the p-type well layer to form a diode element.

In the fifth process (see FIG. 9(5)), an $SiO_2$ insulating layer 108 consisting of an inorganic oxide is coated on the semiconductor structure formed in the above-mentioned processes, and is patterned.

In the sixth process (see FIG. 9(6)), an anode electrode 110, a cathode electrode 111, and a row-direction wiring line 13 are formed on the patterned region of the $SiO_2$ layer.

In the seventh process (see FIG. 10(7)), an $SiO_2$ insulating layer 119 consisting of an inorganic oxide is coated on the resultant structure and is patterned. The $SiO_2$ insulating layer 119 has a function as an insulating layer for the respective portions of the diode, and also serves as an undercoating layer upon formation of the surface conduction type electron emitting element and wiring electrodes.

In the eighth process (see FIG. 10(8)), an aluminum wiring line 113 for electrically connecting the anode electrode 110 of the diode and an electrode 116 of the surface conduction type electron emitting element, an aluminum wiring line 114 for electrically connecting the cathode electrode 111 and the column-direction wiring line, and an aluminum wiring line 120 for electrically connecting the row-direction wiring line 13 and an electrode 117 of the surface conduction type electron emitting element are formed.

In the ninth process (see FIG. 10(9)), a column-direction wiring line 12 is formed to be electrically connected to the aluminum wiring line 114.

In the above-mentioned processes, the silicon substrate is used for forming the diode. However, the substrate is not limited to this particular example, and for example, a Ga—As substrate may be used.

In the 10th process (see FIG. 10(10)), a surface conduction type electron emitting element 14 is formed. The method of forming the surface conduction type electron emitting element 14 will be described in detail below with reference to FIG. 11.

Figure 11:
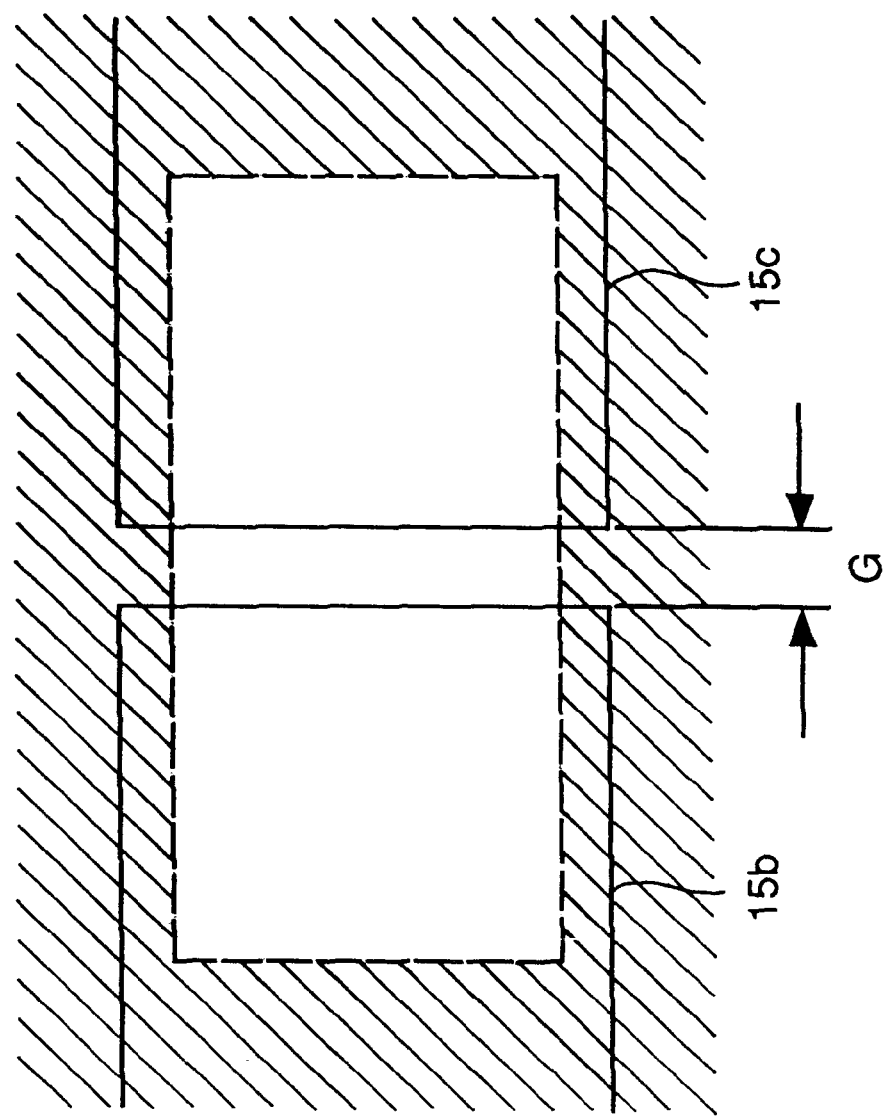
FIG. 11 is a view showing a mask used in the manufacture of the embodiment of the present invention.

FIG. 11 is a partial plan view of a mask of the electron emitting portion formation thin film, which mask is used for forming the surface conduction type electron emitting element 14 according to this embodiment. This mask has an inter-element gap G and an opening near the gap G, and a 10-Å thick Cr film (not shown) is deposited and patterned by a vacuum deposition method using the mask. Thereafter, an organo-Pd compound is spin-coated on the Cr film by a spinner, and the resultant structure is subjected to a heating calcination treatment at 300° C. for 10 minutes, thereby forming the electron emitting portion formation thin film consisting of Pd. The electron emitting portion formation thin film formed as described above consists of fine particles containing Pd as a major element, and has a film thickness of 100 Å and a sheet resistance of $5 \times 10^4$ Ω per unit area. Note that reference numerals 15b and 15c respectively denote element electrodes.

Note that the fine particle film is a film constituted by a collection of a plurality of fine particles, and corresponds to a film which has, as a fine structure, a state wherein fine particles are individually dispersed but also a state wherein fine particles are adjacent to or overlap each other (including an island state), as described above. Also, the particle size is that of a fine particle, whose particle shape can be recognized in the above-mentioned state.

The Cr film (not shown) and the calcined electron emitting portion formation thin film are subjected to wet etching using an acid etchant, thus forming a desired pattern. When the electron emitting portion formation thin film formed as described above is subjected to an energization forming treatment (to be described later), the surface conduction type electron emitting element 14 is formed.

With the above-mentioned processes, the column-direction wiring line 12, the insulating interlayer 106, the row-direction wiring line 13, the element electrodes 116 and 117, the electron emitting portion formation thin film (14), the diode element 18, and the like are formed on a single substrate, thus forming a simple matrix wiring substrate for the surface conduction type electron emitting element (see FIG. 8).

Note that the above-mentioned processes adopt techniques such as photolithography, etching, and the like. However, the present invention is not limited to these techniques. For example, a print technique as a wiring formation technique or the like may be used, or various other techniques may be used.

The materials of the respective members also have certain degrees of freedom. For example, wiring materials can be ones which are normally used as electrode materials, and include Au, Ag, Cu, Al, Ni, W, Ti, Cr, and the like. The insulating interlayer 106 may consist of MgO, $TiO_2$, $Ta_2O_5$, and $Al_2O_3$, their multi-layered structures, mixtures, and the like in addition to the silicon oxide film. The element electrodes may consist of other materials having conductivity in addition to the above-mentioned wiring materials.

An example in which the above-mentioned manufacturing method is applied to the manufacture of an image forming apparatus will be described below.

Figure 12:
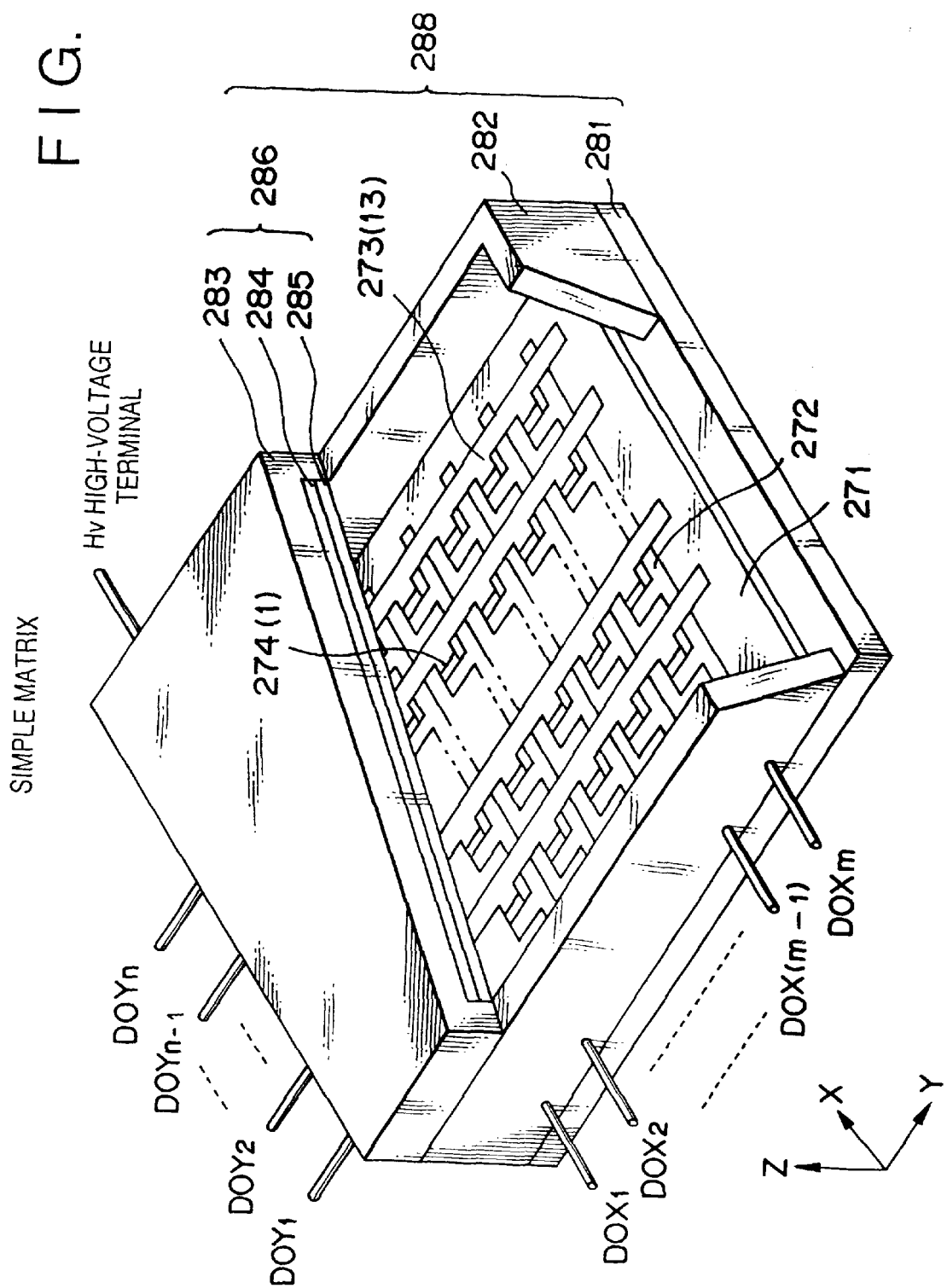
FIG. 12 is a perspective view showing a display panel of an image forming apparatus to which the present invention is applied.

Referring to FIG. 12, after the electron source 3 (corresponding to a substrate 271 in FIG. 12) on which a large number of electron emitting portion formation thin films and diode elements are formed is fixed on a rear plate 281, a faceplate 286 (constituted by forming a phosphor film 284 and a metal back 285 on the inner surface of a glass substrate 283) is arranged 5 mm above the substrate 271 via a support frame 282. Frit glass is coated on the joint portions of the faceplate 286, the support frame 282, and the rear plate 281, and is heated in the air or in a nitrogen atmosphere to seal these portions. Also, the substrate 271 is fixed to the rear plate 281 using frit glass. Reference numeral 274 denotes an electron source element constituted by the surface conduction type electron emitting element and the diode element. Reference numerals 272 and 273 respectively denote column- and row-direction wiring lines.

The phosphor film 284 consists of only a phosphor in the case of a monochrome display. However, in this embodiment, the phosphor has a stripe pattern, so that black stripes are formed first, and red, green, and blue phosphors are coated on portions between adjacent black stripes, thus forming the phosphor film 284. As the material of the black stripes, a popular material which contains graphite as a major component is used.

As a method of coating the phosphor on the glass substrate 283, in this embodiment, a slurry method is used. The metal back 285 is normally formed on the inner surface side of the phosphor film 284. The metal back 285 is formed by performing a smoothing treatment (normally called filming) of the inner surface of the phosphor film after the manufacture of the phosphor film, and thereafter, vacuum depositing Al.

In the faceplate 286, a transparent electrode (not shown) is often formed on the outer surface side of the phosphor film 284 to improve the conductivity of the phosphor film 284. However, in this embodiment, the transparent electrode is omitted since a sufficient conductivity can be obtained by only the metal back.

Furthermore, upon execution of the above-mentioned sealing, the color phosphors and the electron emitting elements are sufficiently aligned since they must correspond to each other in a color display.

As described above, the atmosphere in a glass chamber is evacuated by a vacuum pump via an exhaust pipe (not shown) to attain a sufficient vacuum pressure, and thereafter, a voltage is applied between the element electrodes of the electron emitting element 14 via terminals DOX1 to DOXm and DOY1 to DOYn outside the chamber so as to perform the above-mentioned energization forming treatment for the electron emitting portion formation thin film (14), thereby forming the electron emitting element having the electron emitting portion. More specifically, the energization forming treatment is executed by connecting the above-mentioned switching circuits 5 and 6 in FIG. 5 to the terminals outside the chamber.

The voltage waveform in the forming treatment is as shown in FIG. 3 above. In this embodiment, the energization forming treatment was performed under the following conditions.

Referring to FIG. 3, T1 and T2 respectively represent the pulse width and the pulse interval of the voltage waveform. The pulse width T1 was set to be 1 msec, the pulse interval T2 was set to be 10 msec, and the crest value (peak voltage upon forming) of the triangular wave was set to be 5 V, and the energization forming treatment was performed in a vacuum atmosphere of about $1 \times 10^{-6}$ Torr for 60 sec. The electron emitting portion formed in this manner was in a state wherein fine particles containing Pd element as a major component were dispersed, and the average particle size of the fine particles was 30 Å.

After the end of energization forming treatment for all the surface conduction type electron emitting elements, the exhaust pipe is welded by heating it using a gas burner in a vacuum of about $1 \times 10^{-6}$ Torr, thus sealing an envelope.

Lastly, in order to maintain the vacuum after sealing, a getter treatment is performed. In this treatment, immediately before sealing, a getter arranged at a predetermined position (not shown) in an image forming apparatus is heated by a heating method such as a high-frequency heating method to form a deposition film. The getter contains, e.g., Ba as a major component.

In the image forming apparatus of this embodiment with the above-mentioned arrangement, scanning signals and modulation signals are applied from a signal generation unit (not shown) to the electron emitting elements via the terminals DX1 to DXm and DY1 to DYn outside the chamber to cause the element to emit electrons, and a high voltage of several kV or higher is applied to the metal back 285 or the transparent electrode (not shown) via a high voltage terminal Hv to accelerate electron beams. The accelerated electron beams collide against the phosphor film 284 so as to excite the phosphor film and to emit light, thereby forming an image.

The above-mentioned schematic processes are required in the manufacture of the image forming apparatus. However, details such as the materials of the members are not limited to those in the above description, and can be appropriately selected to be suited for an application of the image forming apparatus, needless to say.

As described above, according to this embodiment, nonlinear elements each of which exhibits nonlinear voltage-current characteristics such as diode characteristics, MIM characteristics, or the like are connected in series with electron emitting portion formation thin films, which are connected by a simple matrix wiring method. Due to the characteristics of the nonlinear elements, with which almost no current is supplied to the electron emitting portion formation thin film upon application of a reverse voltage or a low voltage, current leakage to other electron emitting portion formation thin films upon energization of a specific electron emitting portion formation thin film can be prevented. That is, in the energization forming treatment, which is required in the manufacture of a multi electron source constituted by connecting surface conduction type electron emitting elements by the simple matrix wiring method, only a specific one element can be subjected to energization forming treatment.

As described above, according to the energization forming treatment method of this embodiment, upon execution of energization forming treatment of a large number of surface conduction type electron emitting elements which are connected by the simple matrix wiring method, the following effects are expected:

(1) Energization forming can be performed by selecting an element to be subjected to energization forming.

(2) Partial energization forming such as line forming, selected group forming, or the like can be performed, and no large current need be supplied to the wiring lines.

(3) Since partial energization forming can be performed, energization forming can be nonuniformly or uniformly performed for the entire source (i.e., energization forming can be performed for a desired element under a desired forming condition).

[Second Embodiment]

In the second embodiment, a method for further stably performing the method (see FIG. 8) described in the first embodiment will be described below.

Figure 13:
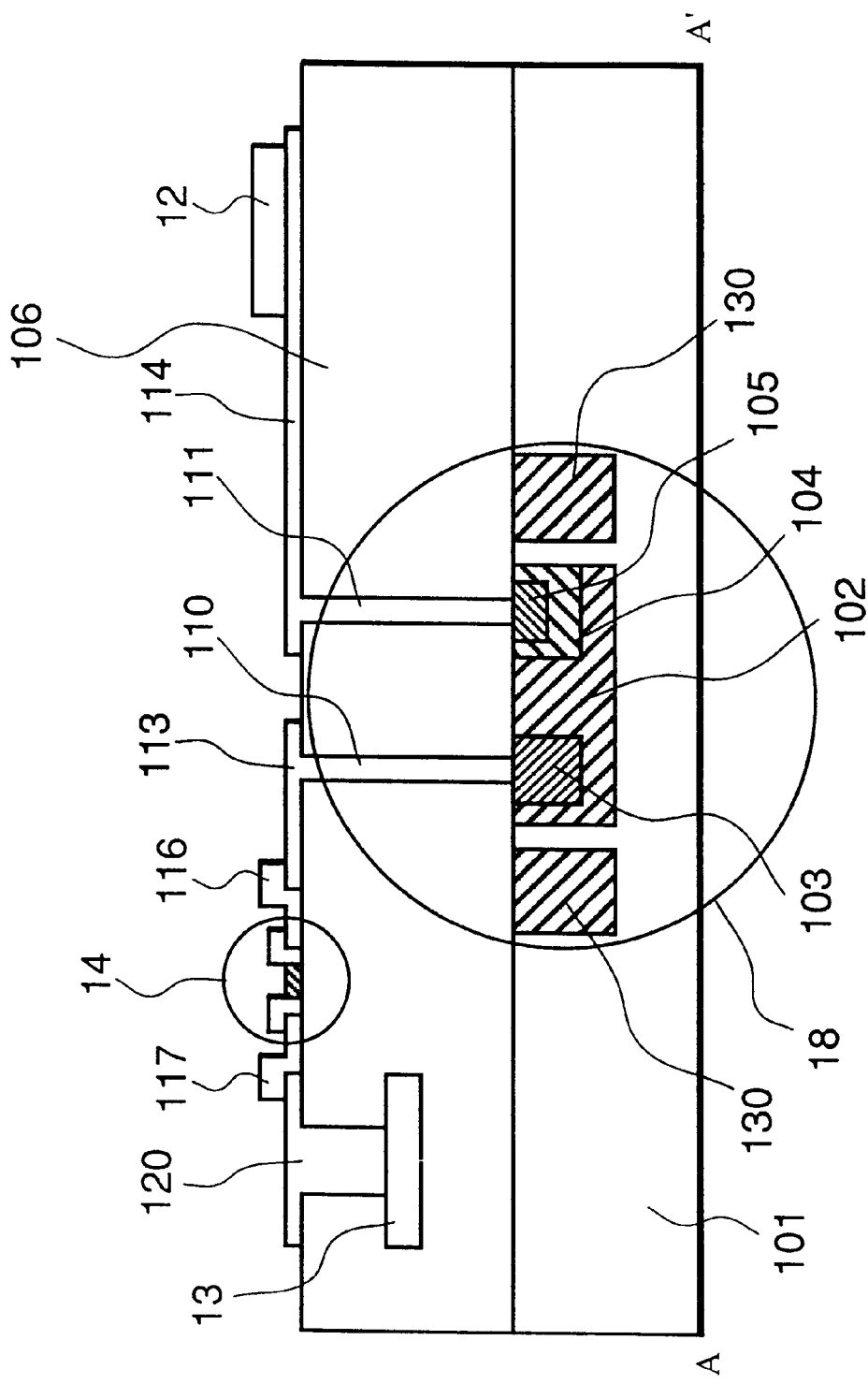
FIG. 13 is a sectional view of an embodiment of the present invention to which an isolation layer is formed near a nonlinear element.

FIG. 13 is a sectional view showing an example of an electron source substrate in which a surface conduction type electron emitting element as an electron emitting element is formed on an n-type silicon substrate formed with a diode. The difference from the first embodiment is that an isolation layer 130 is formed.

Referring to FIG. 13, reference numeral 101 denotes an n-type silicon substrate; 12, an column-direction wiring line; and 13, a row-direction wiring line. A surface conduction type electron emitting element 14 comprises an electron emitting portion thin film which is formed by performing an energization forming treatment of an electron emitting portion formation thin film.

A p-type well diffusion layer 102 is formed in a portion of the n-type silicon substrate 101. An $n^+$-type layer and an n-type layer which are electrically connected to a cathode electrode 111 of the diode are formed around the p-type well layer 102. Furthermore, an isolation layer 130 is formed around the diode.

The upper portion of these diode structure portions is covered by an $SiO_2$ insulating layer 106, and aluminum wiring lines 113 and 114 are respectively connected to an anode electrode 110 and the cathode electrode 111.

The diode is formed between the anode and cathode electrodes 110 and 111, and the anode electrode 110 is electrically connected to an electrode 116 of the surface conduction type electron emitting element 14 via the aluminum wiring line 113. The other electrode 117 of the surface conduction type electron emitting element 14 is electrically connected to the row-direction wiring line 13 via an aluminum wiring line 120. The cathode electrode 111 of the diode is electrically connected to the column-direction wiring line 12 via an aluminum wiring line 114.

The manufacturing processes can be modified as follows. That is, in the third process described in the first embodiment, a p-type impurity (conductivity control material) is doped in a predetermined region of the silicon substrate 101 to form the p-type well layer 102, and thereafter, the $n^+$-type layer 130 as an isolation layer for isolating a diode operation from other portions is formed around the p-type well layer.

Since a diode cell can be electrically isolated from other cells by forming the isolation layer 130, as described above, a stabler diode operation can be assured.

[Third Embodiment]

In each of the first and second embodiments, an electron source integrated circuit on which the surface conduction type electron emitting elements are formed is formed on an n-type silicon substrate. In the third embodiment, a case will be exemplified below wherein an integrated circuit is formed on a p-type silicon substrate.

Figure 14:
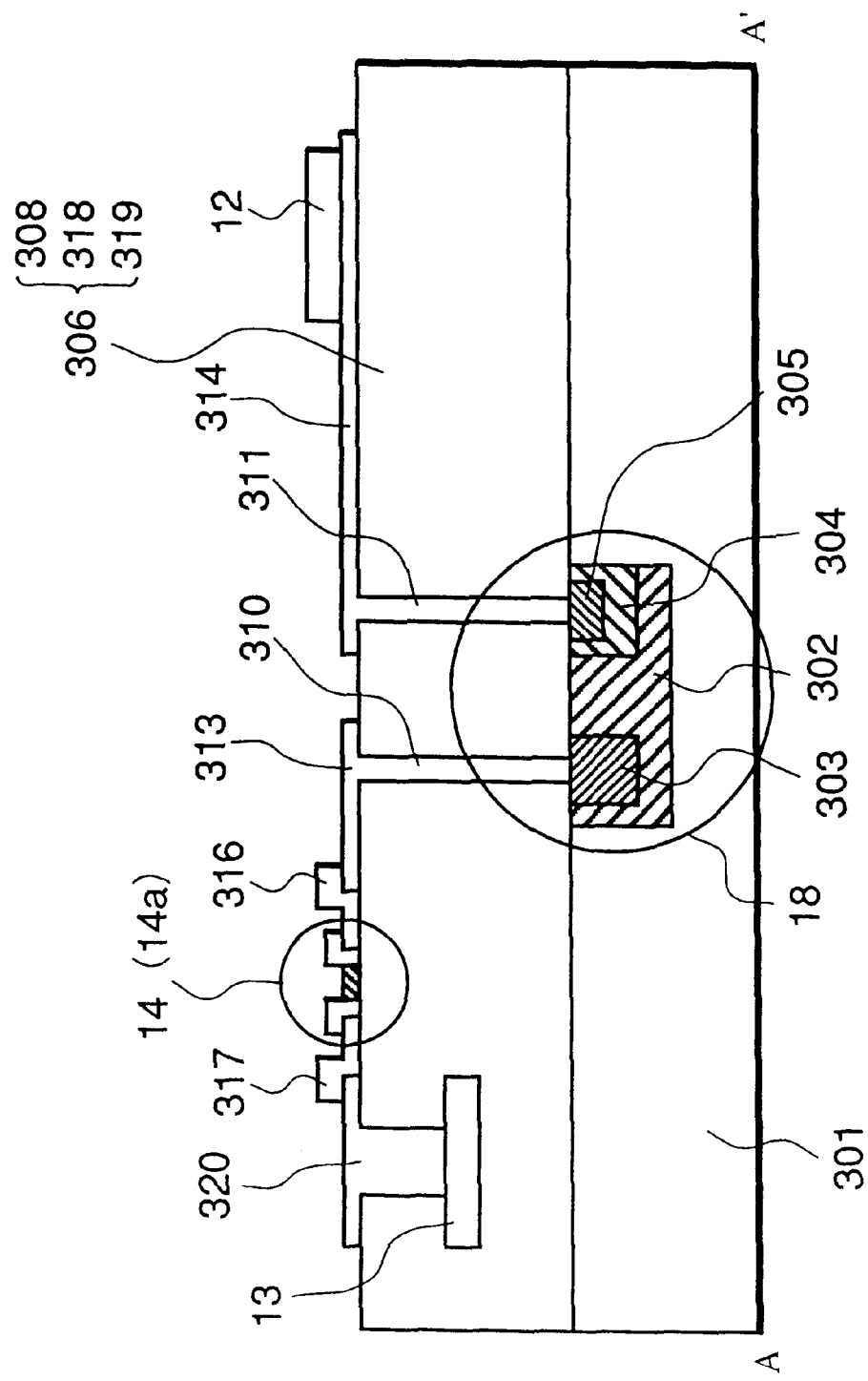
FIG. 14 is a sectional view of an embodiment of the present invention, which uses a p-type silicon substrate.

FIG. 14 is a sectional view showing an example of an electron source substrate in which a surface conduction type electron emitting element as an electron emitting element is formed on a p-type silicon substrate formed with a diode.

Referring to FIG. 14, reference numeral 301 denotes a p-type silicon substrate; 12, an column-direction wiring line; and 13, a row-direction wiring line. A surface conduction type electron emitting element 14 comprises an electron emitting portion thin film which is formed by performing an energization forming treatment of an electron emitting portion formation thin film. An n-type well diffusion layer 302 is formed in a portion of the p-type silicon substrate 301. An $n^+$-type layer which is electrically connected to an anode electrode 310 of the diode is formed around the n-type well layer. Also, a $p^+$-type layer and a p-type layer which are electrically connected to a cathode electrode 311 of the diode are formed.

The upper portion of these diode structure portions is covered by an $SiO_2$ insulating layer 306, and the anode and cathode electrodes 310 and 311 are respectively connected to aluminum wiring lines 313 and 314.

The diode is formed between the anode and cathode electrodes 310 and 311, and the anode electrode 310 is electrically connected to an electrode 316 of the surface conduction type electron emitting element 14 via the aluminum wiring line 313. The other electrode 317 of the surface conduction type electron emitting element 14 is electrically connected to the row-direction wiring line 13 via an aluminum wiring line 320.

Figure 15:
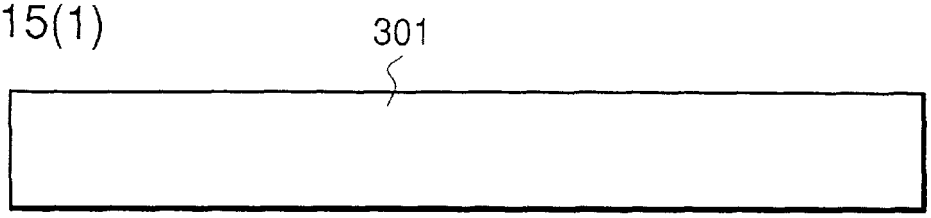
FIGS. 15(1) to 15(6) are sectional views for explaining the processes in the manufacture of a nonlinear element portion in a multi electron source according to the embodiment of the present invention, which uses a p-type silicon substrate.
Figure 15:
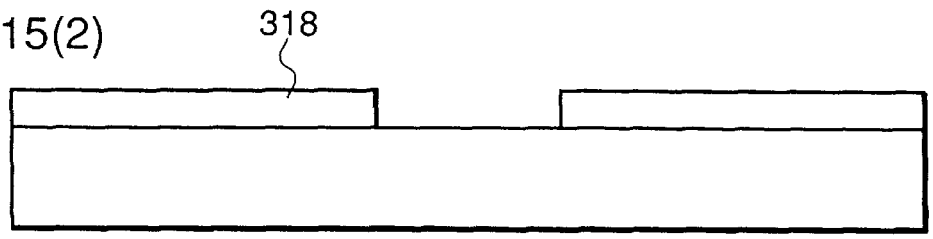
Figure 15:
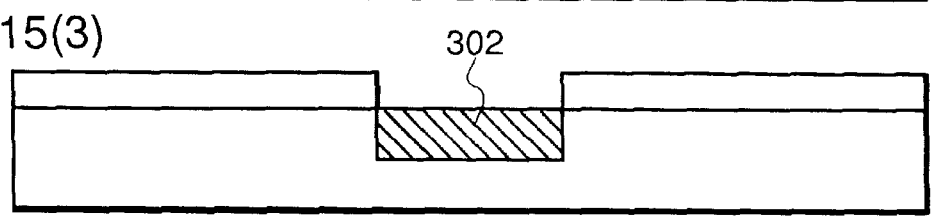
Figure 15:
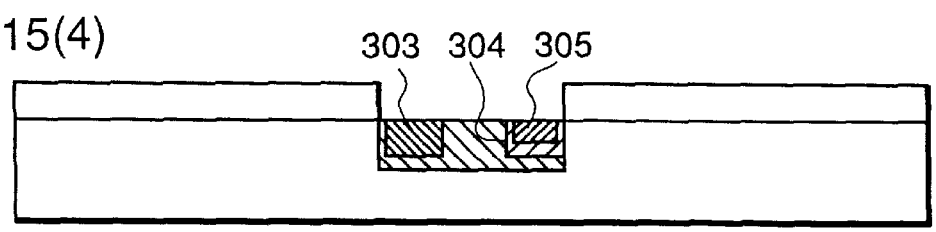
Figure 15:
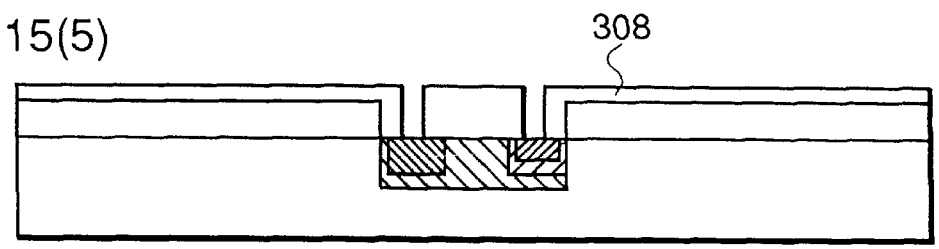
Figure 15:
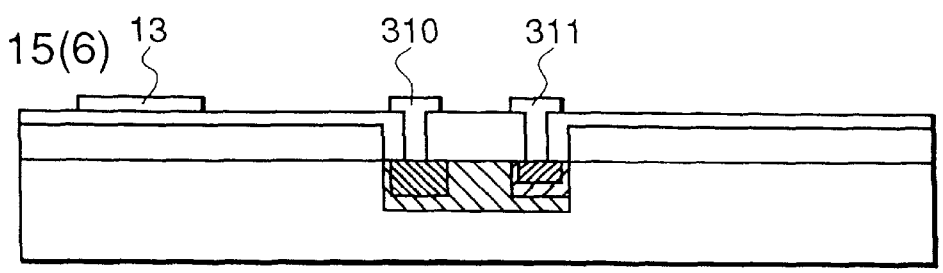
Figure 16:
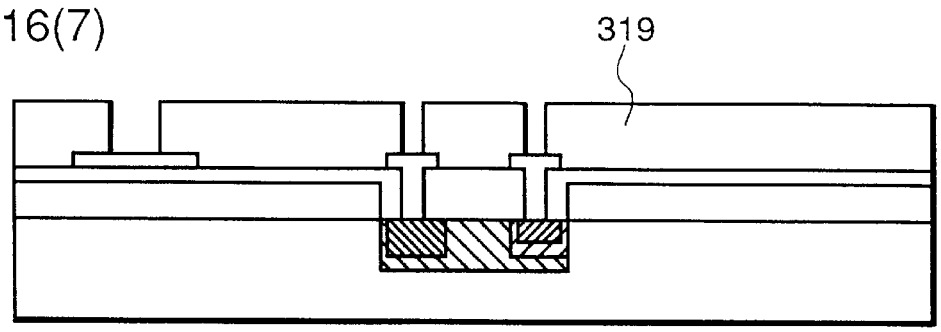
FIGS. 16(7) to 16(10) are sectional views for explaining the processes in the manufacture of a surface conduction type emitting element portion in the multi electron source according to the embodiment of the present invention, which uses the p-type silicon substrate.
Figure 16:
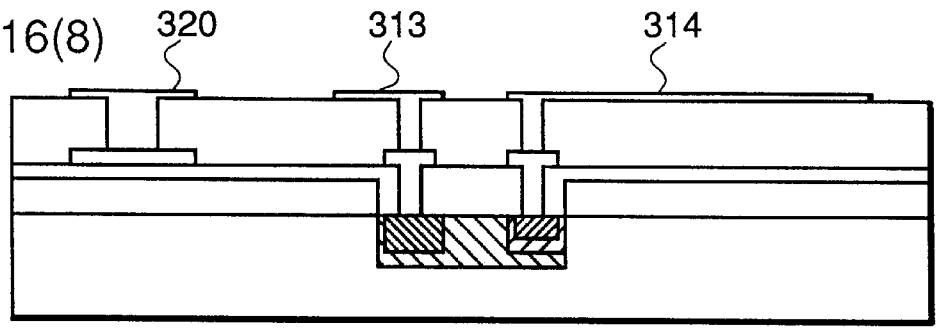
Figure 16:
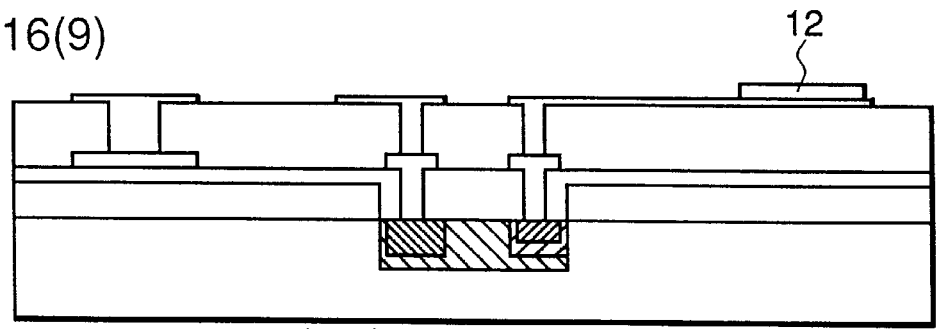
Figure 16:
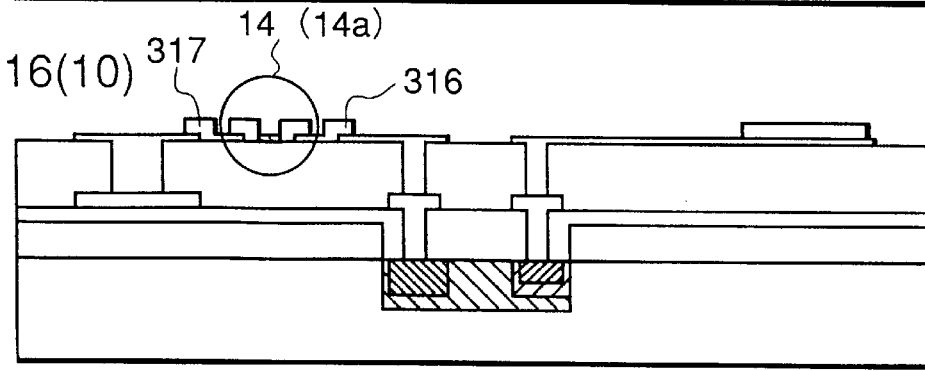

FIGS. 15(1) to 15(6) and FIGS. 16(7) to 16(10) are sectional views for exemplifying the manufacturing processes of the function element with the structure shown in FIG. 14.

The method of forming an electron source integrated circuit on which surface conduction type electron emitting elements are formed according to the third embodiment will be sequentially described below with reference to FIGS. 15(1) to 15(6) and FIGS. 16(7) to 16(10).

In the first process (see FIG. 15(1)), a p-type silicon substrate 301 is prepared.

In the second process (see FIG. 15(2)), an $SiO_2$ insulating layer 118 is coated on the p-type silicon substrate 301, and is patterned by utilizing a photoresist.

In the third process (see FIG. 15(3)), an n-type impurity (conductivity type control material) is doped in a desired region of the silicon substrate 301 to form an n-type well layer 302.

In the fourth process (see FIG. 15(4)), an $n^+$-type layer and a $p^+$-type layer are formed in the n-type well layer to form a diode element.

In the fifth process (see FIG. 15(5)), an $SiO_2$ insulating layer 308 consisting of an inorganic oxide is coated on the semiconductor structure formed in the above-mentioned processes, and is patterned.

In the sixth process (see FIG. 15(6)), an anode electrode 310, a cathode electrode 311, and a row-direction wiring line 13 are formed on the patterned region of the $SiO_2$ layer.

In the seventh process (see FIG. 16(7)), an $SiO_2$ insulating layer 319 consisting of an inorganic oxide is coated on the resultant structure and is patterned. The $SiO_2$ insulating layer 319 has a function as an insulating layer for the respective portions of the diode, and also serves as an undercoating layer upon formation of the surface conduction type electron emitting element and wiring electrodes.

In the eighth process (see FIG. 16(8)), an aluminum wiring line 313 for electrically connecting the anode electrode 310 of the diode and an electrode 316 of the surface conduction type electron emitting element, an aluminum wiring line 314 for electrically connecting the cathode electrode 311 and an column-direction wiring line 12, and an aluminum wiring line 320 for electrically connecting the row-direction wiring line 13 and an electrode 317 of the surface conduction type electron emitting element are formed.

In the ninth process (see FIG. 16(9)), an column-direction wiring line 12 is formed to be electrically connected to the aluminum wiring line 314.

In the above-mentioned processes, the silicon substrate is used for forming the diode. However, the substrate is not limited to this particular one. For example, a Ga—As substrate may be used.

In the 10th process (see FIG. 16(10)), a surface conduction type electron emitting element 14 is formed.

[Fourth Embodiment]

In the fourth embodiment, a method for further stably operating the electron source integrated circuit on which surface conduction type electron emitting elements are formed described in the third embodiment (see FIG. 14) will be described below.

Figure 17:
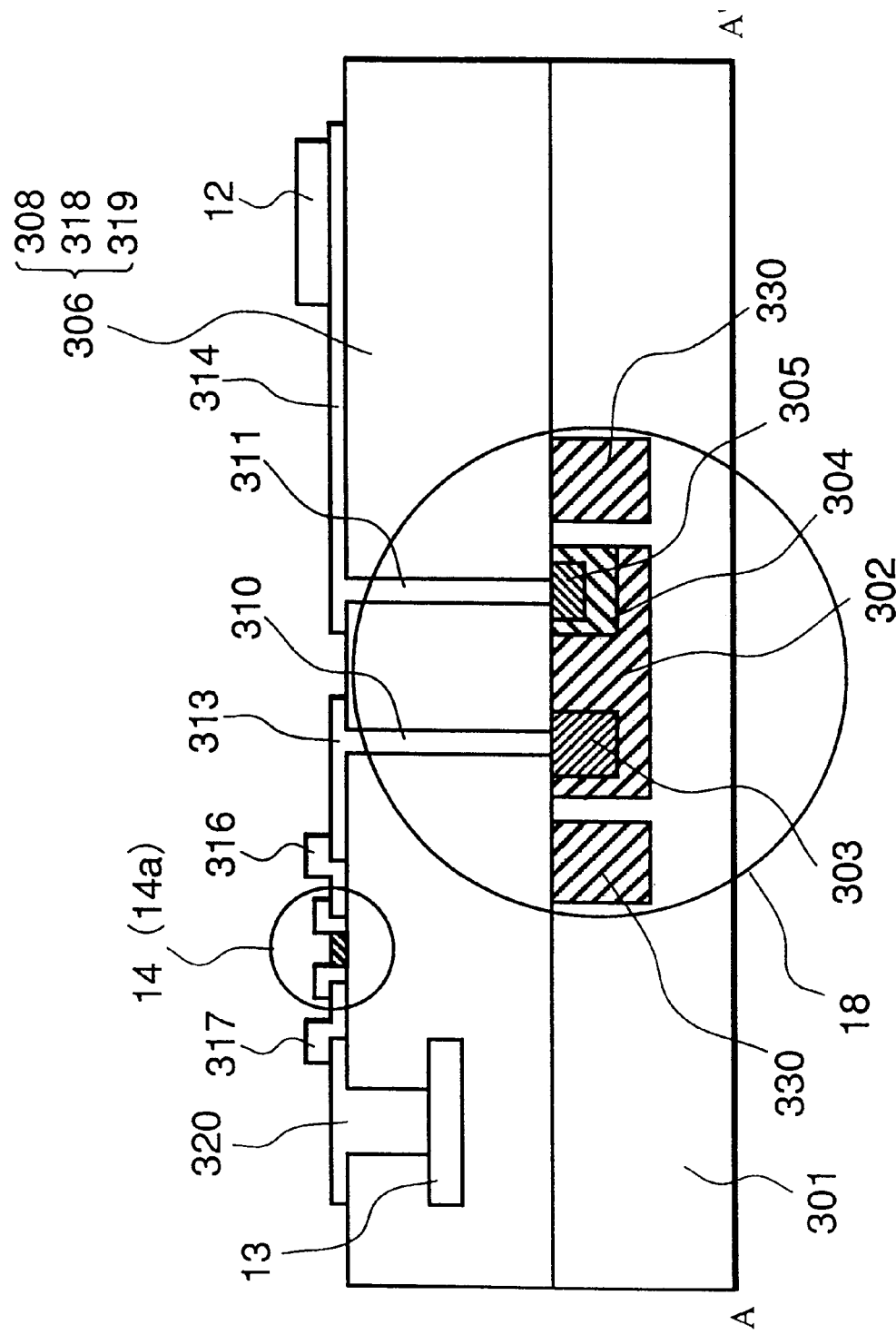
FIG. 17 is a sectional view of an embodiment of the present invention, in which an isolation layer is formed near a nonlinear element and a p-type silicon substrate is used.

FIG. 17 is a sectional view showing an example of an electron source substrate in which a surface conduction type electron emitting element as an electron emitting element is formed on a p-type silicon substrate formed with a diode. The difference from the third embodiment is that an isolation layer 330 is formed.

Referring to FIG. 17, reference numeral 301 denotes a p-type silicon substrate; 12, an column-direction wiring line; and 13, a row-direction wiring line. A surface conduction type electron emitting element 14 comprises a thin film which is formed by performing a forming treatment of an electron emitting portion formation thin film, and includes an electron emitting portion.

An n-type well diffusion layer 302 is formed in a portion of the p-type silicon substrate 301. An $n^+$-type layer 303 which is electrically connected to an anode electrode 310 of the diode is formed around the n-type well layer 302. Also, a $p^+$-type layer and an n-type layer which are electrically connected to a cathode electrode 311 of the diode are formed. Furthermore, an isolation layer 330 is formed around the diode.

The upper portion of these diode structure portions is covered by an $SiO_2$ insulating layer 306, and aluminum wiring lines 313 and 314 are respectively connected to the anode and cathode electrodes 310 and 311.

The diode is formed between the anode and cathode electrodes 310 and 311, and the anode electrode 310 is electrically connected to an electrode 316 of the surface conduction type electron emitting element 14 via the aluminum wiring line 313. The other electrode 317 of the surface conduction type electron emitting element 14 is electrically connected to the row-direction wiring line 13 via an aluminum wiring line 320. The cathode electrode 311 of the diode is electrically connected to the column-direction wiring line 12 via an aluminum wiring line 314.

As for the manufacturing processes, in the third process described in the third embodiment, an n-type impurity (conductivity control material) is doped in a predetermined region of the silicon substrate 301 to form the n-type well layer 302, and thereafter, the $p^+$type layer 330 as an isolation layer for isolating a diode operation from other portions is formed around the n-type well layer.

Since a diode cell can be electrically isolated from other cells by forming the isolation layer 330, as described above, a stabler diode operation can be assured.

In the above description, an electron source cell of this embodiment is formed on the silicon substrate. However, the substrate is not limited to the silicon substrate. For example, germanium or gallium arsenide may be used as the substrate material.

In the above description, the electron source cells are arranged and connected in a matrix. The arrangement is not limited to the matrix. For example, even when there is only one electron source cell of this embodiment, energization forming control can be facilitated by the rectification effect of the internal diode.

When an electron source is manufactured by forming diodes and surface conduction type electron emitting elements, not only the electron source portion but also the above-mentioned switching circuits and driving circuits can be formed on a single silicon substrate, thus making the apparatus more compact.

[Fifth Embodiment]

An embodiment wherein a diode consisting of amorphous silicon is used as a nonlinear element will be described below. In this embodiment, since a glass plate is used as a substrate unlike in the first to fourth embodiments, a large-area structure and cost reduction can be attained.

Figure 18:
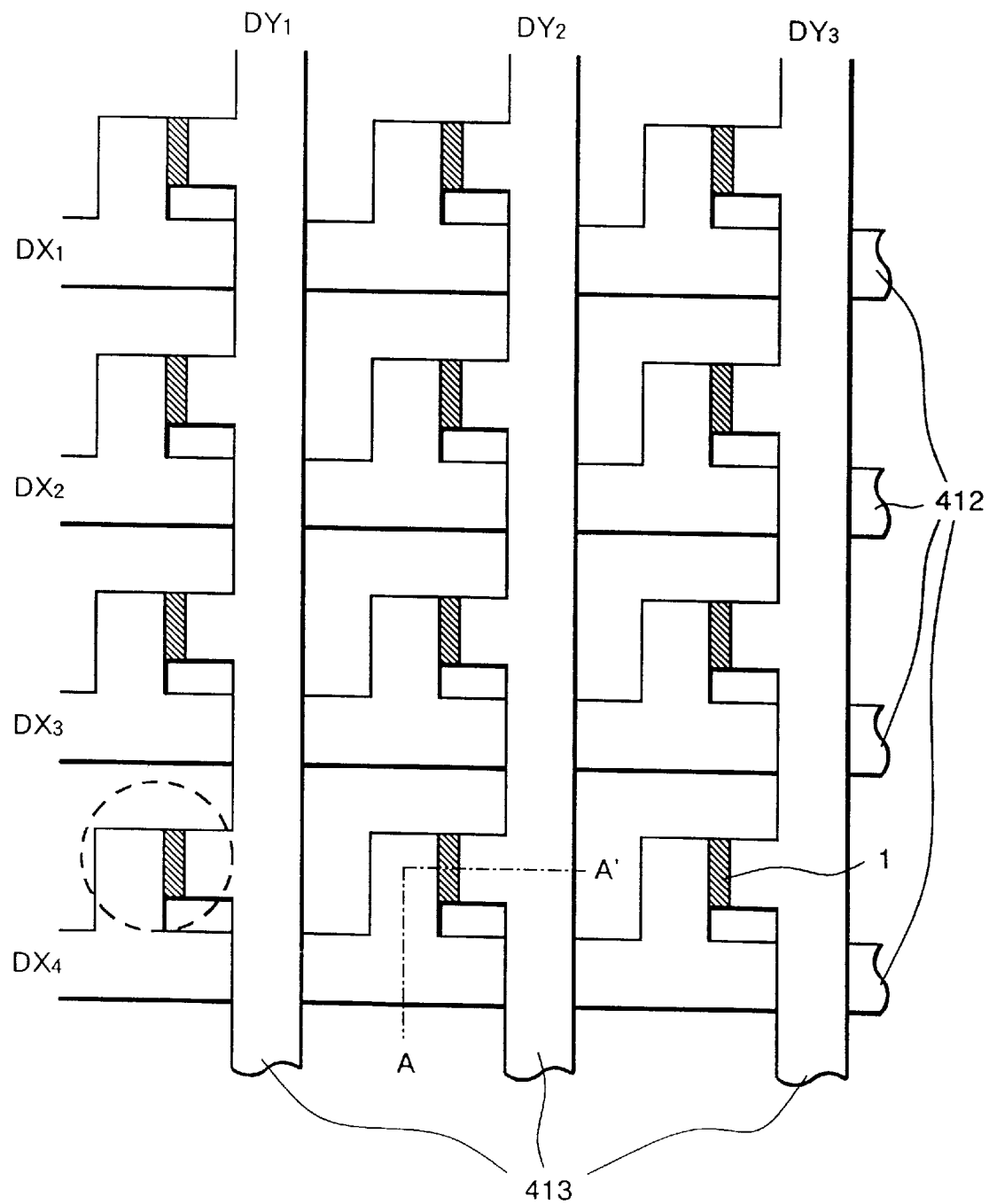
FIG. 18 is a plan view of a multi electron source which uses, as a nonlinear element, a diode consisting of amorphous silicon.
Figure 19:
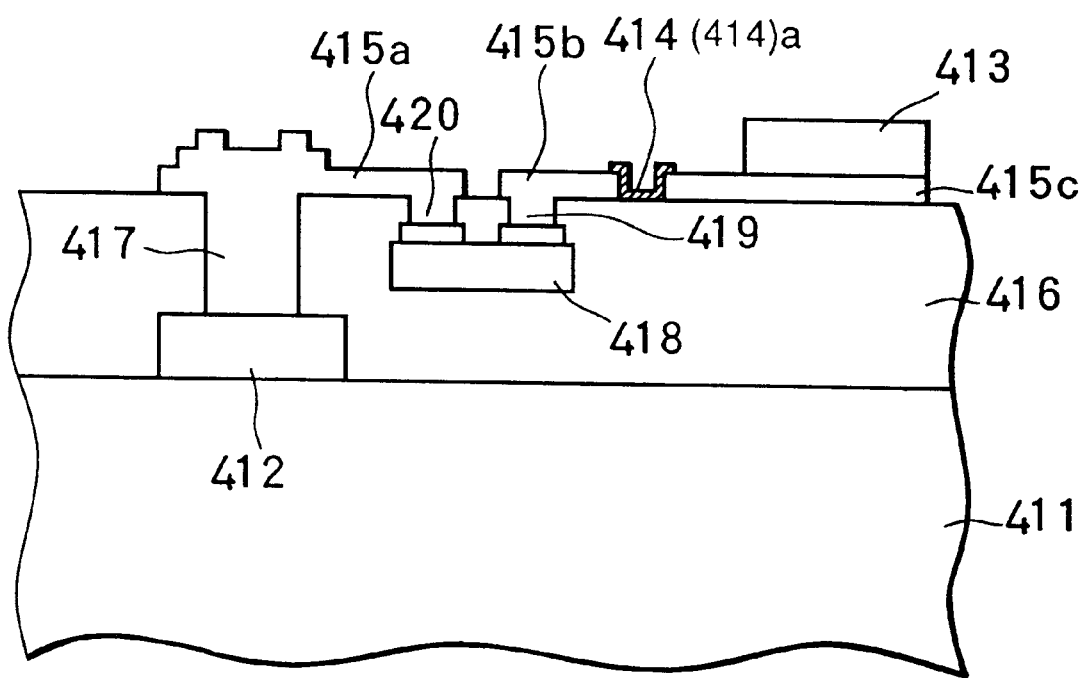
FIG. 19 is a sectional view of the multi electron source which uses, as a nonlinear element, a diode consisting of amorphous silicon.

FIG. 18 is a partial plan view of an electron source. FIG. 19 is a sectional view taken along a line A-A' in FIG. 18. Furthermore, FIGS. 20(*a*) to 20(*j*) are sectional views showing processes in the manufacture of an electron source of this embodiment.

Referring to FIG. 18, reference numeral 412 denotes column-direction wiring lines which include n wiring lines $DX_1$ to $DX_n$. Reference numeral 413 denotes row-direction wiring lines which include m wiring lines $DY_1$ to $DY_m$.

Referring to FIG. 19, reference numeral 411 denotes an insulating substrate consisting of glass; 412, a column-direction wiring line; and 413, a row-direction wiring line. Reference numeral 414*a* denotes an electron emitting portion formation thin film. When this thin film is subjected to an energization forming treatment, an electron emitting portion is formed, thus obtaining a surface conduction type electron emitting element 414. Reference numerals 415*a* to 415*c* denote element electrodes; 416, an insulating interlayer; and 417, a contact hole used for achieving an electrical connection between the element electrode 415*a* and the column-direction wiring line 412. Reference numeral 418 denotes a diode element; and 419 and 420, contact holes used for achieving electrical connections between the diode element 418 and the element electrodes 415*b* and 415*c*, respectively.

The manufacturing method of an electron source of this embodiment will be described in the order of processes with reference to FIGS. 20(*a*) to 20(*j*).

[Process-a] (see FIG. 20(*a*))

A 50-Å thick Cr layer and a 6,000-Å thick Au layer are sequentially stacked on a substrate 411 consisting of cleaned soda lime glass by a vacuum deposition method. Thereafter, a photoresist (AZ1370 available from Hoechst Corp.) layer is spin-coated by a spinner, and is baked. Subsequently, a photomask image is exposed and developed to form a resist pattern for a column-direction wiring line 412, and the Au/Cr deposition film is wet-etched using the pattern to form a column-direction wiring line 412 having a desired pattern.

[Process-b] (see FIG. 20(*b*))

An insulating interlayer 416 consisting of a 0.8-μm thick silicon oxide film is deposited by an RF sputtering method.

[Process-c] (see FIG. 20(*c*))

A 5,000-Å thick amorphous-Si layer is deposited by a plasma CVD method on the silicon oxide film (insulating interlayer 416) deposited in the process-b, and a diode element 418 is formed by an ion implantation method.

[Process-d] (see FIG. 20(*d*))

Furthermore, another layer of the insulating interlayer 416 consisting of a 0.8-μm thick silicon oxide film is deposited by the RF sputtering method.

[Process-e] (see FIG. 20(*e*))

A photoresist pattern used for forming contact holes 417, 419, and 420 is formed on the silicon oxide film (insulating interlayer 416) deposited in the process-b and the process-d, and the insulating interlayer 416 is etched using this pattern as a mask, thereby forming contact holes 417, 419, and 420. The etching is performed based on an RIE (Reactive Ion Etching) method using, e.g., $CF_4$ and $H_2$ gases.

Figure 20A:
FIGS. 20(a) to 20(j) are sectional views for explaining a method of manufacturing the multi electron source which uses, as a nonlinear element, a diode consisting of amorphous silicon.
Figure 20B:
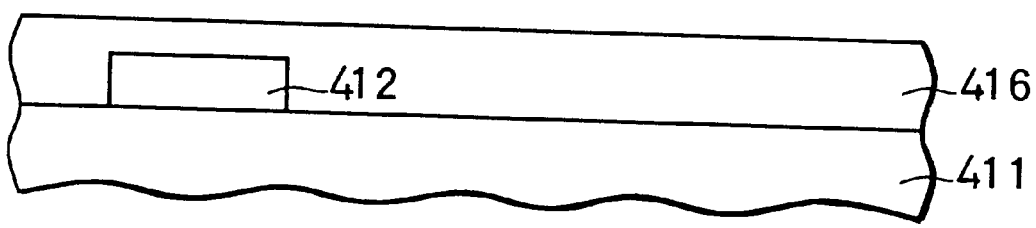
Figure 20C:
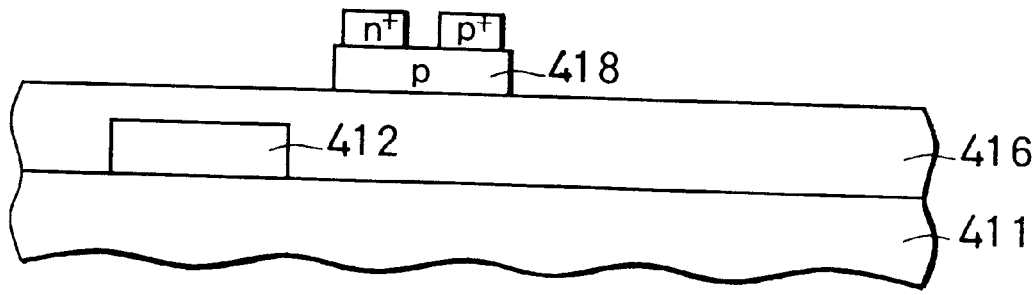
Figure 20D:
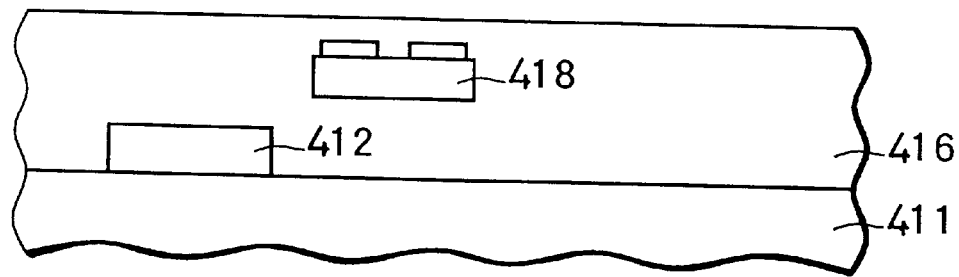
Figure 20E:
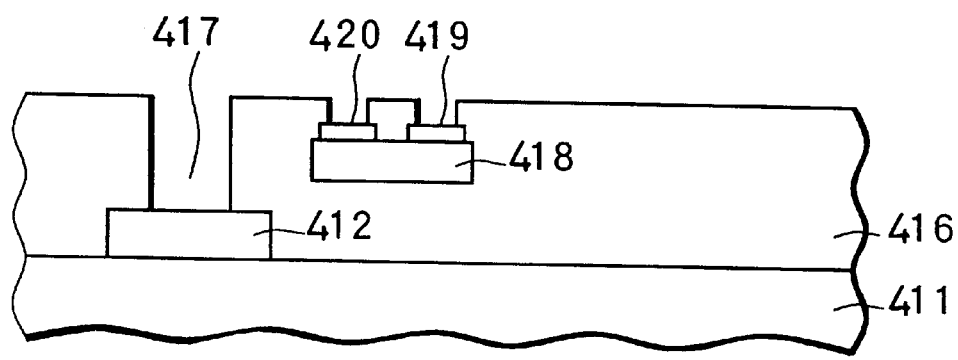
Figure 20F:
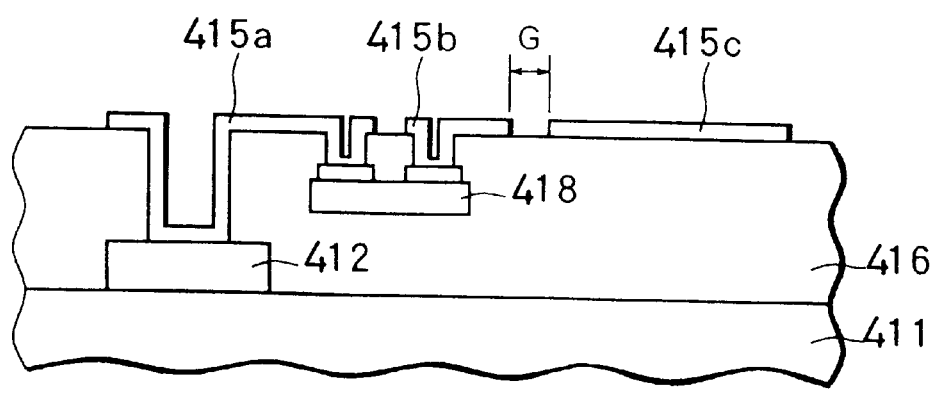

[Process-f] (see FIG. 20(f))

Thereafter, a pattern used for forming element electrodes 415a to 415c and an inter-element electrode gap G is formed using a photoresist (RD-2000N-41: available from Hitachi Chemical Co., Ltd.), and a 50-Å thick Ti layer and a 10-Å thick Ni layer are sequentially deposited by a vacuum deposition method. The photoresist pattern is dissolved using an organic solvent, and the Ni/Ti deposition film is lifted off, thereby forming the element electrodes 415a to 415c having the inter-element electrode gap G. Note that the inter-element electrode gap G is set to be 2 μm.

Figure 20G:
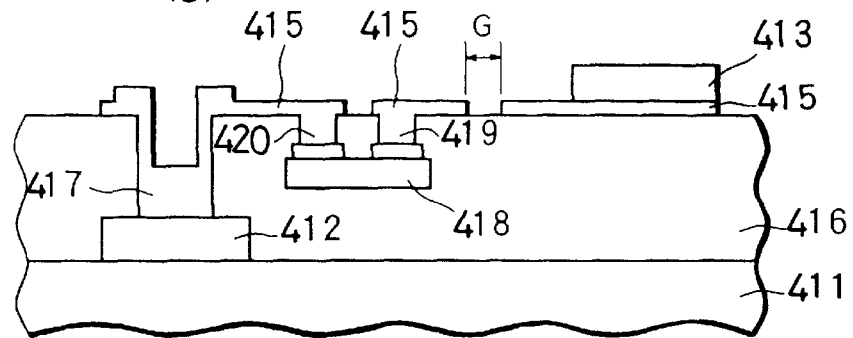

[Process-g] (see FIG. 20(g))

After a photoresist pattern for the row-direction wiring line is formed on the element electrode 415c, a 50-Å thick Ti layer and a 5,000-Å thick Au layer are sequentially vacuum-deposited, and unnecessary portions are removed by a lift-off method, thereby forming a row-direction wiring line 413.

Figure 20H:
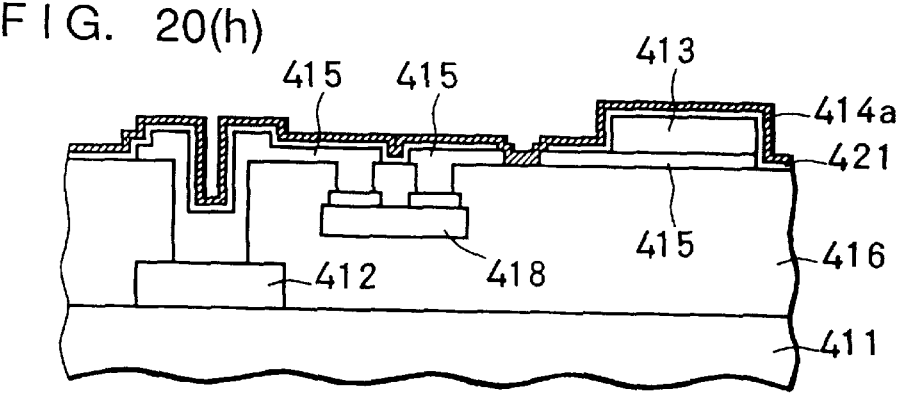

[Process-h] (see FIG. 20(h))

Using a mask (FIG. 11) for the electron emitting portion formation thin film 414a used in the first embodiment above, a 10-Å thick Cr film 421 is deposited and patterned by a vacuum deposition method as in the first embodiment. An organo-Pd compound (ccp4230: available from Okuno Seiyaku K. K.) layer is spin-coated on the Cr film by a spinner, and the resultant structure is subjected to a heating calcination treatment at 300° C. for 10 minutes, thereby forming an electron emitting portion formation thin film 414a. The electron emitting portion formation thin film 414a, which is formed, as described above, consists of fine particles containing Pd as a major element, and has a film thickness of 100 Å and a sheet resistance of $5\times10^4$ Ω per unit area. Note that the fine particle film is a film constituted by a collection of a plurality of fine particles, and corresponds to a film which has, as a fine structure, a state wherein fine particles are individually dispersed but also a state wherein fine particles are adjacent to or overlap each other (including an island state), as described above. Also, the particle size is that of a fine particle, whose particle shape can be recognized in the above-mentioned state.

Figure 20I:
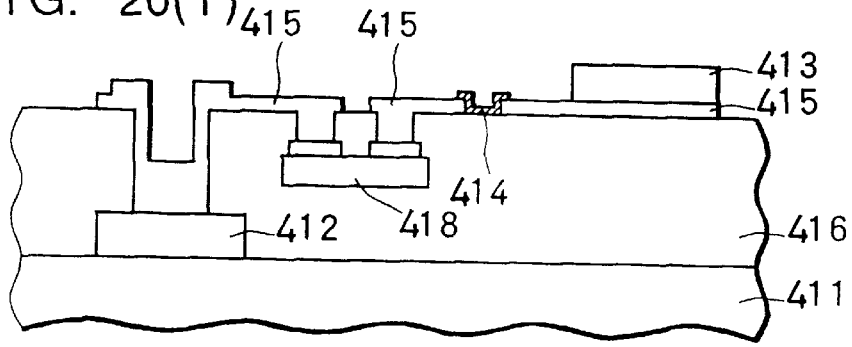

[Process-i] (see FIG. 20(i))

The Cr film 421 and the calcined electron emitting portion formation thin film 414a are subjected to wet-etching using an acid etchant, thereby forming a desired pattern. The electron emitting portion formation thin film 414a formed in this manner is subjected to an energization forming treatment (to be described later), thereby forming a surface conduction type electron emitting element 414.

Figure 20J:
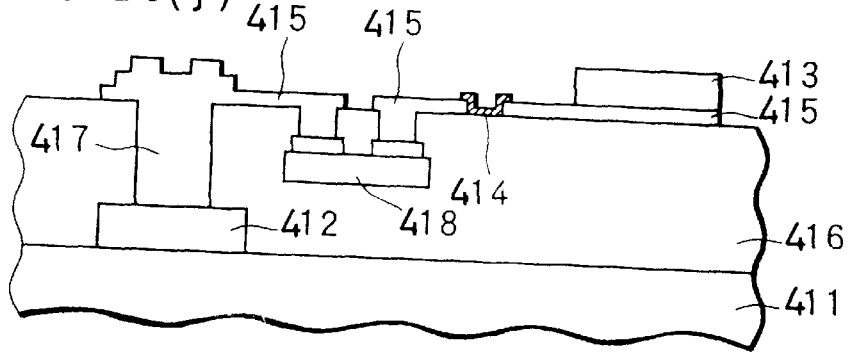

[Process-j] (see FIG. 20(j))

A pattern for coating a resist on portions other than the portion of the contact hole 417 is formed, and a 50-Å thick Ti layer and a 1.1-μm thick Au layer are sequentially deposited by a vacuum deposition method. By removing unnecessary portions by a lift-off method, the contact hole 417 is buried.

With the above-mentioned processes, the column-direction wiring line 412, the insulating interlayer 416, the row-direction wiring line 413, the element electrodes 415a to 415c, the electron emitting portion formation thin film 414a, the diode element 418, and the like are formed on a single substrate, thus forming a simple matrix wiring substrate of a surface conduction type electron emitting element. Note that the above-mentioned processes adopt techniques such as photolithography, etching, and the like. However, the processes are not limited to these techniques. For example, a print technique as a wiring formation technique or the like may be used, or various other techniques may be used.

The materials of the respective members have degrees of freedom. For example, the wiring materials can be ones which are normally used as electrode materials, and include Au, Ag, Cu, Al, Ni, W, Ti, Cr, and the like. The insulating interlayer 316 may consist of MgO, $TiO_2$, $Ta_2O_5$, and $Al_2O_3$, their multi-layered structures, mixtures, and the like in addition to the silicon oxide film. The element electrodes 415a to 415c may consist of other materials having conductivity in addition to the above-mentioned wiring materials.

Note that the method of this embodiment can be effectively applied to an image display apparatus as in the first embodiment, as a matter of course.

[Sixth Embodiment]

An embodiment wherein a diode consisting of polycrystalline silicon (polysilicon) is used as a nonlinear element will be described below. In this embodiment, since a glass plate is used as a substrate like in the fifth embodiment, a large-area structure and cost reduction can be attained. Furthermore, since a compact diode which can flow a larger current than that consisting of amorphous silicon can be manufactured, diodes can be arranged at a smaller pitch.

Figure 21:
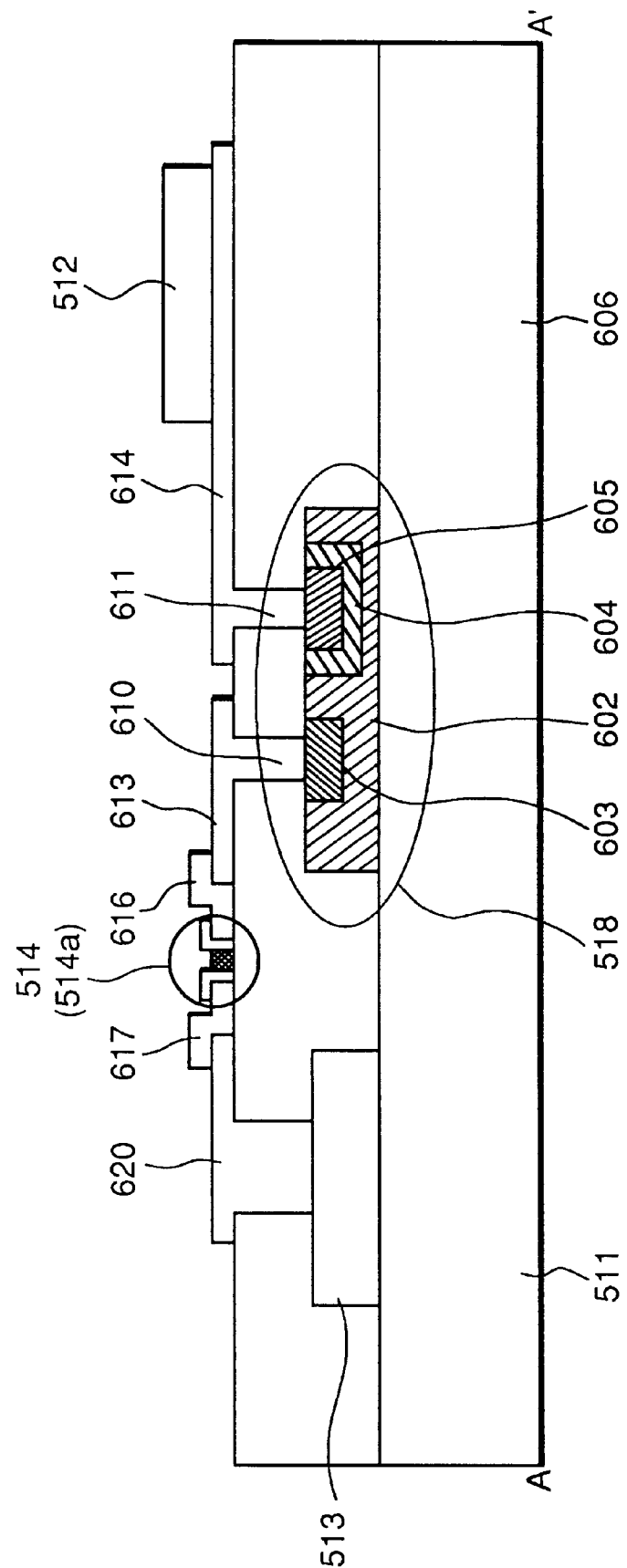
FIG. 21 is a sectional view showing a multi electron source which uses, as a nonlinear element, a diode consisting of polycrystalline silicon.

Since an electron source of this embodiment has substantially the same planar shape as that of the fifth embodiment, its plan view is omitted, and FIG. 21 shows its section.

FIG. 21 is a sectional view showing an example of an electron source substrate in which a surface conduction type electron emitting element as an electron emitting element is formed on a glass substrate 511 formed with a diode.

Referring to FIG. 21, reference numeral 511 denotes a glass substrate; 512, a column-direction wiring line; and 513, a row-direction wiring line. Reference numeral 514a denotes an electron emitting portion formation thin film. When this thin film is subjected to an energization forming treatment, an electron emitting portion is formed, thus obtaining a surface conduction type electron emitting element 514.

A polysilicon layer 602 as a p-type well diffusion layer is formed on the glass substrate. A $p^+$-type layer 603 which is electrically connected to an anode electrode 610 of the diode is formed around the p-type well layer 602. Also, an $n^+$-type layer and an n-type layer, which are electrically connected to a cathode electrode 611 of the diode are formed.

The upper portion of these diode structure portions is covered by an $SiO_2$ insulating layer 606, and the anode and cathode electrodes 610 and 611 are respectively connected to aluminum wiring lines 613 and 614.

The diode is formed between the anode and cathode electrodes 610 and 611, and the anode electrode 610 is electrically connected to an electrode 616 of the surface conduction type electron emitting element 514 via the aluminum wiring line 613. The other electrode 617 of the surface conduction type electron emitting element 514 is electrically connected to the row-direction wiring line 513 via an aluminum wiring line 620. The cathode electrode 611 of the diode is electrically connected to the column-direction wiring line 512 via an aluminum wiring line 614.

Figure 22:
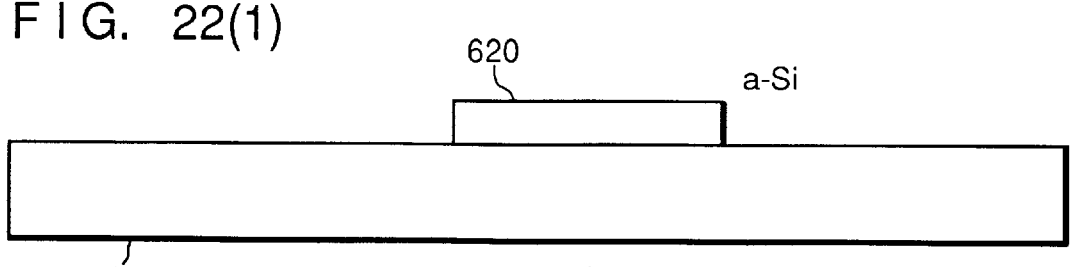
FIGS. 22(1) to 22(9) are sectional views for explaining the method of manufacturing the multi electron source which uses, as a nonlinear element, a diode consisting of polycrystalline silicon.
Figure 22:
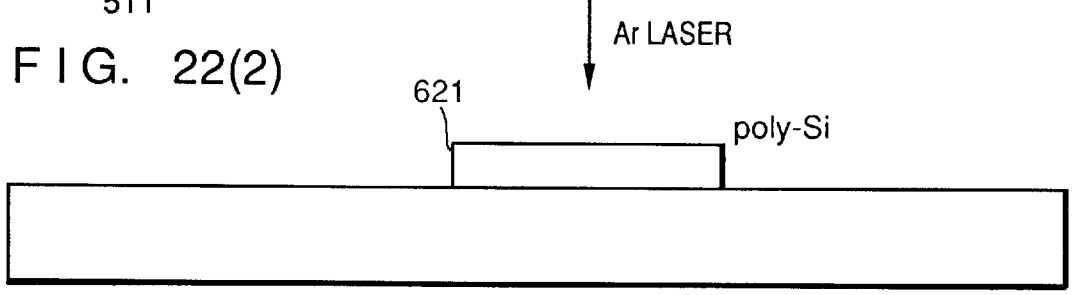
Figure 22:
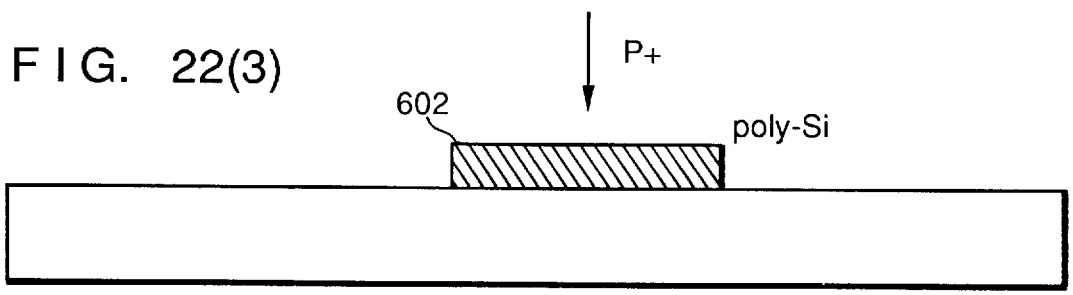
Figure 22:
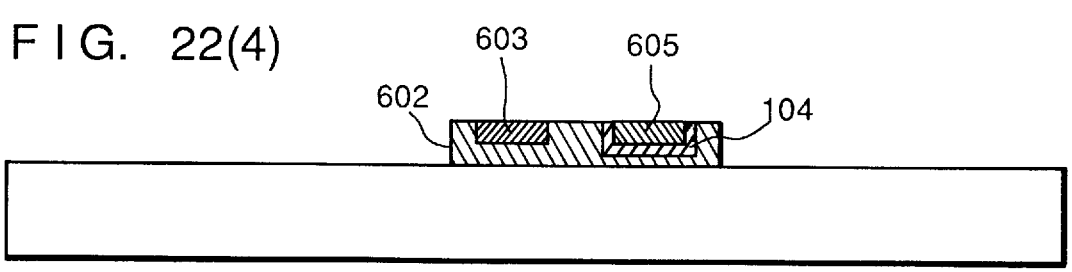
Figure 22:
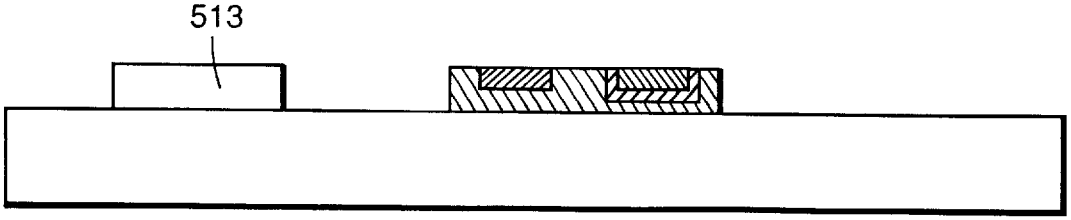
Figure 22:
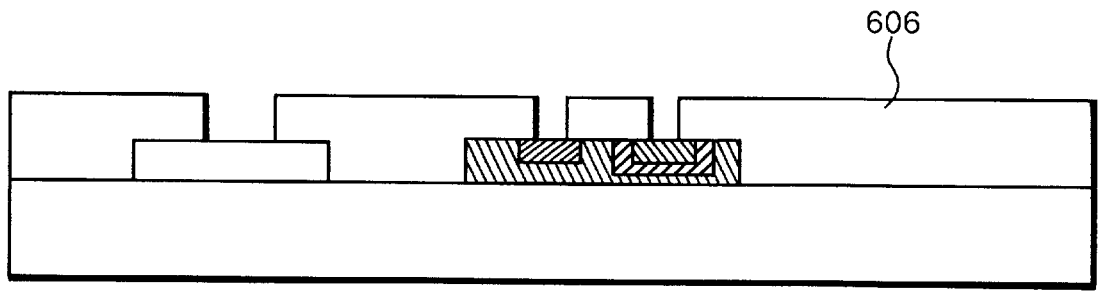
Figure 22:
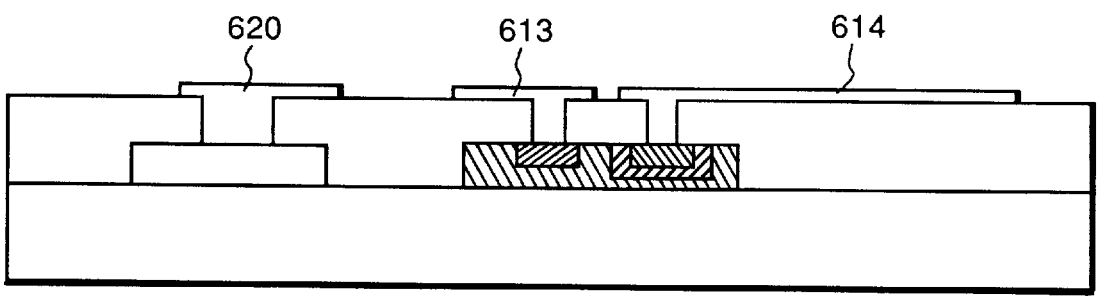
Figure 22:
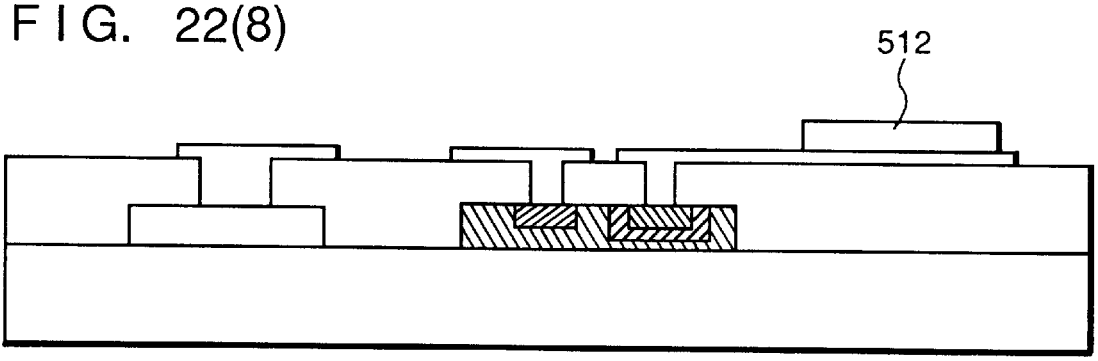
Figure 22:
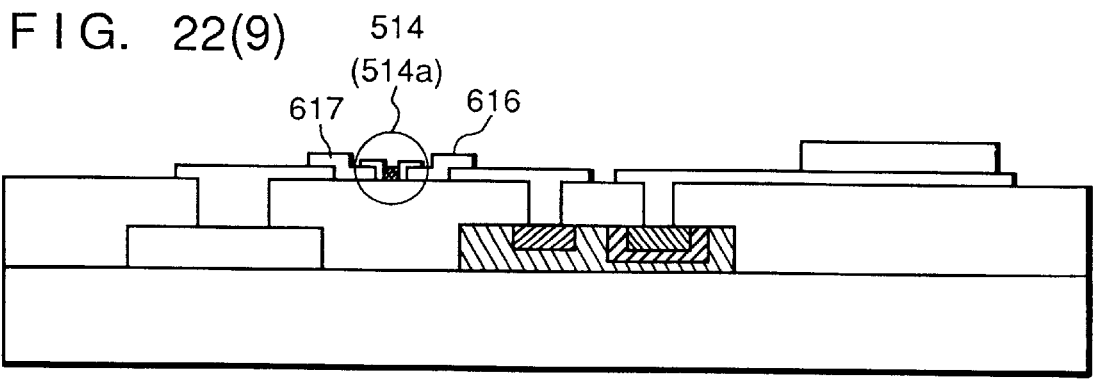

FIGS. 22(1) to 22(9) are sectional views showing the processes in the manufacture of an electron source with the function element of this embodiment having the structure shown in FIG. 21.

In a process in FIG. 22(1), an amorphous silicon film 620 is formed on a cleaned glass substrate 511 by an RF magnetron sputtering method. In a process in FIG. 22(2), an Ar laser at a non-welding level is irradiated onto the amorphous silicon film 620 at room temperature to convert amorphous silicon into polycrystalline silicon, thus forming a polysilicon film 621. In a process in FIG. 22(3), a p-type impurity (conductivity type control material) is doped in a desired region of the polysilicon film 621 to form a p-type well layer 602. In a process in FIG. 22(4), a p$^+$-type layer, an n-type layer, and an n$^+$-type layer are formed in the p-well layer, thus forming the diode element.

Furthermore, in a process in FIG. 22(5), after Au/Cr layers are sequentially stacked on the glass substrate 511 by a vacuum deposition method, a photoresist (AZ1370: available from Hoechst Corp.) is spin-coated by a spinner and is baked. Thereafter, a photomask image is exposed and developed to form a resist pattern for a row-direction wiring line. The Au/Cr deposition film is wet-etched to form a row-direction wiring line 513. In a process in FIG. 22(6), an insulating interlayer 606 consisting of a silicon oxide film is deposited by an RF sputtering method, and contact holes are formed by etching (RIE method) using a photoresist pattern.

In a process in FIG. 22(7), a pattern for forming an aluminum wiring line 613 for electrically connecting an anode electrode 610 of the diode and an electrode 616 of the surface conduction type electron emitting element, an aluminum wiring line 614 for electrically connecting a cathode electrode 611 and a column-direction wiring line 512, and an aluminum wiring line 620 for electrically connecting the row-direction wiring line 513 and an electrode 617 of the surface conduction type electron emitting element is formed using a photoresist, and an aluminum layer is deposited by a vacuum deposition, thereby forming these wiring lines by a lift-off method. Similarly, in a process in FIG. 22(8), a column-direction wiring line 512 is formed using an Au/Ti film to be electrically connected to the aluminum wiring line 614.

In a process in FIG. 22(9), a surface conduction type electron emitting element 514 is formed. Since the formation method of the surface conduction type electron emitting element 514 is the same as that in the fifth embodiment, a detailed description thereof will be omitted. In this embodiment as well, after the diode is formed, the surface conduction type emitting element is subjected to energization forming via the diode, thus uniforming the characteristics of a large number of surface conduction type emitting elements.

The method of this embodiment can be very effectively applied to the manufacture of an image display apparatus, and uniformity of the display luminance can be improved.

The preferred embodiments of the present invention, which can solve (First Problem) described above have been described.

The preferred embodiments of the present invention which solve the above-mentioned (Second Problem) will be described in the following seventh and eighth embodiments.

[Seventh Embodiment]

Figure 23:
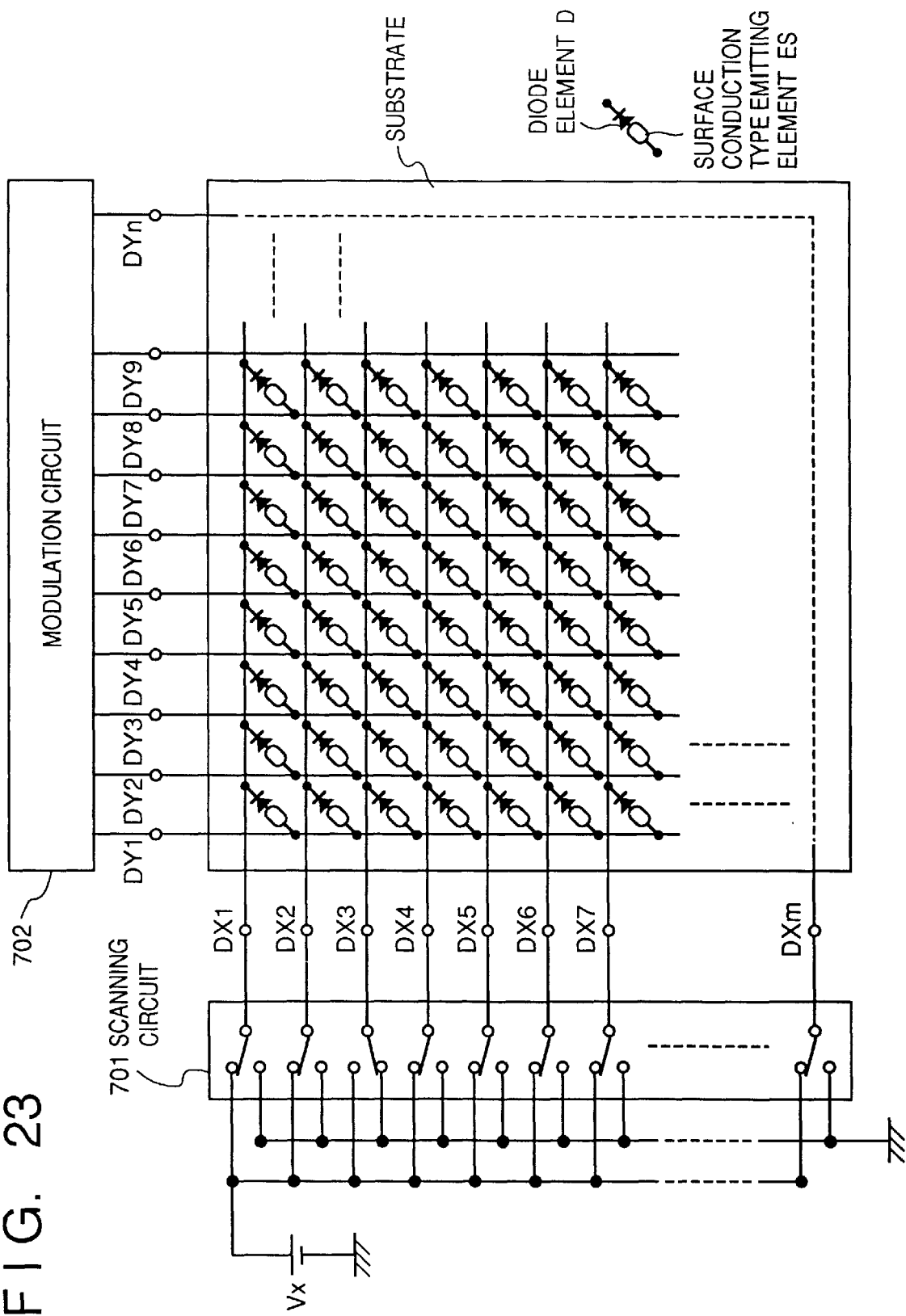
FIG. 23 is a schematic circuit diagram for explaining a driving method and apparatus according to an embodiment of the present invention.

FIG. 23 is a circuit diagram showing an example of a driving method of an electron source. On a substrate (SUB) in FIG. 23, surface conduction type emitting elements (ES) and diode elements (D) are formed in a matrix. Note that such an electron source can be easily formed by using one of the methods described in the first to sixth embodiments above.

In the driving method of the present invention, each diode element (D) is arranged, so that the driving voltage to be applied to the surface conduction type emitting element acts in the forward direction with respect to the rectification characteristics of the diode element (D). More specifically, in this embodiment, as shown in FIG. 23, each diode element (D) connected in series with the surface conduction type emitting element is connected, so that the cathode points toward the row-direction wiring line side, and the anode points toward the column-direction wiring line side.

Reference numeral 701 denotes a scanning circuit; and 702, a modulation circuit. The scanning circuit 701 is connected to row-direction wiring lines of the electron source via terminals $DX_1$ to $DX_m$, and the modulation circuit 702 is connected to column-direction wiring lines of the electron source via terminals $DY_1$ to $DY_n$. Note that output sections of the scanning circuit 701 and the modulation circuit 702 use circuits constituted by connecting switching elements (FETs) in a totem-pole pattern, as shown in, e.g., FIG. 24, and need only apply appropriate signals to the gates ($GP_{C1}$ to $GP_{CM}$, $GN_{C1}$ to $GN_{CM}$, $GP_{R1}$ to $GP_{RN}$, and $GN_{R1}$ to $GN_{RN}$). Note that reference numeral 712 denotes a row-direction wiring line; and 713, a column-direction wiring line.

Figure 25:
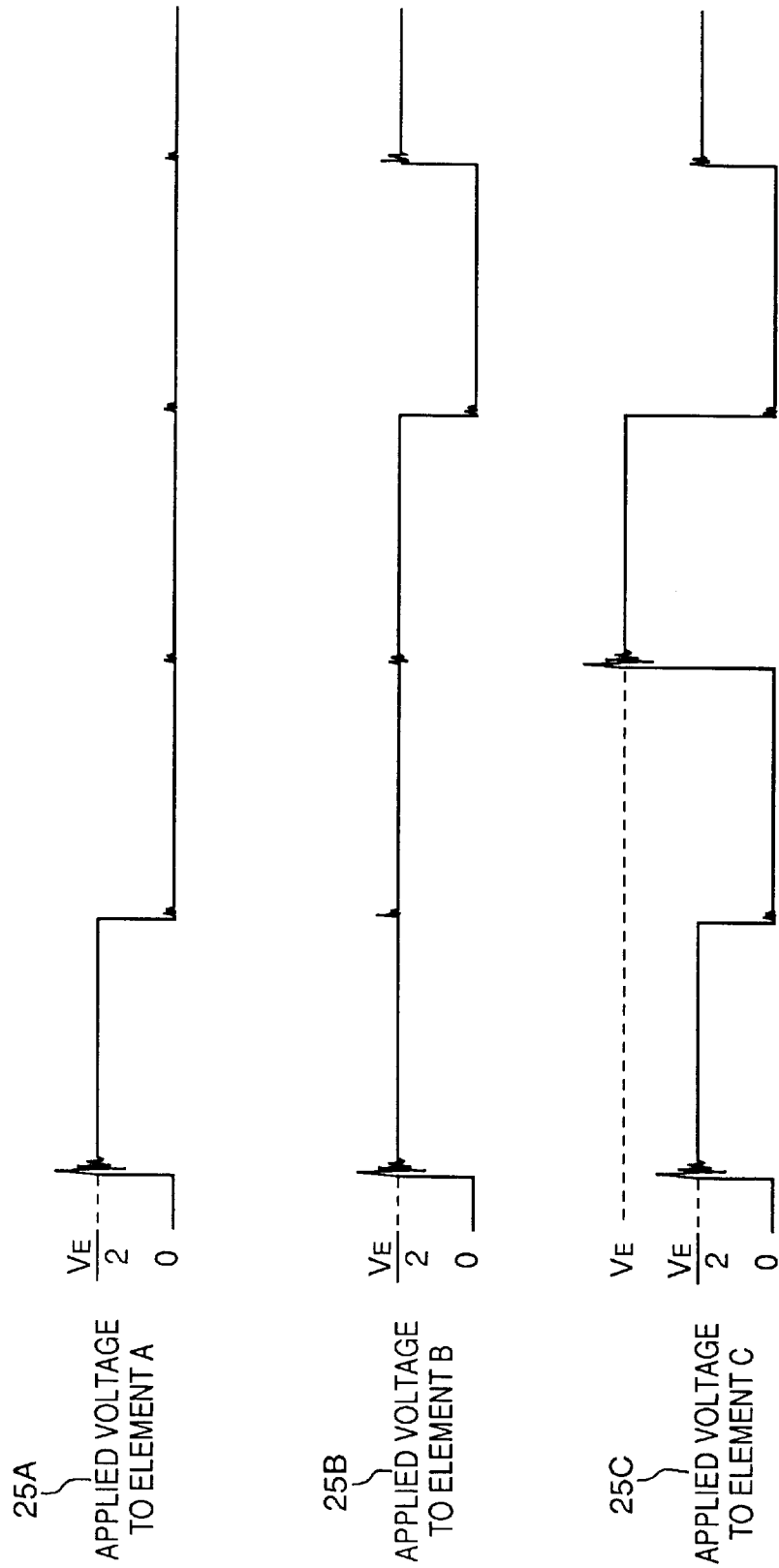
FIG. 25 is a graph of a voltage waveform to show the effect of the embodiment of the present invention.
Figure 43:
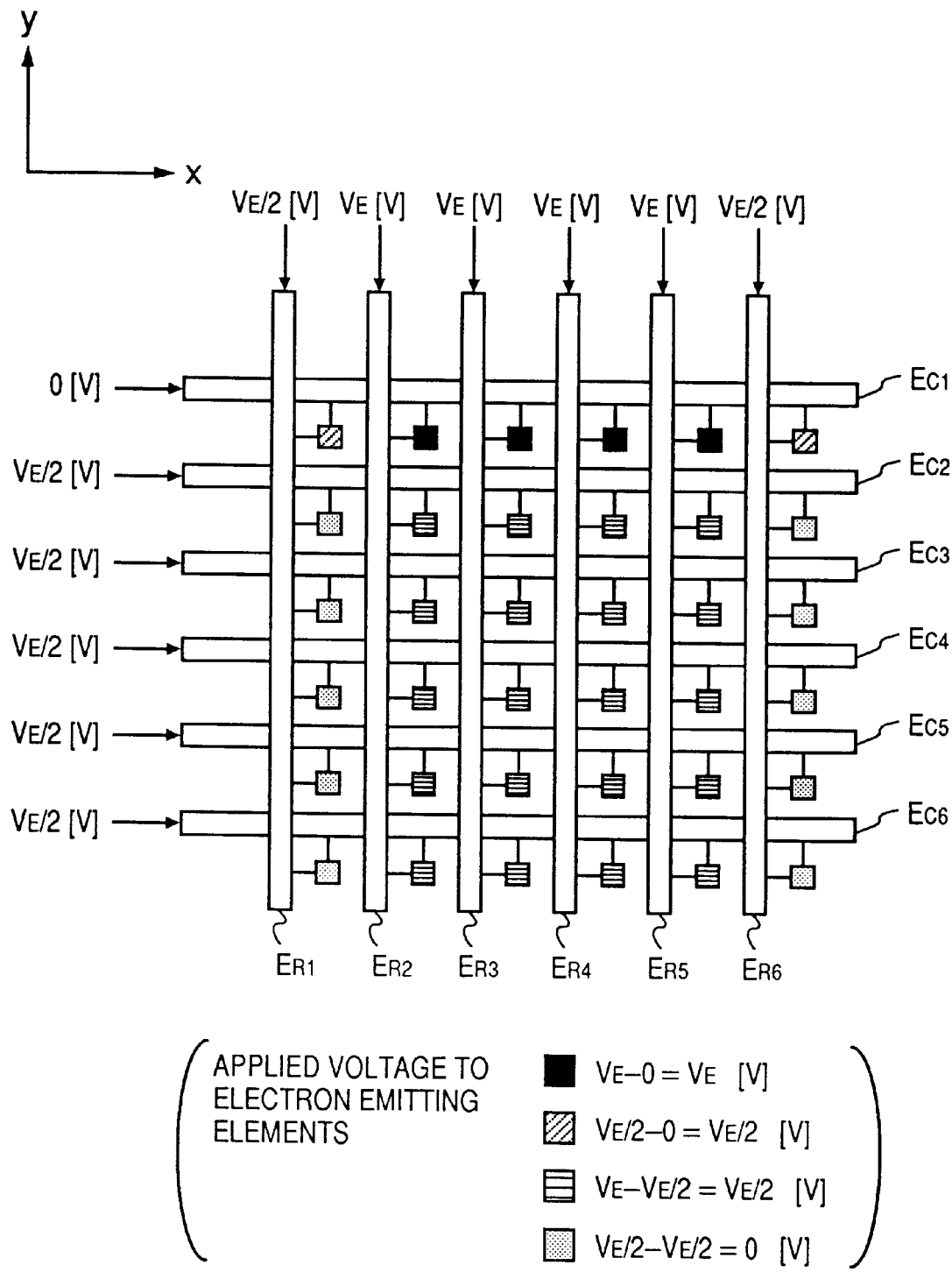
FIG. 43 is a view showing an example of an application pattern of driving voltages.
Figure 44:
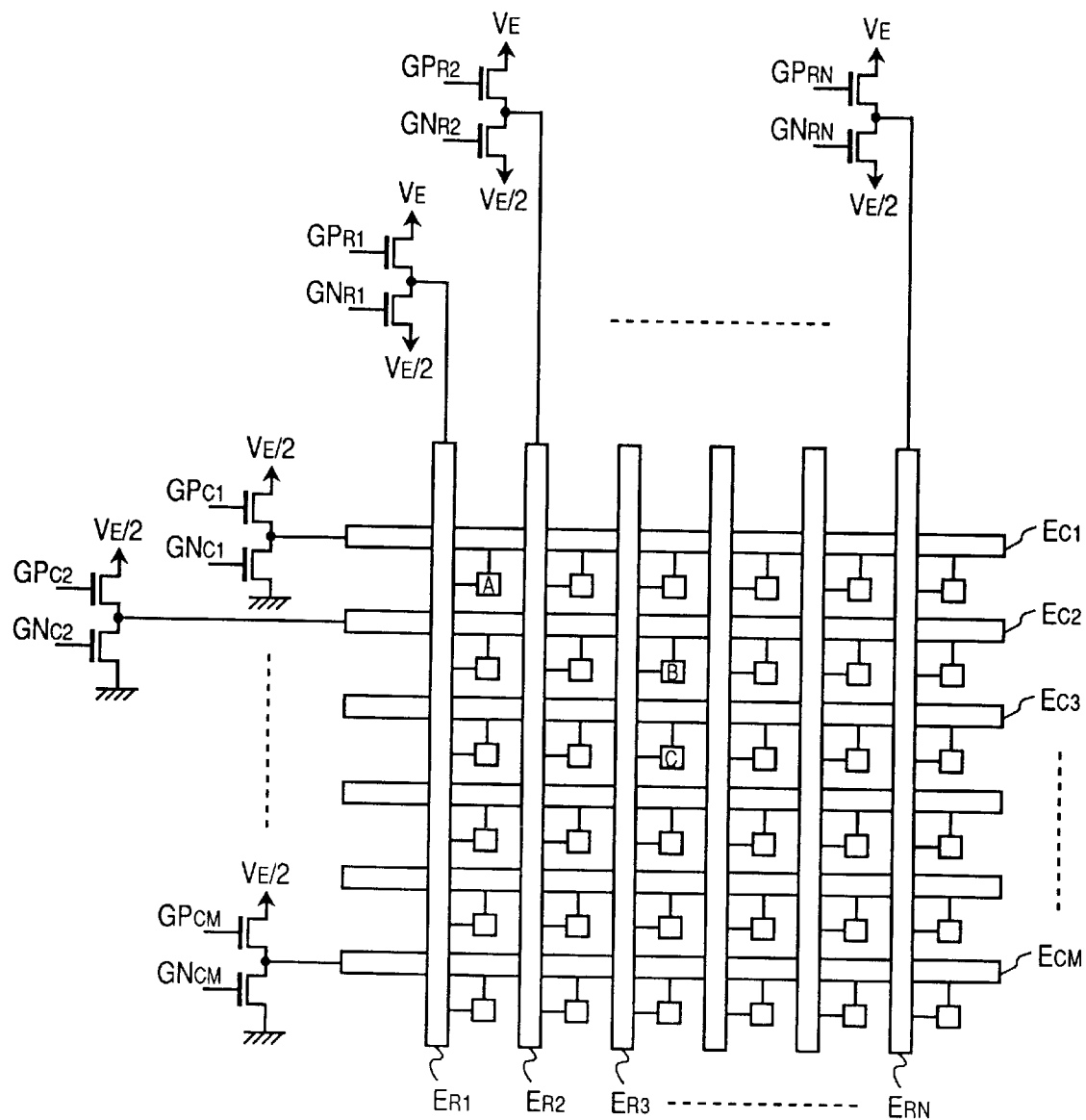
FIG. 44 is a view showing an example of a driving circuit.

With the above-mentioned arrangement, when a driving voltage exemplified in FIG. 43 above is applied, the driving voltage to the surface conduction type emitting element acts in the forward direction with respect to the diode element (D), but acts in the reverse direction with respect to spike noise SP(-). Therefore, upon operation of the diode element (D), the waveforms of voltages to be applied to surface conduction type emitting elements are as shown in 25A, 25B, and 25C in FIG. 25 (these graphs respectively correspond to the voltage waveforms in 46J, 46K, and 46L in FIG. 46).

More specifically, according to this embodiment, since no spike noise SP(-) is applied to each surface conduction type emitting element, deterioration of characteristics and destruction of a surface conduction type emitting element as conventional problems can be prevented, and the service life of the multi electron source can be greatly prolonged.

Figure 24:
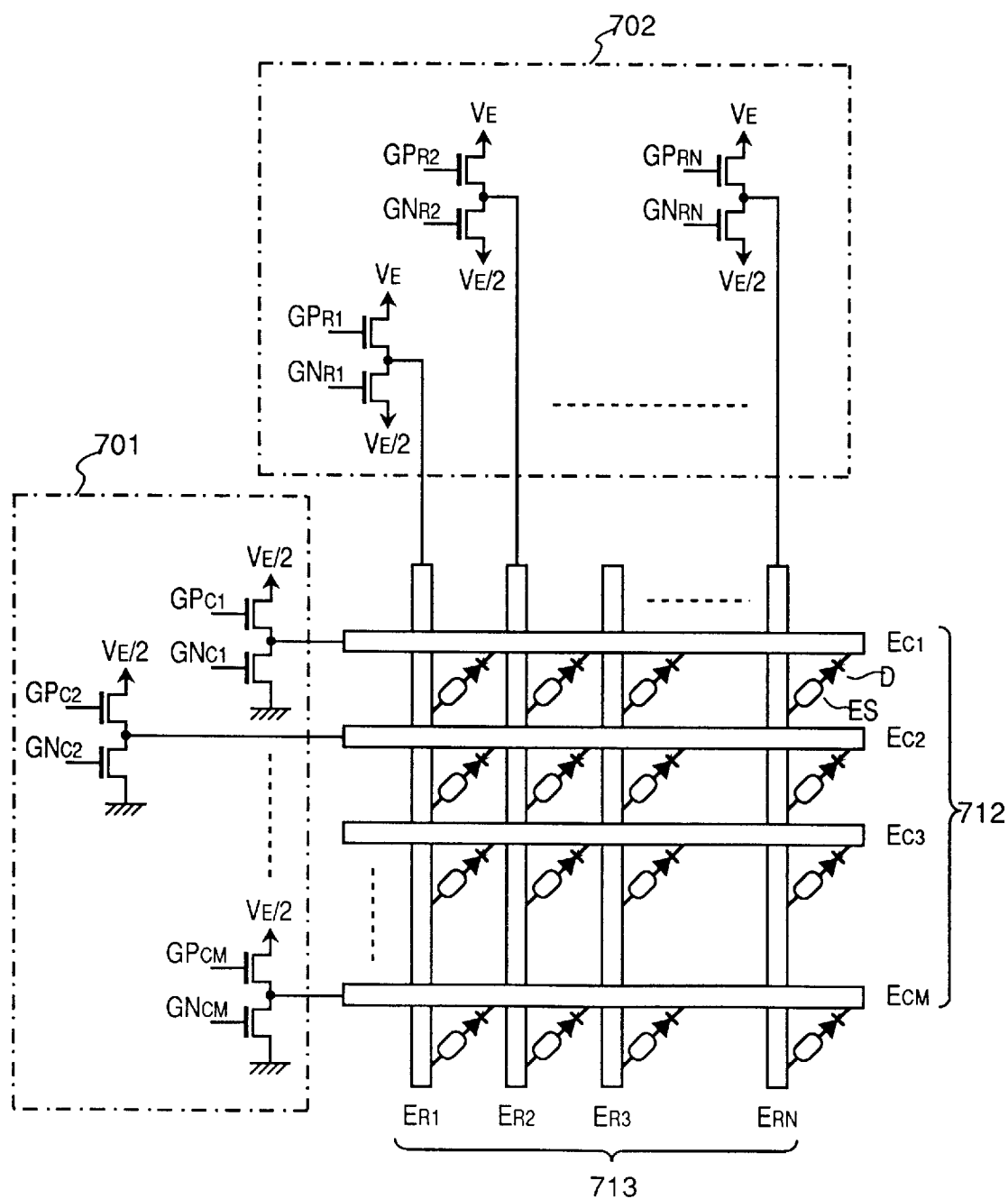
FIG. 24 is a circuit diagram showing an embodiment of a driving circuit.
Figure 26:
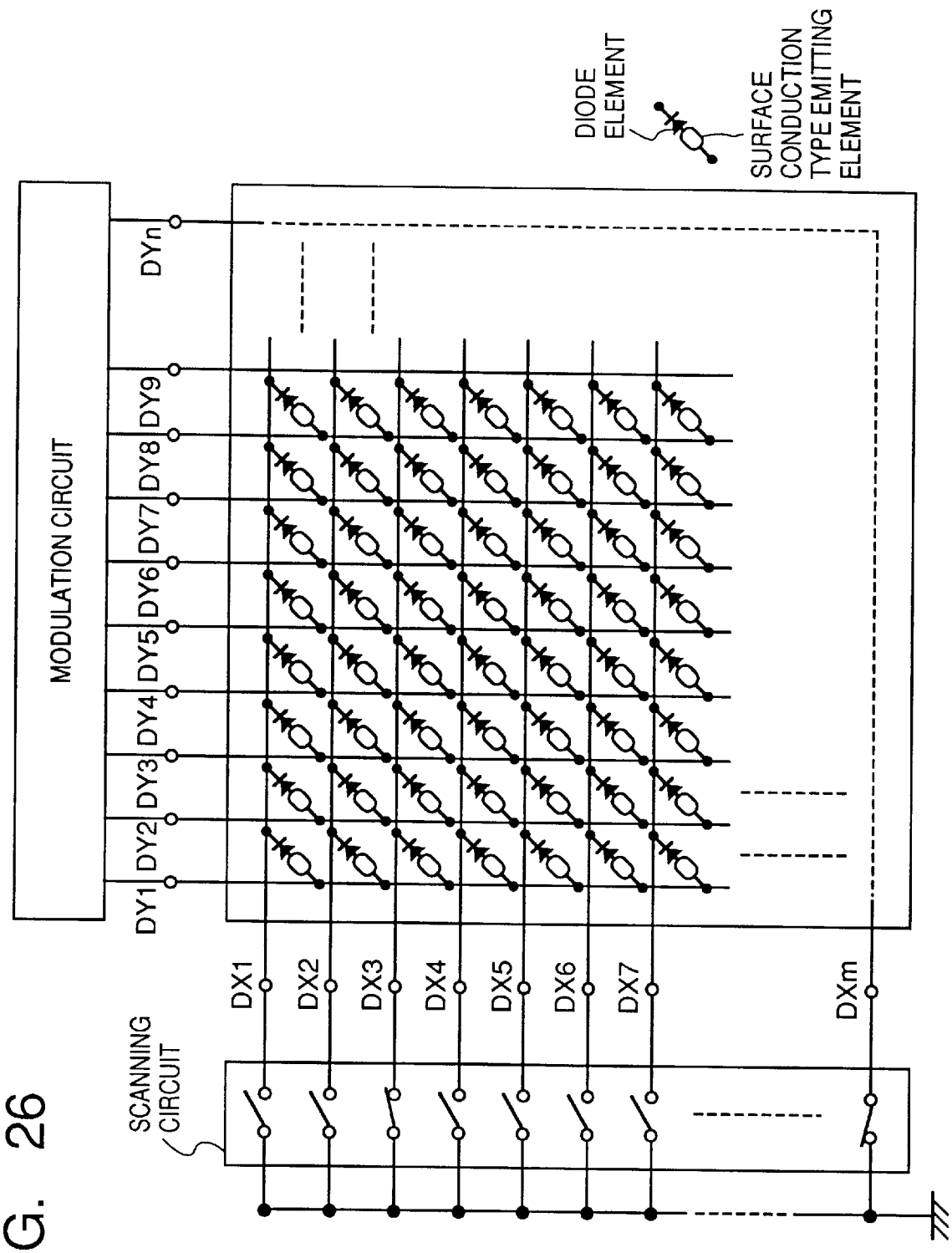
FIG. 26 is a circuit diagram showing another example of a driving circuit.

Note that a circuit having an arrangement shown in, e.g., FIG. 26 can be used in place of the scanning circuit 701 shown in FIG. 24. More specifically, switching elements each for controlling whether or not a row-direction wiring line is connected to the ground level are arranged in correspondence with the row-direction wiring lines. Since the diode elements connected in series with the surface conduction type emitting elements can prevent current leakage to other elements, a predetermined scanning operation can be performed even when only a row to be scanned is connected to the ground level and other rows are set in a floating state. For this reason, the above-mentioned circuit can be used. With this circuit as well, a noise prevention effect can be obtained, as a matter of course. According to this arrangement, the number of switching elements can be halved as compared to the scanning circuit shown in FIG. 24.

An example wherein the above-mentioned driving method which can prevent noise is applied to an image forming apparatus will be explained below. When the driving method of the present invention is applied to an image forming apparatus, a display panel is manufactured by a method described in, e.g., the first embodiment, and a circuit to be exemplified below is added to the display panel.

Figure 27:
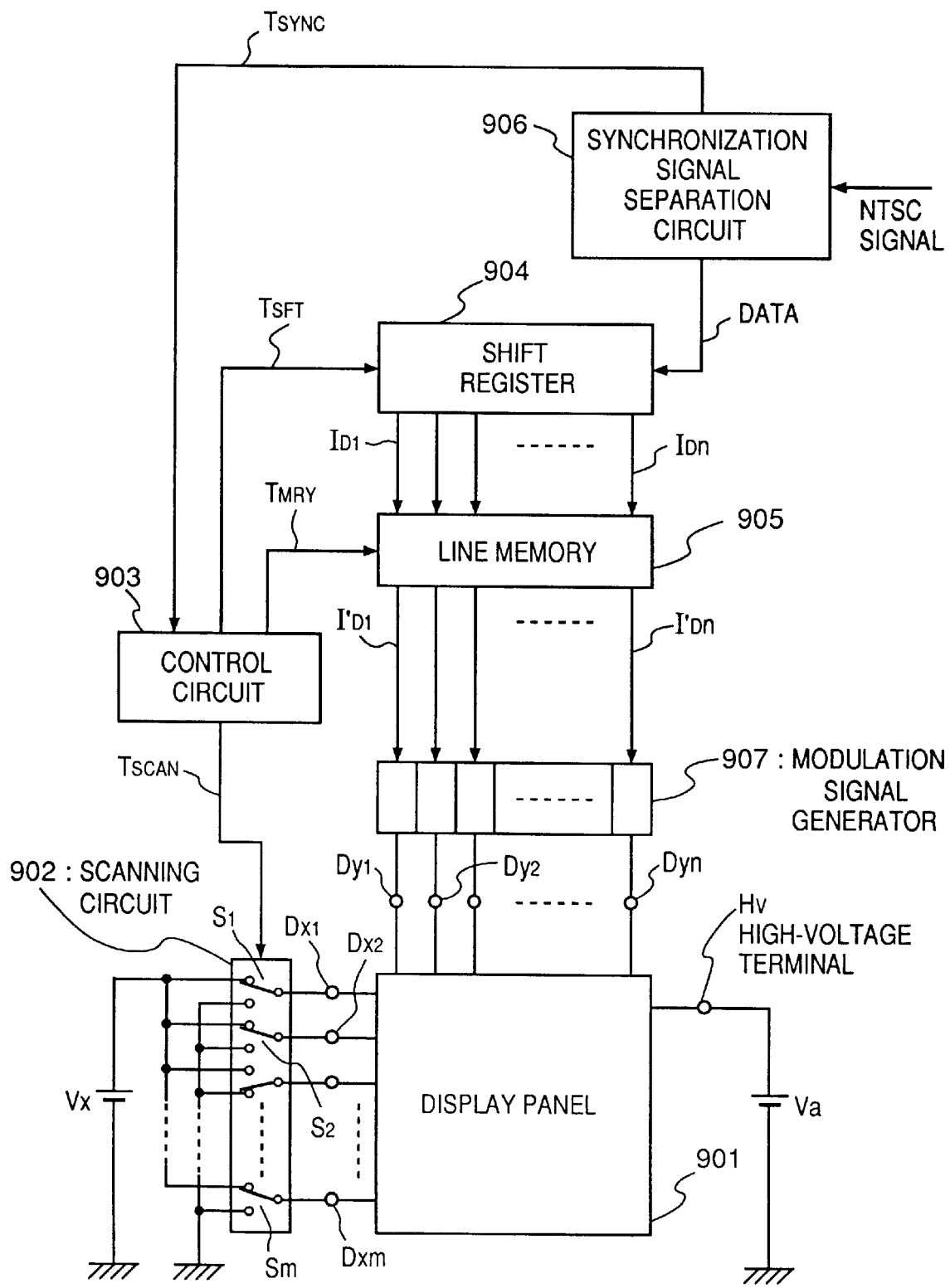
FIG. 27 is a circuit diagram showing an example of the circuit arrangement used when the present invention is applied to a television display apparatus.

FIG. 27 is a schematic block diagram of the arrangement of a driving circuit for achieving a television display on the basis of an NTSC television signal. Referring to FIG. 27, reference numeral 901 denotes the above-mentioned display panel; 902, a scanning circuit; 903, a control circuit; 904, a shift register; 905, a line memory; 906, a synchronization signal separation circuit; 907, a modulation signal generator; and Vx and Va, DC voltage sources.

The functions of the respective units will be described below. The display panel 901 is connected to an external electrical circuit via terminals Dx1 to Dxm, terminals Dy1 to Dyn, and a high-voltage terminal Hv. Of these terminals, the terminals Dx1 to Dxm are applied with scanning signals for sequentially driving a multi electron beam source arranged in the display panel, i.e., surface conduction type emitting elements, which are connected in an M (rows)×N (columns) matrix, in units of rows (N elements). On the other hand, the terminals Dy1 to Dyn are applied with modulation signals for controlling electron beams to be output from the surface conduction type emitting elements in the row selected by the scanning signal. The high-voltage terminal Hv is supplied with a DC voltage of 10 [kV] from the DC voltage source Va. This voltage is an acceleration voltage for giving energy enough to excite phosphors to the electron beams output from the surface conduction type emitting elements.

The scanning circuit 902 will be described below. The scanning circuit 902 includes M switching elements (indicated by S1 to Sm in FIG. 27). Each switching element selects one of the output voltage from the DC voltage source Vx or 0 [V] (ground level), and electrically connects the selected voltage to a corresponding one of the terminals Dx1 to Dxm of the display panel 901. The switching elements S1 to Sm operate on the basis of a control signal Tscan output from the control circuit 903, and can be easily constituted by combining switching elements such as FETs in practice.

Note that the DC voltage source is set to output a constant voltage of 7 [V] on the basis of the characteristics of the surface conduction type emitting elements in this embodiment.

The control circuit 903 serves to match the operations of the respective unit, so as to achieve an appropriate display operation on the basis of an externally input image signal. The control circuit 903 generates control signals Tscan, Tsft, and Tmry to the respective units on the basis of a synchronization signal Tsync supplied from the synchronization signal separation circuit 906 (to be described below) Note that the timings of these control signals will be described in detail later with reference to FIGS. 32(1) to 32(6).

The synchronization signal separation circuit 906 is a circuit for separating a synchronization signal component and a luminance signal component from an externally input NTSC television signal, and can be easily constituted by a known frequency separation (filter) circuit. As is well known, the synchronization signal separated by the synchronization signal separation circuit 906 consists of vertical and horizontal synchronization signals. However, for the sake of simplicity, FIG. 27 illustrates these synchronization signals as a signal Tsync. On the other hand, the luminance signal component of an image separated from the television signal is represented by a signal DATA in FIG. 27 for the sake of simplicity, and this signal is input to the shift register 904.

The shift register 904 serial/parallel-converts the time-serially input signal DATA in units of lines of an image, and operates on the basis of the control signal Tsft supplied from the control circuit 903. (In other words, the control signal Tsft is a shift clock signal for the shift register 904.) Serial/parallel-converted data for one line of an image (corresponding to driving data for N electron emitting elements) are output from the shift register 904 as N parallel signals Id1 to Idn.

The line memory 905 is a memory device for storing data for one line of an image for a required period of time, and stores the contents of the signals Id1 to Idn in accordance with the control signal Tmry supplied from the control circuit 903. The stored contents are output as signals I'd1 to I'dn, and are input to the modulation signal generator 907.

The modulation signal generator 907 is a signal source for modulating the driving operations of the surface conduction type emitting elements in correspondence with the image data I'd1 to I'dn, and its output signals are applied to the surface conduction type emitting elements in the display panel 901 via the terminals Dy1 to Dyn. As the modulation signal generator 907, a device which adopts a pulse width modulation system for generating a pulse of a constant voltage and appropriately modulating the pulse width in correspondence with input data, or a device which adopts a voltage modulation system for generating a voltage pulse having a predetermined width, and appropriately modulating the crest value of the voltage pulse in correspondence with input data can be used.

The functions of the respective units shown in FIG. 27 have been described. Prior to the description of the operation of the overall circuit, the operation of the display panel 901 will be described in more detail below with reference to FIGS. 28 to 31.

For the sake of convenience, in the following description, the number of pixels of the display panel is 6×6 (i.e., M=N=6). However, the actual display panel 901 has a considerably larger number of pixels than the 6×6 pixels, as a matter of course.

FIG. 28 shows a multi electron beam source which is constituted by connecting surface conduction type emitting elements connected in series with diode elements in a 6 (rows)×6(columns) matrix. For the sake of simplicity, the positions of the elements are represented by (X, Y) coordinates like D(1, 1), D(1, 2), . . . , D(6, 6) to be distinct from each other.

When the multi electron beam source is driven to display an image, a method of forming an image in a line-sequential manner in units of lines, parallel to the X-axis, of an image is adopted. In order to drive the electron emitting elements corresponding to one line of an image, a voltage of 0 [V] is applied to the terminal of a row corresponding to the display line of the terminals Dx1 to Dx6, and a voltage of 7 [V] is applied to other terminals. In synchronism with these voltages, modulation signals are applied to the terminals Dy1 to Dy6 in correspondence with an image pattern of the display line.

For example, a case will be described below wherein an image pattern shown in FIG. 29 is to be displayed. For the sake of simplicity, the luminances of the light-emitting portions of the image pattern are equal to each other, e.g., 100 [fL] or equivalent. In the display panel 901, a known phosphor "P-22" is used as a phosphor, the acceleration voltage is set to be 10 [kV], the repeating frequency of an image display is set to be 60 [Hz], and surface conduction type emitting elements with the above-mentioned characteristics are used as electron emitting elements. In this case, in order to obtain a luminance of 100 [fL], it is proper to apply a voltage of 14 [V] to an element corresponding to a light-emitting pixel for 10 msec. (Note that this numerical value varies if respective parameters are changed, as a matter of course.)

Figure 30:
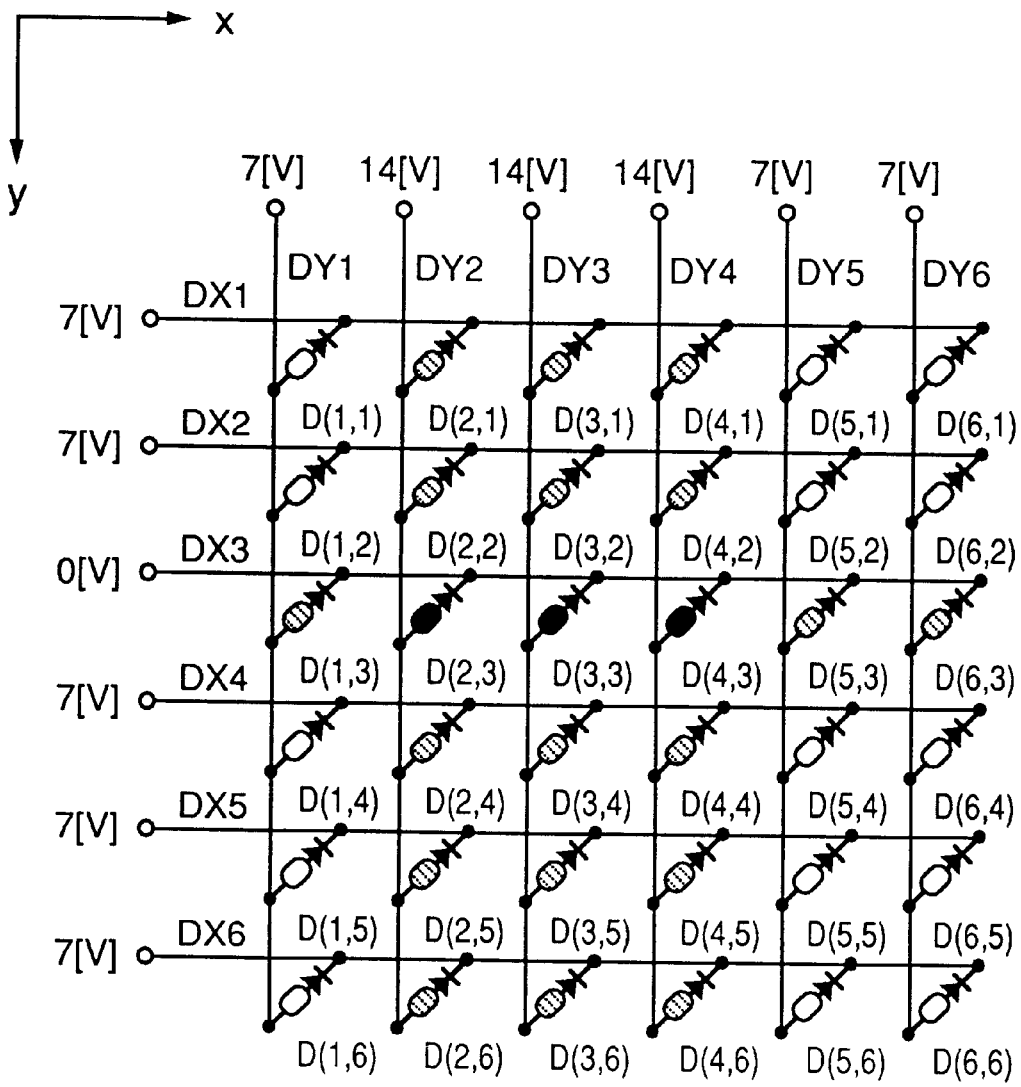
FIG. 30 is a diagram showing voltages which are applied to the multi electron source to display the display pattern shown in FIG. 29.

Thus, the operation in the emission period of, e.g., the third line of the image shown in FIG. 29 will be exemplified below. FIG. 30 shows voltage values to be applied to the multi electron beam source via the terminals Dx1 to Dx6 and the terminals Dy1 to Dy6 while the light emission of the third line of the image is performed. As can be seen from FIG. 30, a voltage of 14 [V] is applied to the surface conduction type emitting elements D(2, 3), D(3, 3), and D(4, 3) to output electron beams, while a voltage of 7 [V] (elements indicated by hatching in FIG. 30) or a voltage of 0 [V] (blank elements in FIG. 30) is applied to the elements other than the three elements. Since these voltages are equal to or lower than the threshold value voltage of electron emission, no electron beams are output from these elements.

Figure 31:
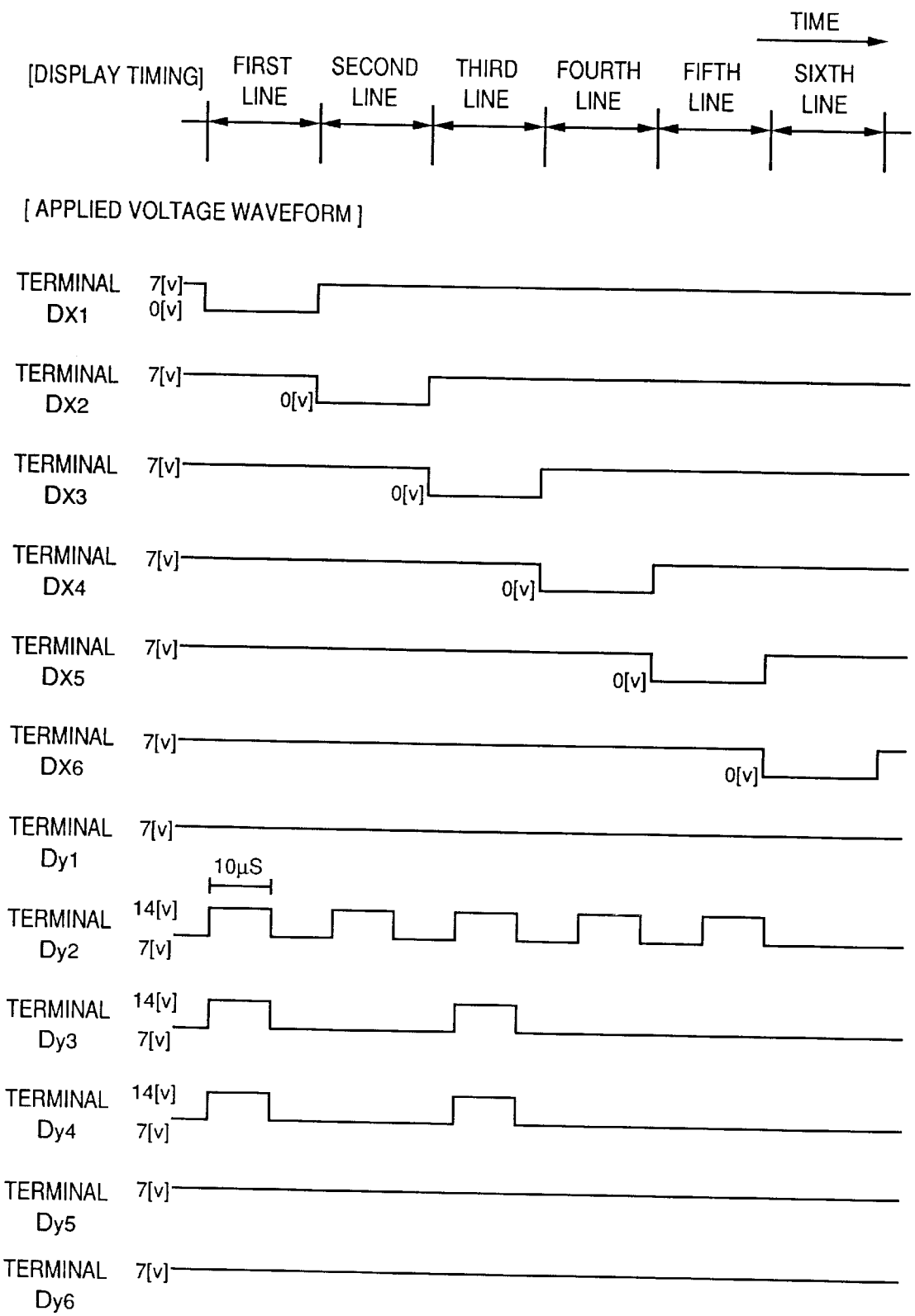
FIG. 31 is a graph of voltages which are applied to the multi electron source to display the display pattern shown in FIG. 29.

Other lines of the multi electron beam source are driven in accordance with the display pattern shown in FIG. 29 by the same method. FIG. 31 is a timing chart which time-serially shows the driving state of the multi electron beam source. As shown in FIG. 31, when the multi electron beam source is sequentially driven in units of lines from the first line, a display for one frame is achieved. Upon repetition of this operation at a rate of 60 frames per second, a flicker-less image display can be realized.

Since the diode element is connected in series with each surface conduction type emitting element, a noise component, having characteristics opposite to the rectification direction of the diode elements, of noise components superposed on the scanning signal or the modulation signal can be cut.

Furthermore, when the light-emission luminance of a display pattern is to be changed, if the luminance is to be increased (decreased), the width of the pulse of the modulation signal applied to the terminals Dy1 to Dy6 is set to be larger (smaller) than 10 msec or the voltage crest value of the pulse is set to be larger (or smaller) than 14 [V], thus allowing modulation.

The driving method of the display panel 901 has been described with reference to the 6×6 multi electron beam source. The operation of the entire apparatus shown in FIG. 27 will be described below with reference to the timing chart in FIGS. 32(1) to 32(6).

Figure 32:
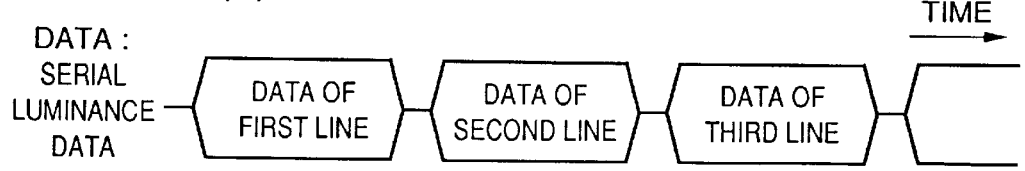
FIGS. 32(1) to 32(6) are graphs showing the operation timings of the respective units in the television display apparatus shown in FIG. 27.
Figure 32:
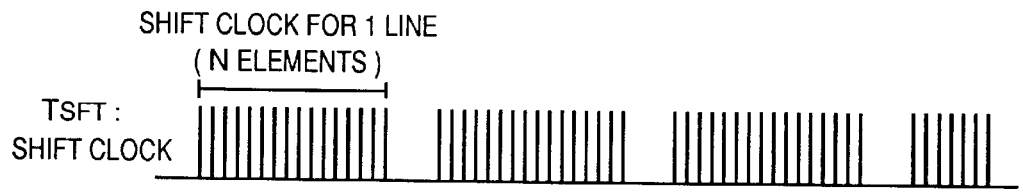
Figure 32:
Figure 32:
Figure 32:
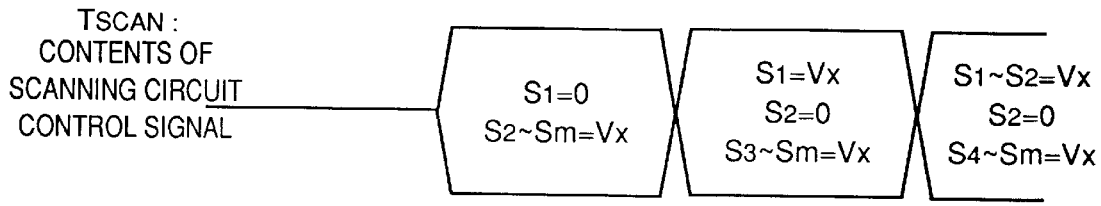
Figure 32:
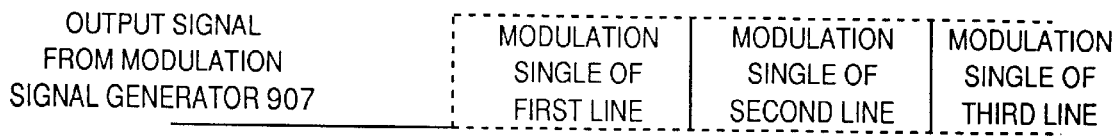

FIG. 32(1) shows the timing of a luminance signal DATA separated by the synchronization signal separation circuit 906 from an externally input NTSC signal. As shown in FIG. 32(1), data are sequentially supplied in the order of the first line, second line, third line, . . . , and in synchronism with these data, the control circuit 903 outputs shift clocks Tsft to the shift register 904, as shown in FIG. 32(2).

When data for one line are stored in the shift register 904, the control circuit 903 outputs a memory write signal Tmry to the line memory 905 at a timing shown in FIG. 32(3), and driving data for one line (N elements) are written in the memory. As a result, the contents of output signals I′d1 to I′dn from the line memory 905 change at a timing shown in FIG. 32(4).

On the other hand, the contents of a control signal Tscan for controlling the operation of the scanning circuit 902 are as shown in FIG. 32(5). More specifically, the operation of the scanning circuit 902 is controlled as follows. That is, in order to drive the first line, a voltage of 0 [V] is applied to only the switching element S1 in the scanning circuit 902, and a voltage of 7 [V] is applied to other switching elements; in order to drive the second line, a voltage of 0 [V] is applied to only the switching element S2, and a voltage of 7 [V] is applied to other switching elements; and so on.

In synchronism with this control operation, the modulation signal generator 907 outputs modulation signals to the display panel 901 at a timing shown in FIG. 32(6).

With the above-mentioned operation, a television display can be realized using the display panel 901.

Although not particularly described in the above description, the shift register 904 and the line memory 905 can be either of a digital signal type or an analog signal type as long as serial/parallel conversion and storage of an image signal can be performed at a predetermined speed. When digital signal type devices are used, the output signal DATA from the synchronization signal separation circuit 906 must be converted into a digital signal, and this operation can be easily realized by connecting an A/D converter to the output section of the circuit 906.

In the description of this embodiment, a television display is made on the basis of an NTSC television signal. However, an application of the display panel of the present invention is not limited to this. For example, the display panel of the present invention can be widely applied to other television signal systems or display apparatuses which are directly or indirectly connected to various image signal sources such as computers, image memories, communication networks, and the like, and is particularly suitably applied to a large-screen display for displaying a large-capacity image.

[Eighth Embodiment]

Figure 33:
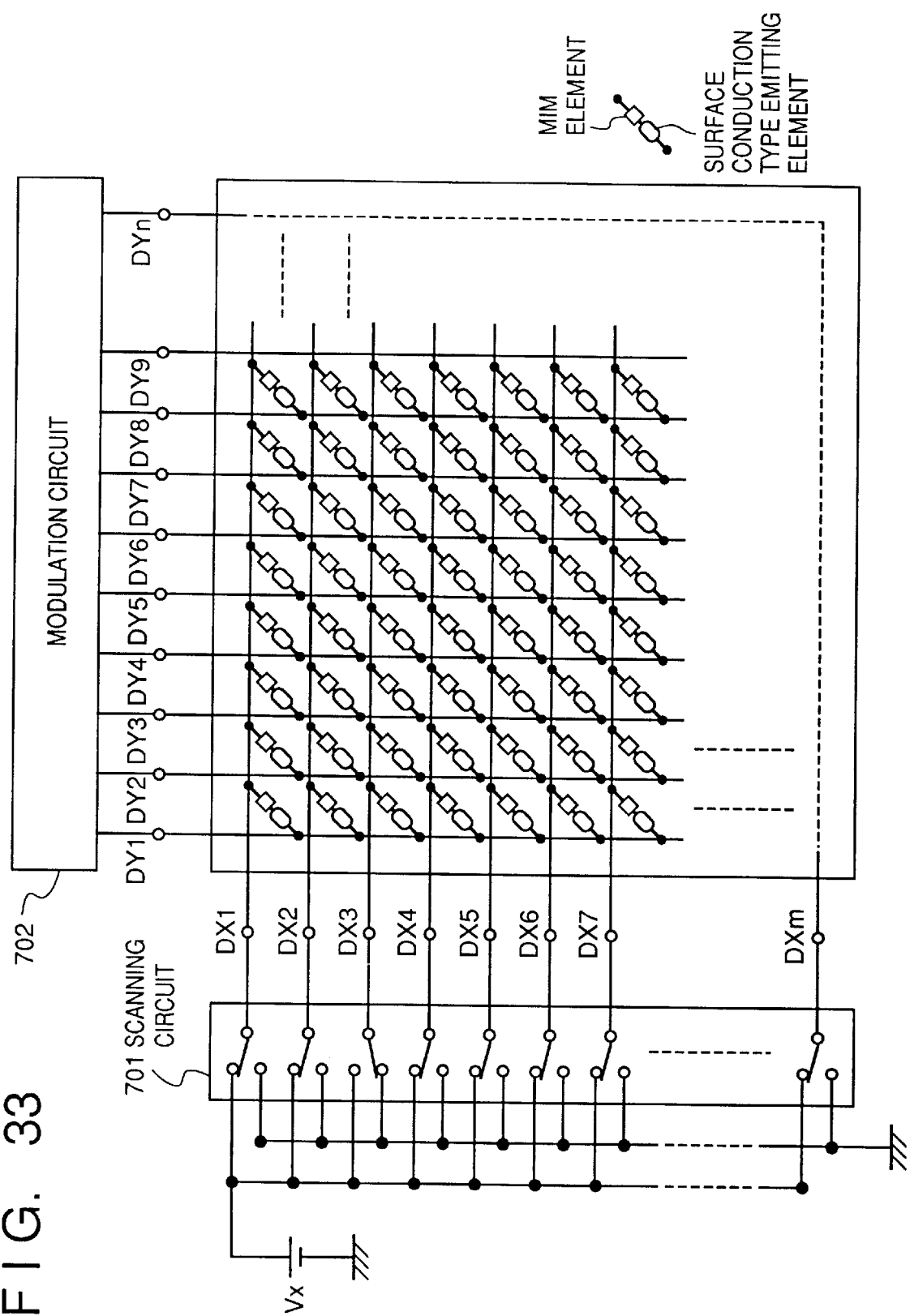
FIG. 33 is a schematic circuit diagram for explaining a driving method and apparatus of an embodiment which uses an MIM element as a nonlinear element.
Figure 34:
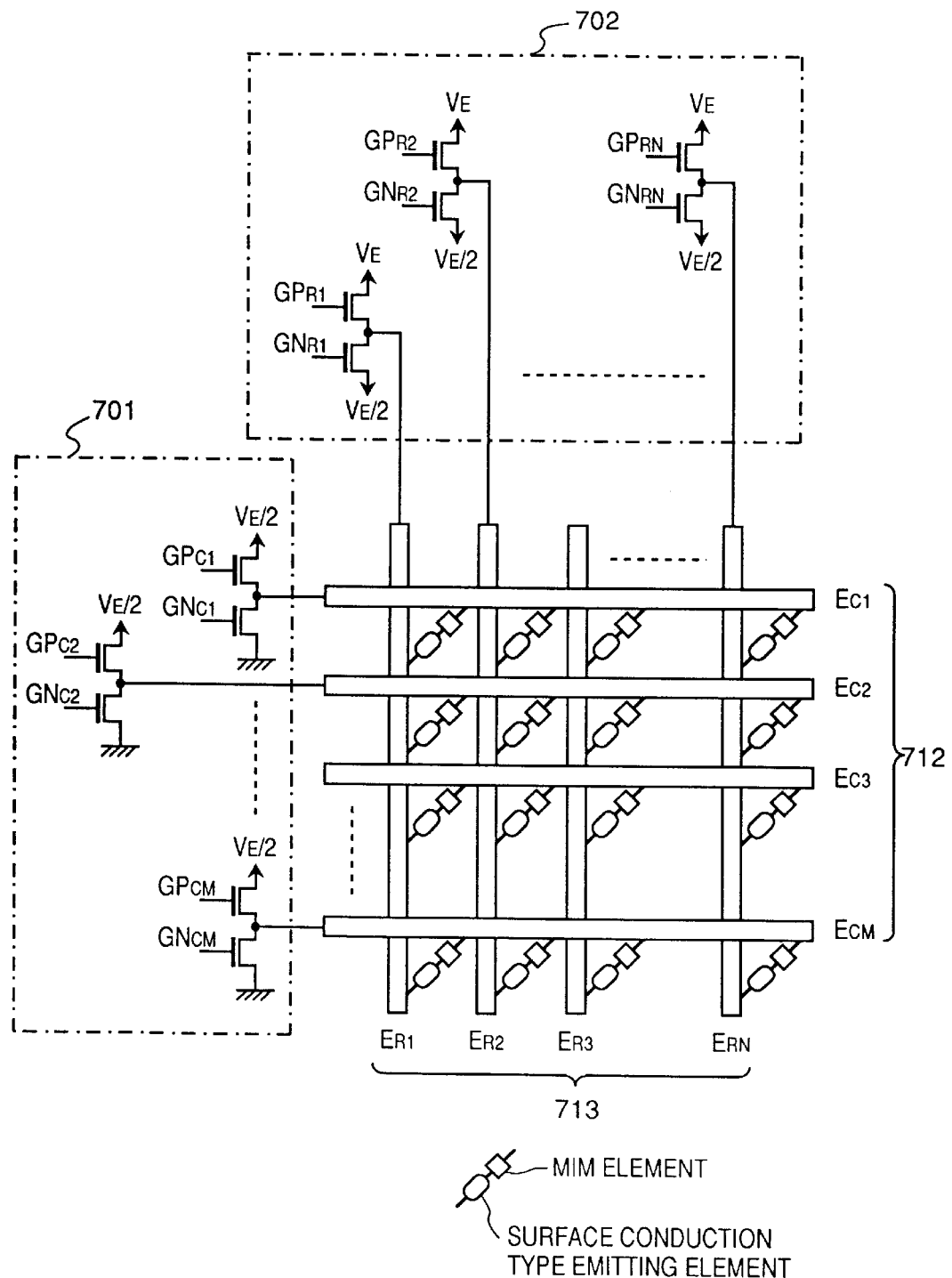
FIG. 34 is a circuit diagram showing an example of a driving circuit used when the MIM element is used as a nonlinear element.
Figure 35:
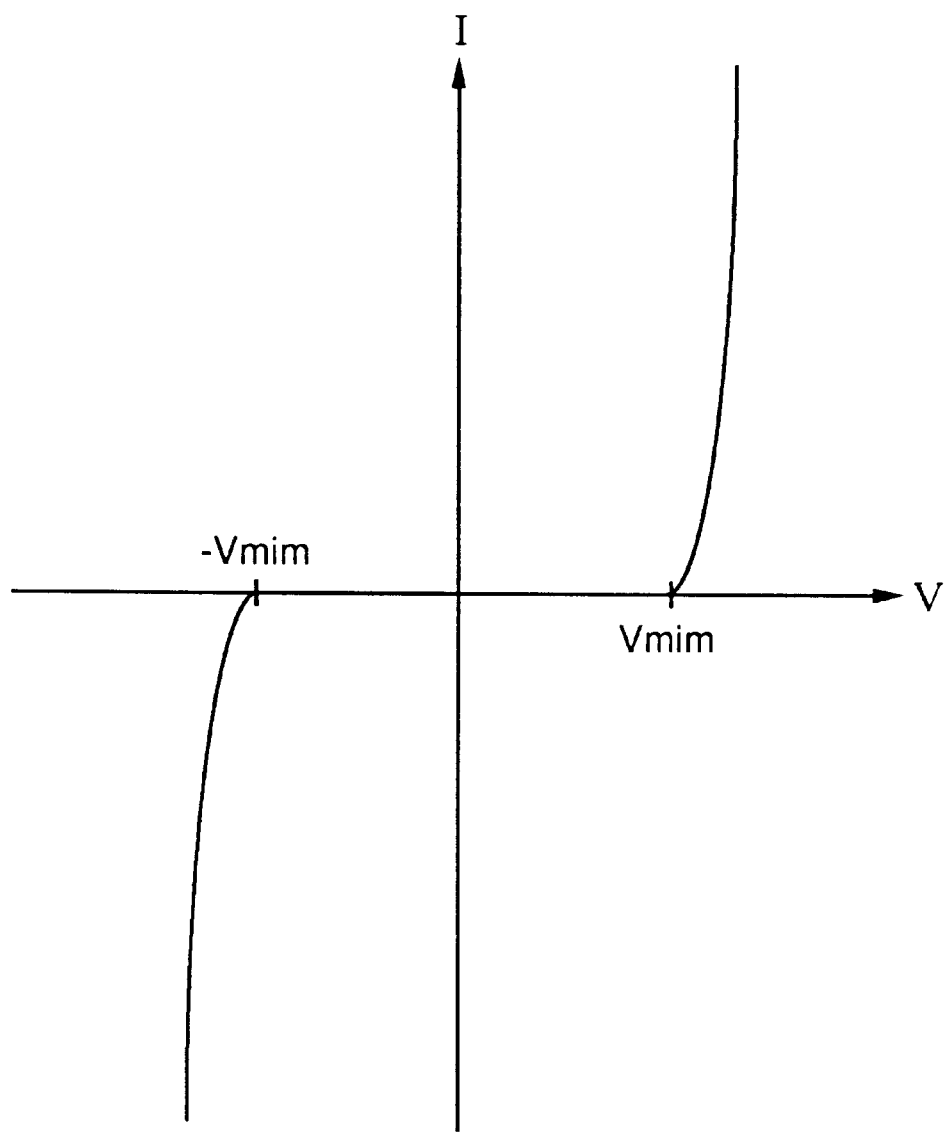
FIG. 35 is a graph showing the current/voltage characteristics of the MIM element used in the embodiment.

FIGS. 33 and 34 partially show the schematic driving arrangement of an electron source obtained when MIM elements are connected in place of the diode elements in the seventh embodiment. Row-direction wiring electrodes EC1 to ECM, column-direction wiring electrodes ER1 to ERn, and driving voltage application switching elements (FETS) in FIG. 34 are the same as those described above. In FIG. 34, the MIM element is connected in series with each electron emitting element. The MIM element has voltage/current characteristics in which the voltage abruptly changes from a threshold value voltage Vmin, as shown in FIG. 35.

Figure 36:
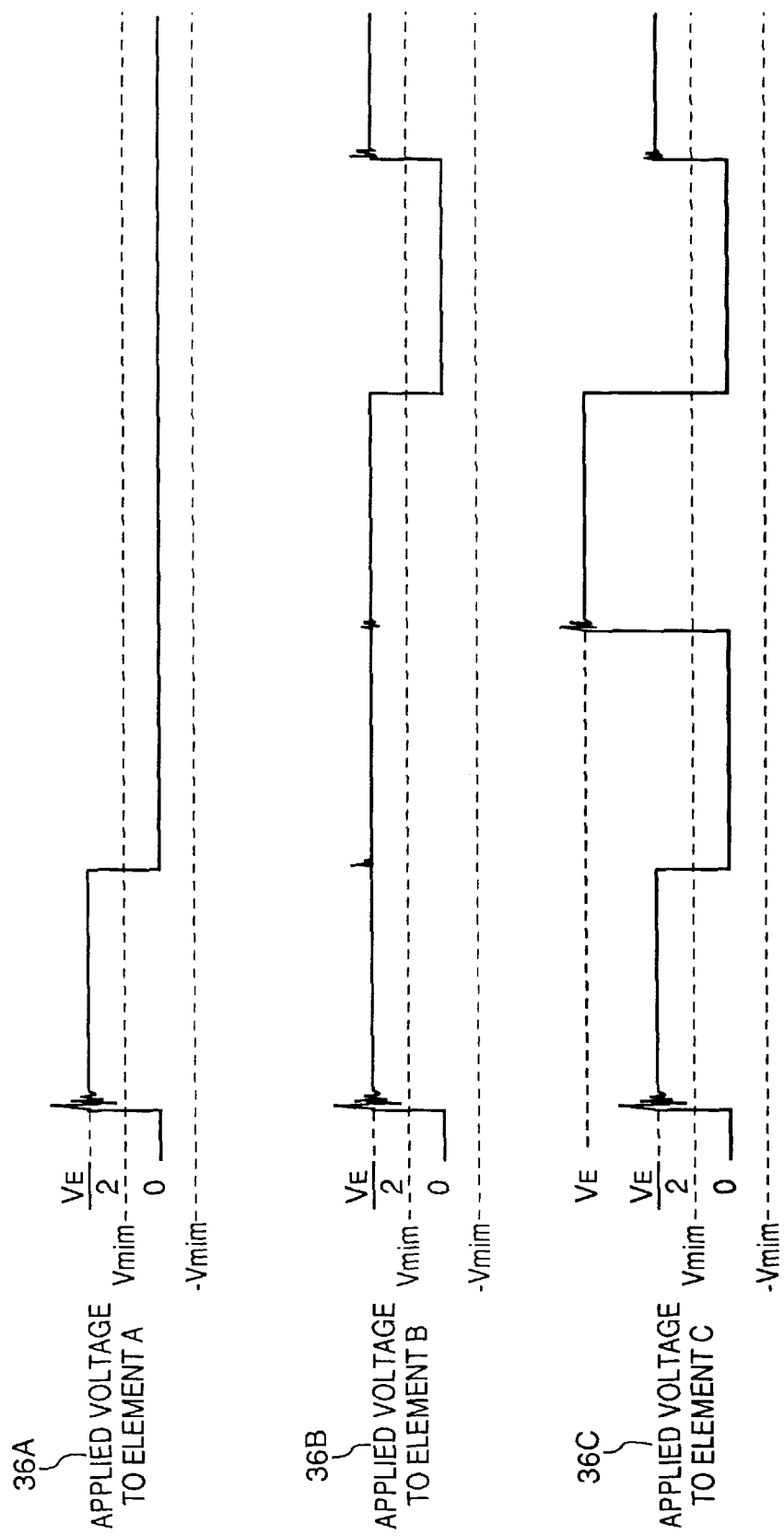
FIG. 36 is a graph for explaining the effect of the embodiment which uses the MIM element as a nonlinear element.

Therefore, upon operation of the MIM elements, the waveforms of voltages applied to the electron emitting elements are as shown in 36A, 36B, and 36C, in FIG. 36 (these graphs respectively correspond to the voltage waveforms in 46J, 46K and 46L in FIG. 46).

More specifically, the MIM element can prevent a noise component superposed on the scanning signal or the modulation signal equal to or lower than the threshold voltage Vmin from being applied to each electron emitting element.

The electron source of this embodiment will be described in detail below.

Figure 37:
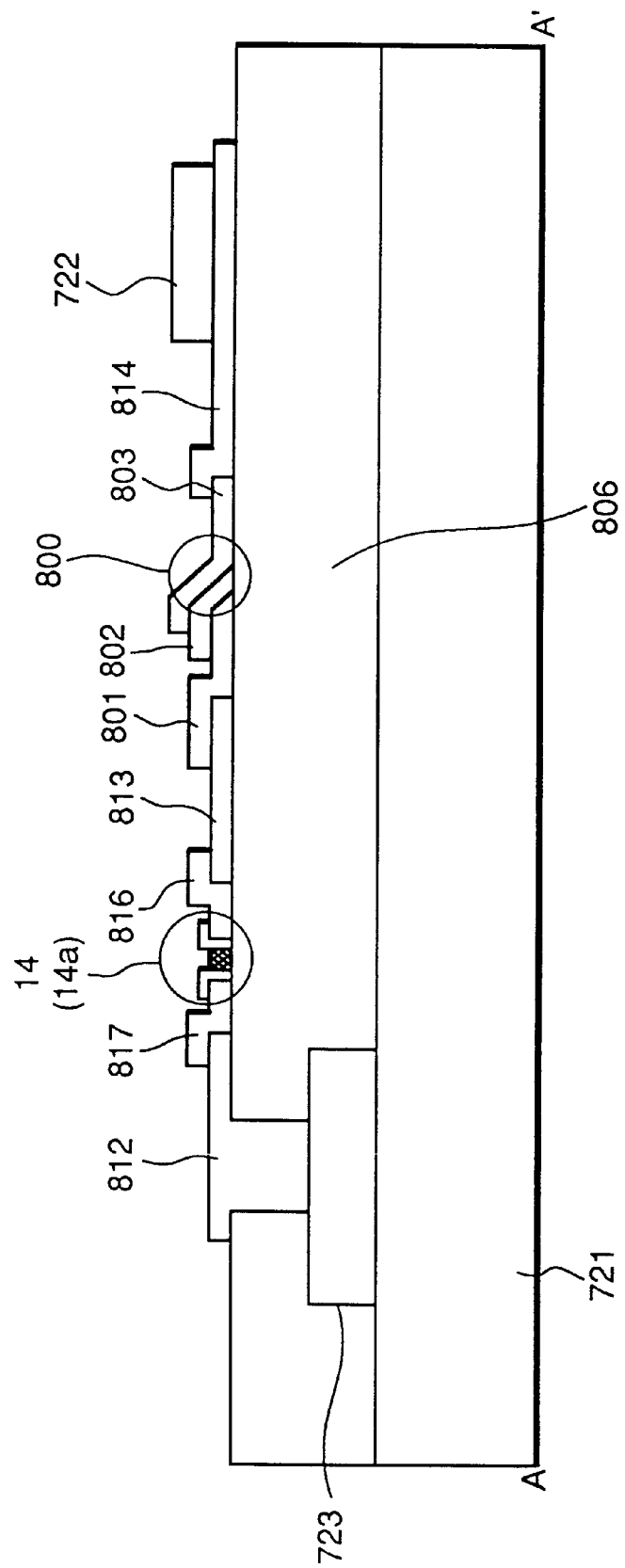
FIG. 37 is a partial sectional view of an embodiment of an electron source, which uses an MIM element as a nonlinear element.
Figure 38:
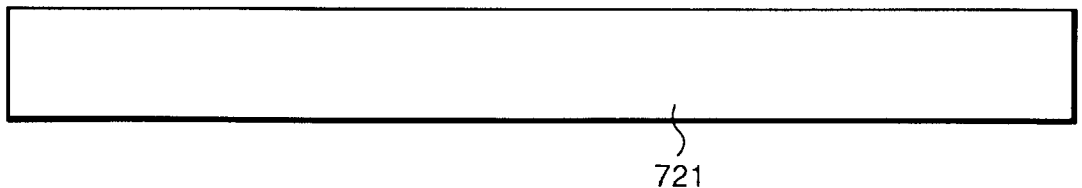
FIGS. 38(1) to 38(7) are sectional views showing the processes in the manufacture of the embodiment of the electron source which uses the MIM element as a nonlinear element.
Figure 38:
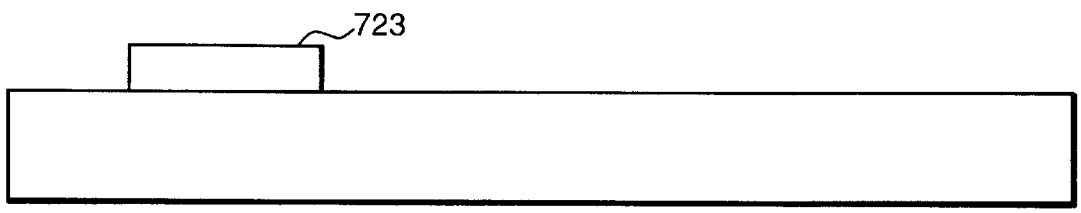
Figure 38:
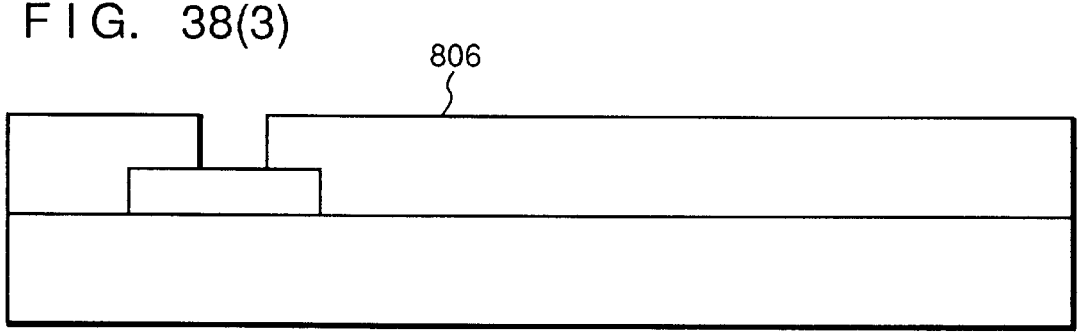
Figure 38:
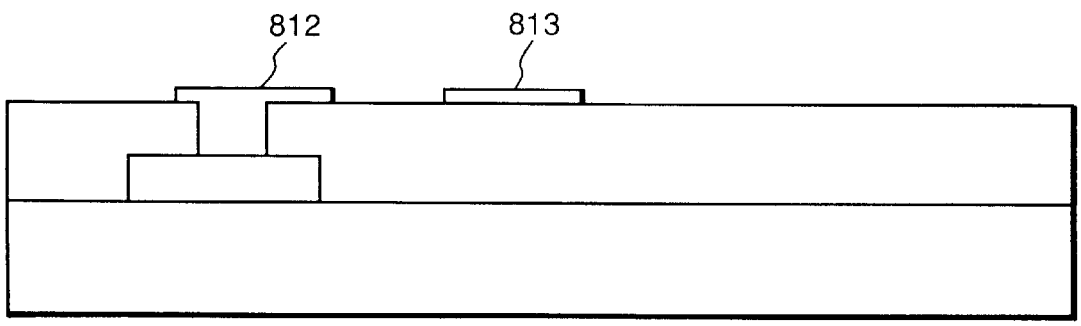
Figure 38:
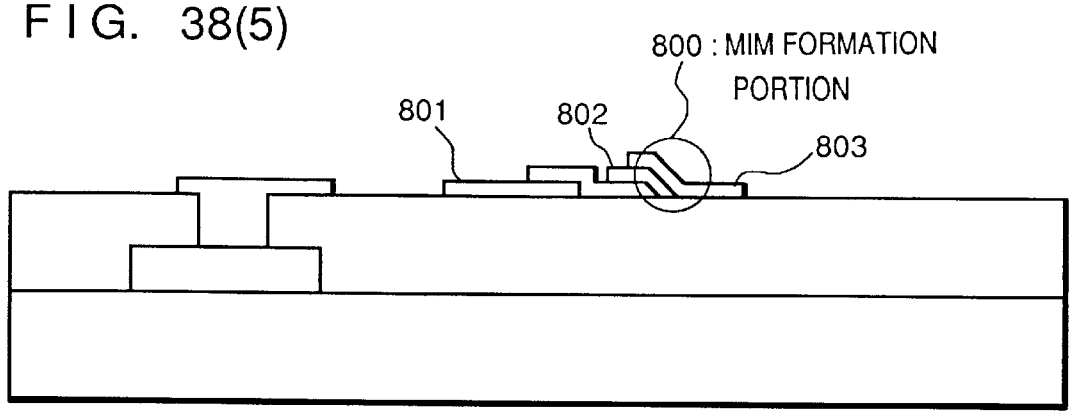
Figure 38:
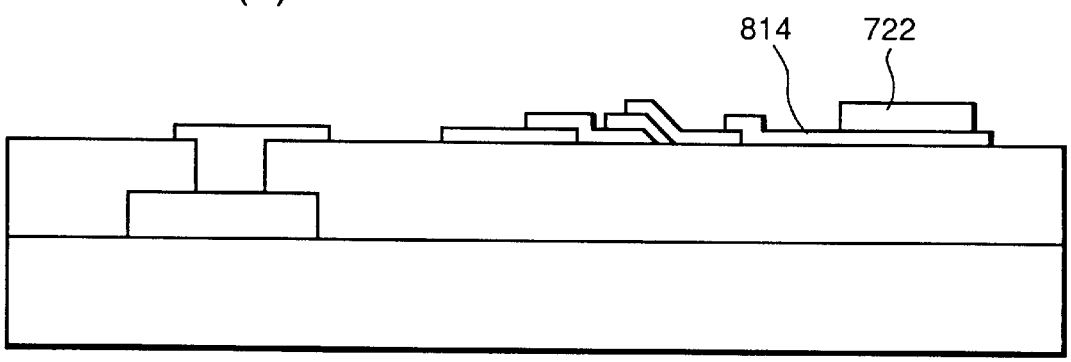
Figure 38:
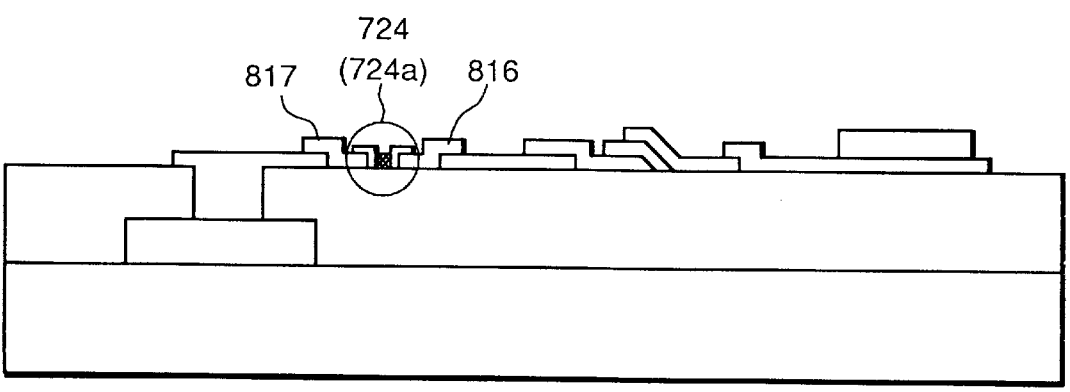
Figure 39:
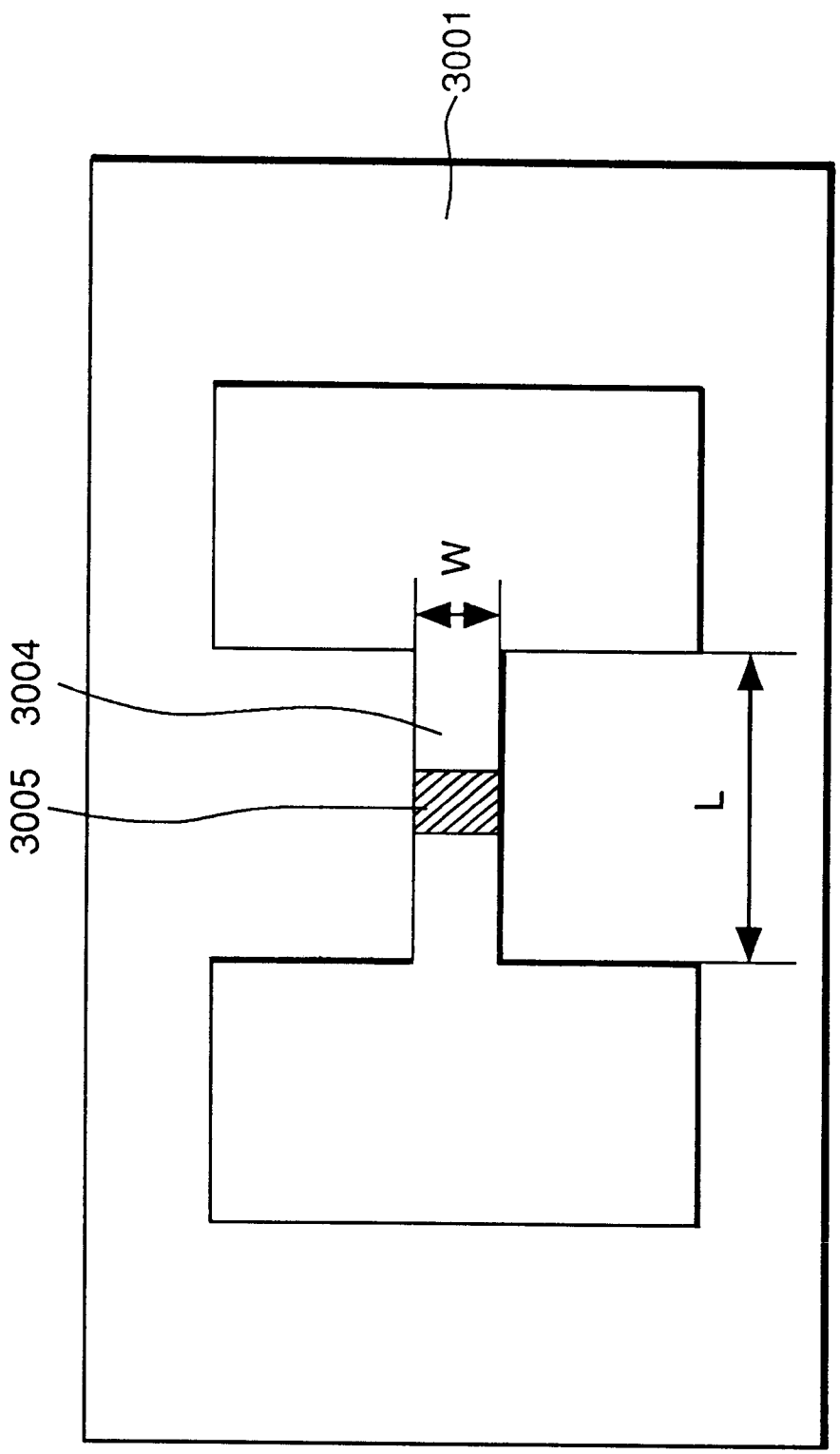
FIG. 39 is a plan view (PRIOR ART) of a conventional surface conduction type emitting element.
Figure 40:
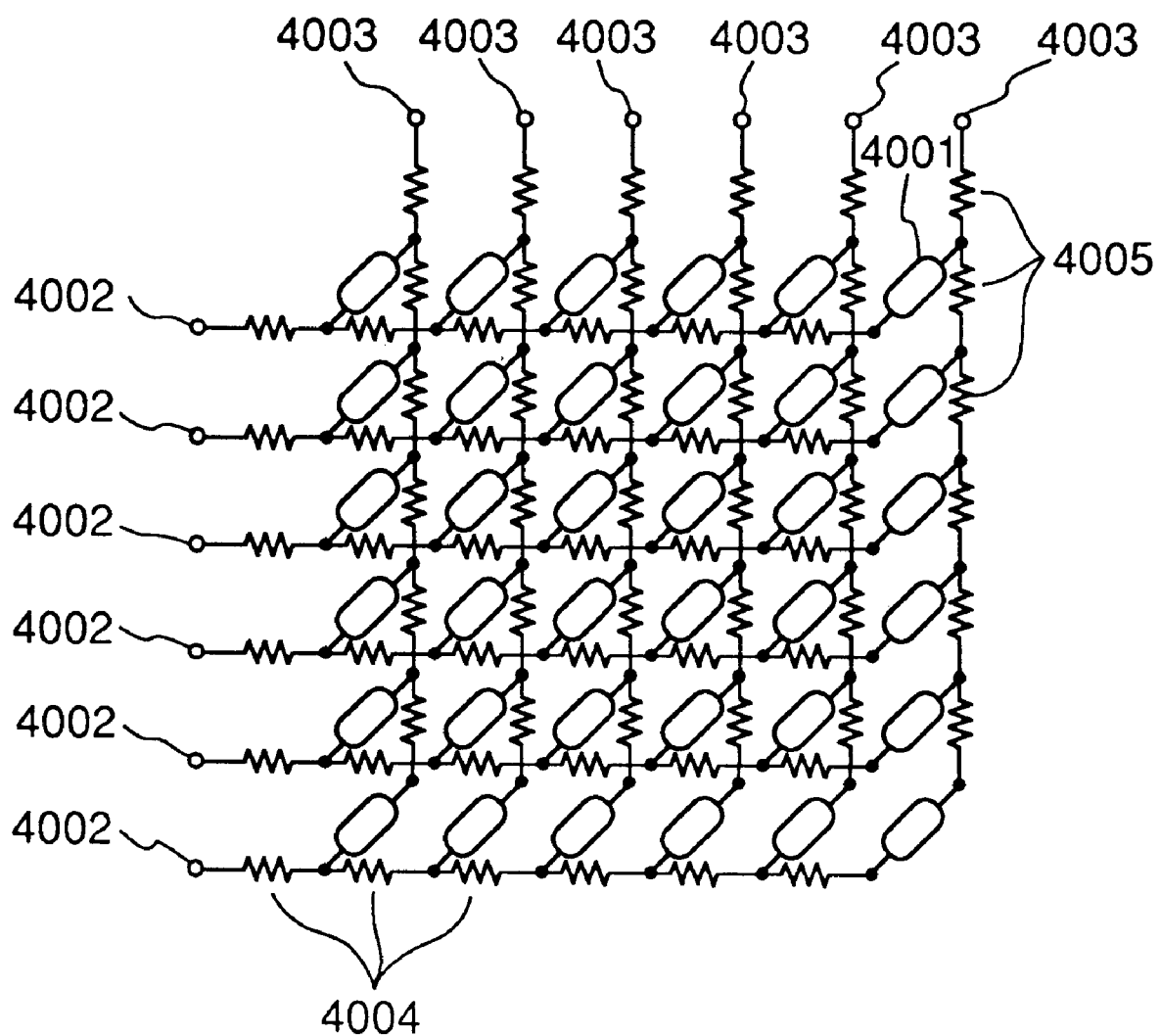
FIG. 40 is a diagram showing an example of a wiring method of surface conduction type emitting elements.
Figure 41:
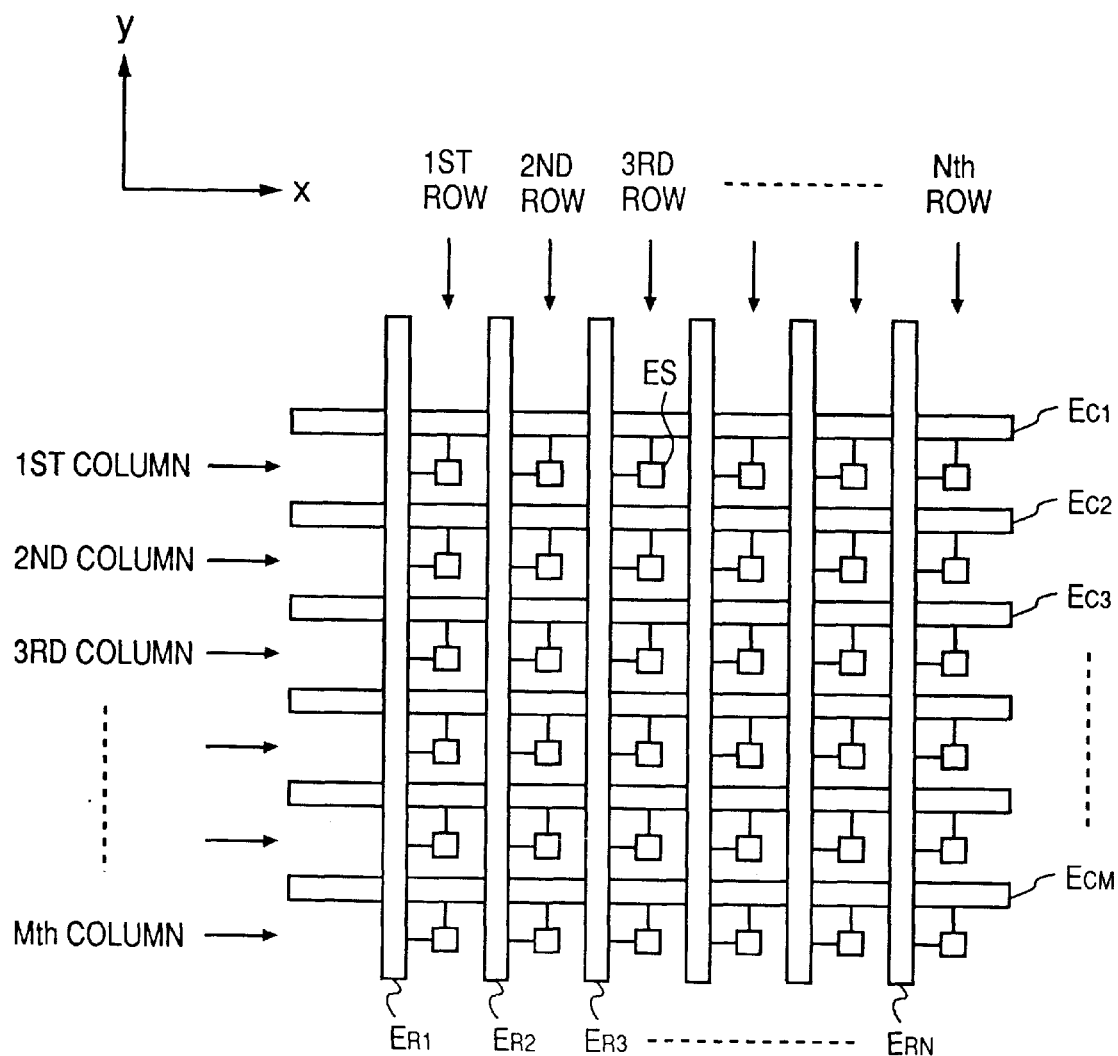
FIG. 41 is a view showing the ways of calling the respective portions in FIG. 40.
Figure 42:
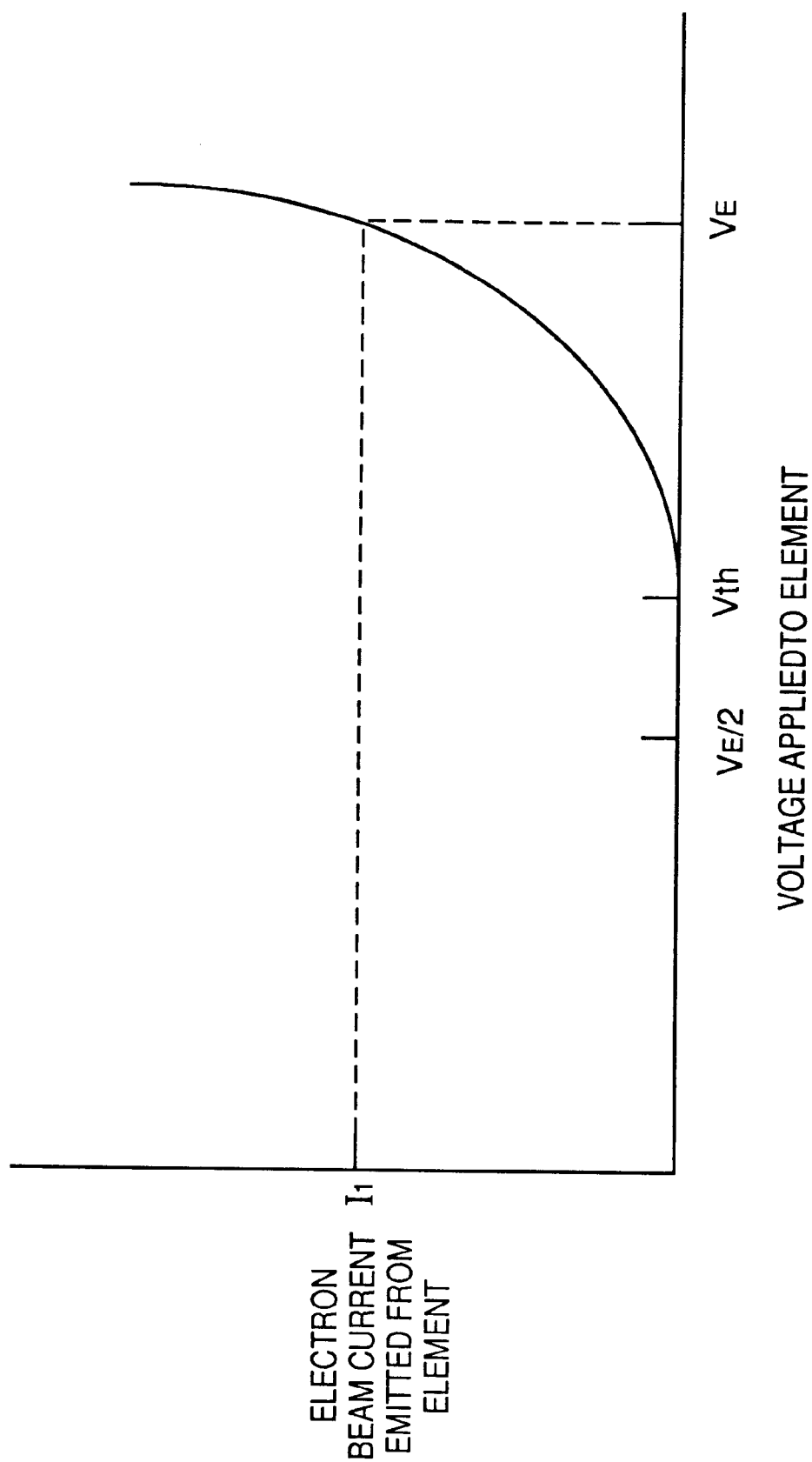
FIG. 42 is a graph showing typical electron emitting characteristics of a surface conduction type emitting element.

FIG. 37 is a partial sectional view of the electron source. FIGS. 38(1) to 38(7) show processes in the manufacture of the electron source of this embodiment. The same reference numerals denote the same parts throughout FIGS. 37 to 38(7).

FIG. 37 is a sectional view showing an example of an electron source substrate in which a surface conduction type electron emitting element as an electron emitting element and an MIM element are formed on a glass substrate 721.

Referring to FIG. 37, reference numeral 721 denotes a glass substrate; 721, a row-direction wiring electrode; and 723, a column-direction wiring electrode. Reference numeral 724a denotes an electron emitting portion formation thin film. When this thin film is subjected to a forming treatment, a thin film including an electron emitting portion is formed, thus obtaining a surface conduction type electron emitting element 724.

FIGS. 38(1) to 38(7) are sectional views showing the processes in the manufacture of the electron source with the MIM element according to this embodiment having the structure shown in FIG. 37.

In a process in FIG. 38(2), Au/Cr layers are sequentially stacked on a glass substrate 721 by a vacuum deposition method, and thereafter, a photoresist (AZ1370 available from Hoechst Corp.) is spin-coated by a spinner and is baked. Thereafter, a photomask image is exposed and developed to form a resist pattern for a column-direction wiring electrode. Then, the Au/Cr deposition film is wet-etched to form a column-direction wiring electrode 723. In a process in FIG. 38(3), an insulating interlayer 806 consisting of a silicon oxide film is deposited by an RF sputtering method, and contact holes are formed by etching (RIE method) using a photoresist. In a process in FIG. 38(4), an aluminum wiring electrode 812 for electrically connecting the column-direction wiring electrode 723 and an electrode 817 of the surface conduction type emitting element, and an aluminum wiring electrode 813 for electrically connecting an MIM element 800 and an electrode 816 of the surface conduction type emitting element are formed by a vacuum deposition method and a photolithography technique.

In a process (5), a Ta thin film 801 is formed by sputtering, and is anodized to form a $Ta_2O_2$ thermal oxide film 802. Furthermore, a Cr thin film and an ITO thin film are continuously sputtered to form a Cr/ITO electrode 803, thereby forming the MIM element. In a process in FIG. 38(6), an aluminum wiring electrode 814 for connecting the electrode 803 of the MIM element 800 and a row-direction wiring electrode 722 is formed by a vacuum deposition method and a photolithography technique, and thereafter, a row-direction wiring electrode 722 is formed. In a process in FIG. 38(7), the surface conduction type emitting element is formed. The formation method is the same as that in the first embodiment.

As many apparently widely different embodiments of the present invention can be made without departing from the spirit and scope thereof, it is to be understood that the invention is not limited to the specific embodiments thereof except as defined in the claims.

What is claimed is:

1. An electron source comprising:

a substrate;

row-direction wiring lines;

column-direction wiring lines;

a plurality of surface conduction type electron emissive elements arranged in matrix formation on said substrate;

wherein each surface conduction type electron emissive element in each row of said matrix formation is connected to each column-direction wiring line and to a corresponding row-direction wiring line and non-linear elements, each of which is provided in series with each surface conduction type electron emissive element, for preventing an opposite directional current flow by a voltage of reverse polarity being applied across the surface conduction type electron emissive elements in series therewith, when noise components are superposed on signals applied to said row-direction or column-direction wiring lines.

2. The electron source according to claim 1, wherein each of said non-linear elements is an element having diode characteristics.

3. The electron source according to claim 2, wherein said element having diode characteristics is an amorphous silicon diode.

4. The electron source according to claim 2, wherein said element having diode characteristics is a polysilicon diode.

5. The electron source according to claim 2, wherein said element having diode characteristics is a monocrystalline silicon diode.

6. The electron source according to claim 1, wherein each of said non-linear elements is an MIM element.

7. The electron source according to claim 1, wherein each of said surface conduction type electron emissive elements is an element having a local high-resistance portion in a conductive film arranged between electrodes.

8. An image forming apparatus comprising:

an electron source according to claim 1; and an image forming member for forming an image upon irradiation by an electron beam emitted from said electron source.

9. An image forming apparatus comprising:

an electron source according to claim 2; and an image forming member for forming an image upon irradiation by an electron beam emitted from said electron source.

10. An image forming apparatus comprising:

an electron source according to claim 3; and an image forming member for forming an image upon irradiation by an electron beam emitted from said electron source.

11. An image forming apparatus comprising:

an electron source according to claim 4; and an image forming member for forming an image upon irradiation by an electron beam emitted from said electron source.

12. An image forming apparatus comprising:

an electron source according to claim 5; and an image forming member for forming an image upon irradiation by an electron beam emitted from said electron source.

13. An image forming apparatus comprising:

an electron source according to claim 6; and an image forming member for forming an image upon irradiation by an electron beam emitted from said electron source.

14. An image forming apparatus comprising:

an electron source according to claim 7; and an image forming member for forming an image upon irradiation by an electron beam emitted from said electron source.

15. A method of driving an electron source comprising:

a substrate;

row-direction wiring lines;

column-direction wiring lines;

a plurality of surface conduction type electron emissive elements arranged in matrix formation on said substrate, and wherein each surface conduction type electron emissive element in each row of said matrix formation is connected to each column-direction wiring line and to a corresponding row-direction wiring line; and non-linear elements, each of which is provided in series with each surface conduction type electron emissive element, for preventing an opposite directional current flow by a voltage of reverse polarity being applied across the surface conduction type electron emissive element in series therewith;

said method comprising the steps of:

applying a scanning signal to a selected row-direction wiring line; and applying respective modulation signals to selected column-direction wiring lines, wherein if voltages of reverse polarity, that would be applied across the surface conduction type electron emissive elements in the presence of noise components superposed on said scanning signals and on said modulation signals, are supplied to the surface conduction type electron emissive elements connected between selected wiring lines, then reverse-current flows are prevented by said non-linear elements in series therewith.

16. An electron source comprising:

a substrate;

row-direction wiring lines;

column-direction wiring lines;

a plurality of electron emissive elements, each of which has a threshold voltage, wherein when a voltage to be applied to the electron emissive element exceeds the threshold voltage, an electron beam is emitted from the electron emissive element;

wherein the plurality of electron emissive elements are arranged in matrix formation on said substrate, and wherein each electron emissive element in each row of said matrix formation is connected to each column-direction wiring line and to a corresponding row-direction wiring line, and non-linear elements, each of which is provided in series with each electron emissive element, for preventing an opposite directional current flow by a voltage of reverse polarity being applied across the electron emissive element in series therewith, when noise components are superposed on signals applied to said row-direction or column-direction wiring lines.

17. A method of driving an electron source comprising:

a substrate;

row-direction wiring lines;

column-direction wiring lines;

a plurality of electron emissive elements, each of which has a threshold voltage, wherein when a voltage to be applied to the electron emissive element exceeds the threshold voltage, an electron beam is emitted from the electron emissive element;

wherein the plurality of electron emissive elements are arranged in matrix formation on said substrate, and wherein each electron emissive element in each row of said matrix formation is connected to each column-direction wiring line and to a corresponding row-direction wiring line, and non-linear elements, each of which is provided in series with each electron emissive element, for preventing an opposite directional current flow by a voltage of reverse polarity being applied across the electron emissive element in series therewith, when noise components are superposed on signals applied to said row-direction or column-direction wiring lines;

said method comprising the steps of:

applying a scanning signal to a selected row-direction wiring line; and applying respective modulation signals to selected column-direction wiring lines, wherein if voltages of reverse polarity, that would be applied across electron emissive elements in the presence of noise components superposed on said scanning signals and on said modulation signals, are supplied to electron emissive elements connected between selected wiring lines, then reverse-current flows are prevented by said non-linear elements in series therewith.

* * * * *

UNITED STATES PATENT AND TRADEMARK OFFICE
CERTIFICATE OF CORRECTION

PATENT NO. : 5,929,827

DATED : July 27, 1999

INVENTOR(S) : AOJI ISONO, ET AL.

It is certified that error appears in the above-identified patent and that said Letters Patent is hereby corrected as shown below:

<u>ON THE COVER PAGE</u>:

Item [56] References Cited

U.S. PATENT DOCUMENTS

After "4,994,796    2/1991    Kuijk......345/205"
insert --5,066,883    11/1991    Yoshioka et al.--.

After "5,428,370    6/1995    Knapp......345/205"
insert

--FOREIGN PATENT DOCUMENTS

| | | |
|---|---|---|
| 0312007 | 4/1989 | European Pat. Off. |
| 0492585 | 7/1992 | European Pat. Off. |
| 0536731 | 4/1993 | European Pat. Off. |
| 64-31332 | 2/1989 | Japan. |
| 2-257551 | 10/1990 | Japan. |

OTHER REFERENCES

W.P. Dyke & W.W. Dolan, "Field Emission", Advances in Electronics and Electron Physics, 8, 89-185 (1956), Academic Press, New York.

UNITED STATES PATENT AND TRADEMARK OFFICE
CERTIFICATE OF CORRECTION

PATENT NO. : 5,929,827

DATED : July 27, 1999

INVENTOR(S) : AOJI ISONO, ET AL.

It is certified that error appears in the above-identified patent and that said Letters Patent is hereby corrected as shown below:

OTHER REFERENCES (cont'd.)

C.A. Spindt, et al., "Physical Properties of Thin-Film Emission Cathodes with Molybdenum Cones", J. Appl. Phys., 47, 5248-63 (1976).

C.A. Mead, "Operation of Tunnel-Emission Devices", J. Appl. Phys., 32, 646-52 (1961).

M.I. Elinson, et al., "The Emission of Hot Electrons and The Field Emission of Electrons from Tin Oxide", Radio Eng. Phys., 10, 1290-96 (1965).

G. Dittmer, "Electrical Conduction and Electron Emission of Discontinuous Thin Films", Thin Solid Films, 9, 317-29 (1972).

M. Hartwell and C.G. Fonstad, "Strong Electron Emission from Patterned Tin-Indium Oxide Thin Films", IEEE Trans. Ed. Conf., 519-21 (1975).

H. Araki, et al., "Electro Forming and Electron Emission of Carbon Thin Films", J. Vacuum Soc. of Japan, 26 (1), 22-29 (1983).--.

UNITED STATES PATENT AND TRADEMARK OFFICE
CERTIFICATE OF CORRECTION

PATENT NO. : 5,929,827

DATED : July 27, 1999

INVENTOR(S) : AOJI ISONO, ET AL.

It is certified that error appears in the above-identified patent and that said Letters Patent is hereby corrected as shown below:

IN THE DISCLOSURE:

COLUMN 1:

Line 50, "these" should read --this--.
    Line 63, "illustration one" should read --illustration of one--.

COLUMN 2:

Line 64, "illustrate" should read --illustrates--.

COLUMN 4:

Line 23, "denote" should read --denotes--.

COLUMN 6:

Line 17, "which" should be deleted.

COLUMN 7:

Line 6, "is to" should read --to--.
    Line 13, "is to" should read --to--.

UNITED STATES PATENT AND TRADEMARK OFFICE
CERTIFICATE OF CORRECTION

PATENT NO. : 5,929,827

DATED : July 27, 1999

INVENTOR(S) : AOJI ISONO, ET AL.

It is certified that error appears in the above-identified patent and that said Letters Patent is hereby corrected as shown below:

COLUMN 7:

Line 24, "is to" should read --to--.
    Line 29, "is to" should read --to--.
    Line 42, "through out" should read --throughout--.

COLUMN 10:

Line 46, "a case the" should read
--a case in which the--.

COLUMN 11:

Line 21, "severa;" should read --several--.

COLUMN 13:

Line 54, "energizatioh" should read
--energization--.

COLUMN 16:

Line 56, "as" should read --such as--.

UNITED STATES PATENT AND TRADEMARK OFFICE
CERTIFICATE OF CORRECTION

PATENT NO. : 5,929,827
DATED      : July 27, 1999
INVENTOR(S) : AOJI ISONO, ET AL.

Page 5 of 5

It is certified that error appears in the above-identified patent and that said Letters Patent is hereby corrected as shown below:

COLUMN 19:

Line 14, "12, an" should read --12, a--.
    Line 63, "12, an" should read --12, a--.

COLUMN 20:

Line 60, "and an" should read --and a--.
    Line 65, "an" should read --a--.

COLUMN 21:

Line 19, "an" should read --a--.

Signed and Sealed this

Fifteenth Day of August, 2000

Attest:

Q. TODD DICKINSON

Attesting Officer      Director of Patents and Trademarks